(12) United States Patent
Tanabe et al.

(10) Patent No.: US 12,456,884 B2
(45) Date of Patent: Oct. 28, 2025

(54) POWER RECEIVING ANTENNA

(71) Applicant: Aeterlink Corp., Tokyo (JP)

(72) Inventors: Yuji Tanabe, Tokyo (JP); Shingo Hikosaka, Tokyo (JP); Naoto Kodate, Tokyo (JP)

(73) Assignee: Aeterlink Corp., Tokyo (JP)

( * ) Notice: Subject to any disclaimer, the term of this patent is extended or adjusted under 35 U.S.C. 154(b) by 0 days.

(21) Appl. No.: 18/030,618

(22) PCT Filed: Oct. 25, 2022

(86) PCT No.: PCT/JP2022/039768
§ 371 (c)(1),
(2) Date: May 4, 2023

(87) PCT Pub. No.: WO2023/074699
PCT Pub. Date: May 4, 2023

(65) Prior Publication Data
US 2024/0022117 A1    Jan. 18, 2024

(30) Foreign Application Priority Data
Oct. 26, 2021 (WO) .................. PCT/JP2021/039559

(51) Int. Cl.
*H01Q 1/24*    (2006.01)
*H01Q 1/36*    (2006.01)
(Continued)

(52) U.S. Cl.
CPC ............... *H02J 50/27* (2016.02); *H01Q 1/36* (2013.01); *H02J 50/10* (2016.02)

(58) Field of Classification Search
CPC ............ H01Q 1/24; H01Q 1/243; H01Q 1/38; H01Q 9/04; H01Q 9/0421; H01Q 5/35;
(Continued)

(56) References Cited

U.S. PATENT DOCUMENTS

| 9,293,826 B2 | 3/2016 | Yonei et al. |
| 2009/0231215 A1* | 9/2009 | Taura ................... H01Q 21/064 343/702 |

(Continued)

FOREIGN PATENT DOCUMENTS

| EP | 3258542 A1 | 12/2017 |
| JP | S62-34405 A | 2/1987 |

(Continued)

OTHER PUBLICATIONS

International Search Report of PCT/JP2022/039768 dated Jan. 25, 2022.

*Primary Examiner* — Thai Pham
(74) *Attorney, Agent, or Firm* — Mattingly & Malur, PC

(57) ABSTRACT

A power receiving antenna is provided, which is capable of efficiently receiving electric power from a distant power transmitting device, and allows a change of its size within a certain range. A power receiving antenna used for wireless power feeding includes: a first conductive plate; a second conductive plate that faces the first conductive plate; a feeder connecting a first end portion of the first conductive plate and a second end portion of the second conductive plate facing the first end portion; and a conductive member connecting a first other end portion opposite to the first end portion and a second other end portion opposite to the second end portion.

20 Claims, 44 Drawing Sheets

(51) Int. Cl.
*H01Q 1/38* (2006.01)
*H02J 50/10* (2016.01)
*H02J 50/27* (2016.01)

(58) Field of Classification Search
CPC ........ H01Q 5/307; H01Q 13/08; H01Q 13/10; H01Q 21/28; H01Q 7/00; H02J 50/10; H02J 50/12; H02J 50/27
See application file for complete search history.

(56) References Cited

U.S. PATENT DOCUMENTS

| | | | | |
|---|---|---|---|---|
| 2013/0194143 | A1* | 8/2013 | Bungo | H01Q 9/0442 |
| | | | | 343/725 |
| 2014/0210674 | A1* | 7/2014 | Yonei | H01Q 5/371 |
| | | | | 343/700 MS |
| 2018/0032853 | A1* | 2/2018 | Sugimura | H01Q 1/2225 |
| 2023/0163472 | A1* | 5/2023 | Kakuya | H01Q 23/00 |
| | | | | 343/848 |

FOREIGN PATENT DOCUMENTS

| | | | |
|---|---|---|---|
| JP | 2003-158419 | A | 5/2003 |
| JP | 2016-025502 | A | 2/2016 |
| JP | 2020-184718 | A | 11/2020 |
| WO | 2013/031518 | A1 | 3/2013 |
| WO | 2016/129542 | A1 | 8/2016 |

* cited by examiner

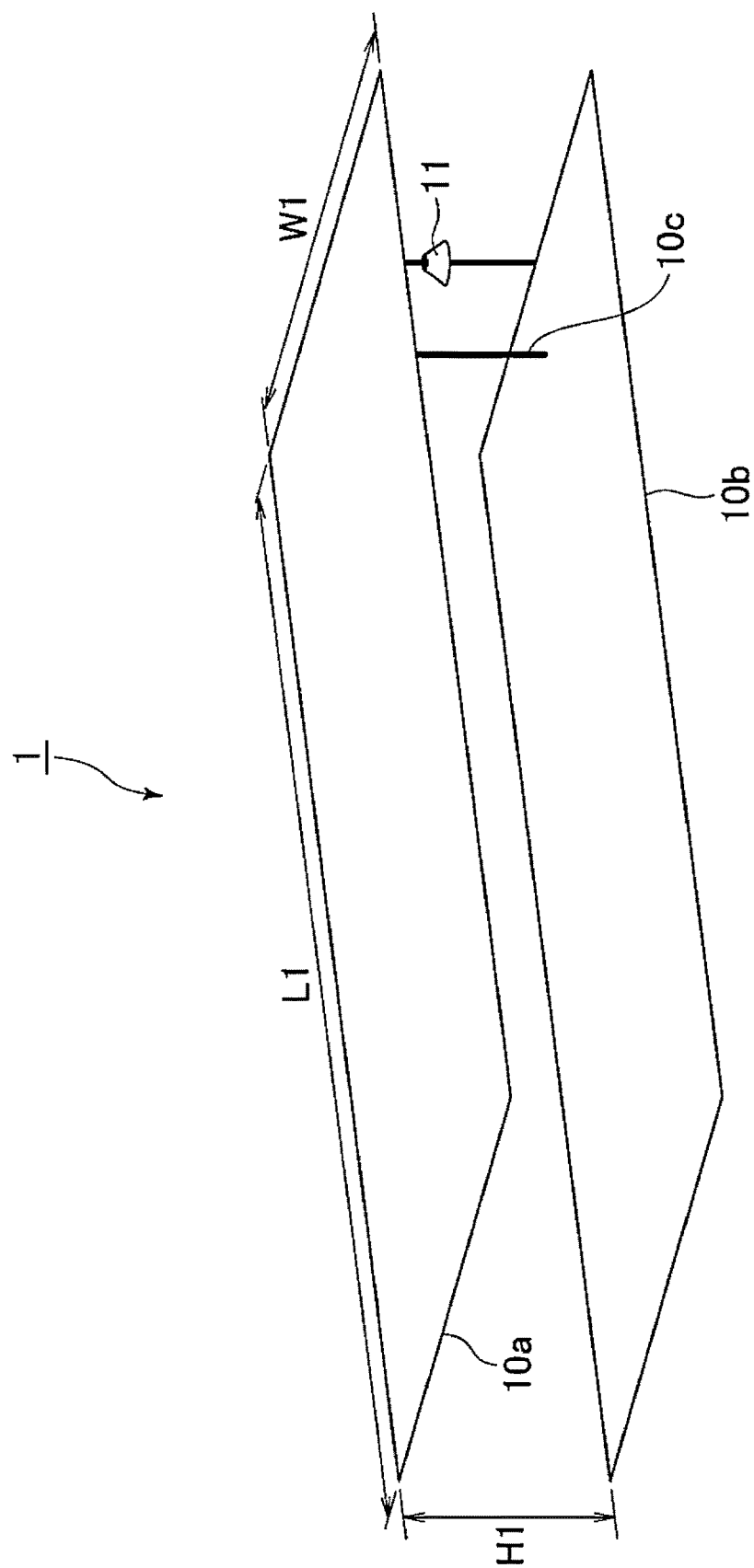
[FIG. 1]

[FIG. 2]
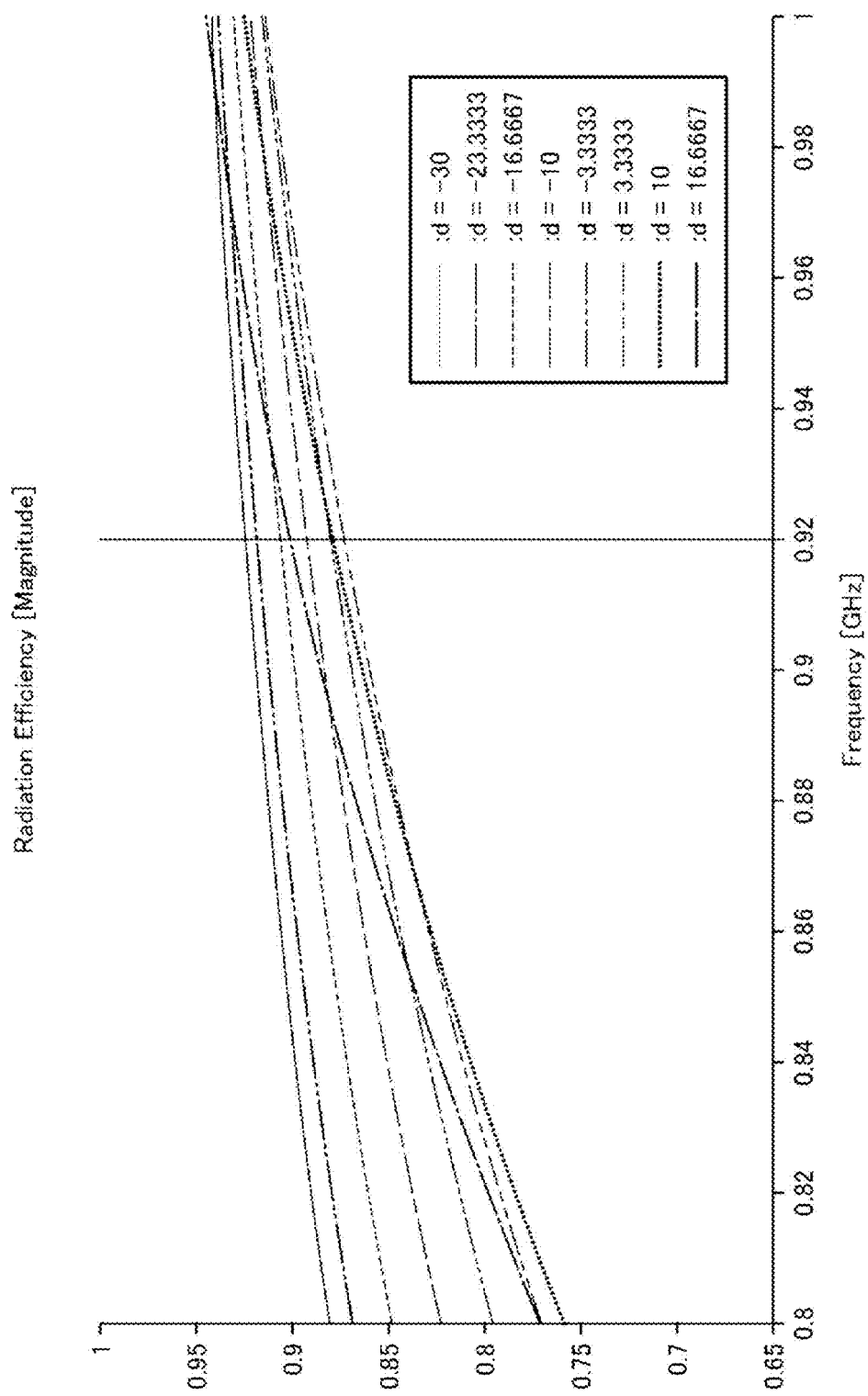

[FIG. 3]
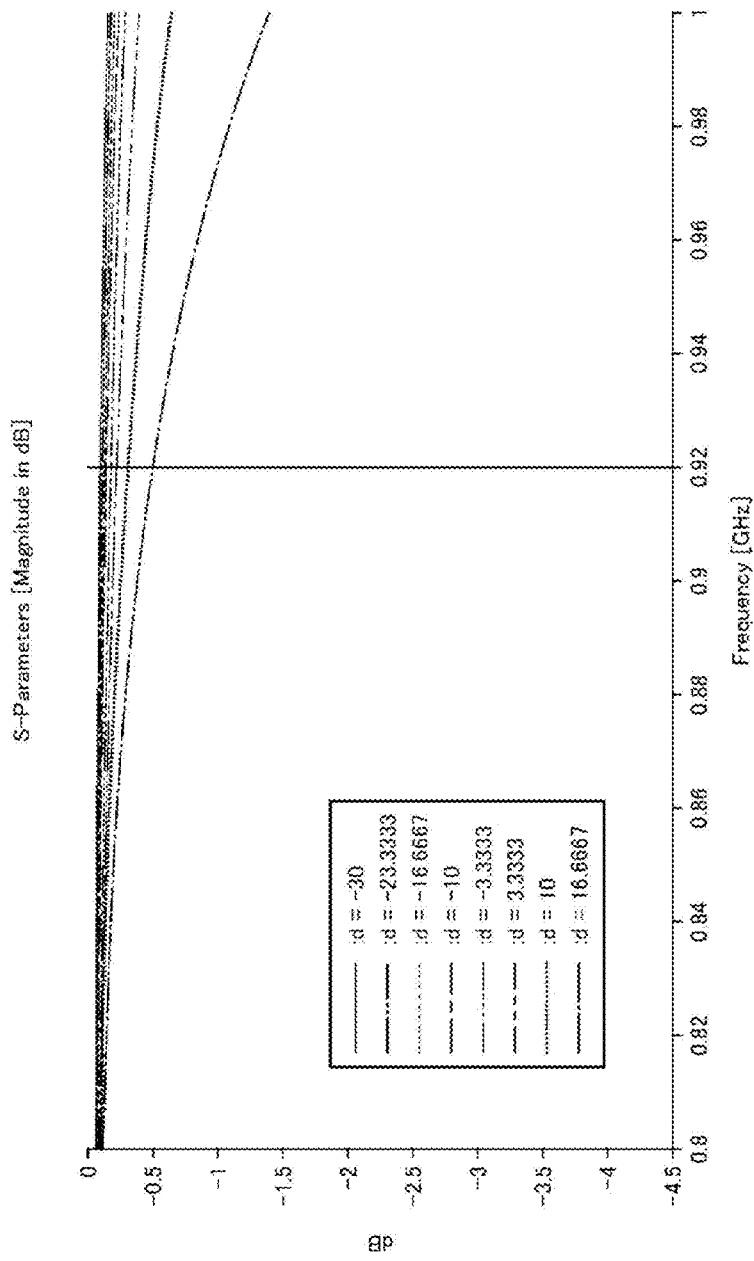

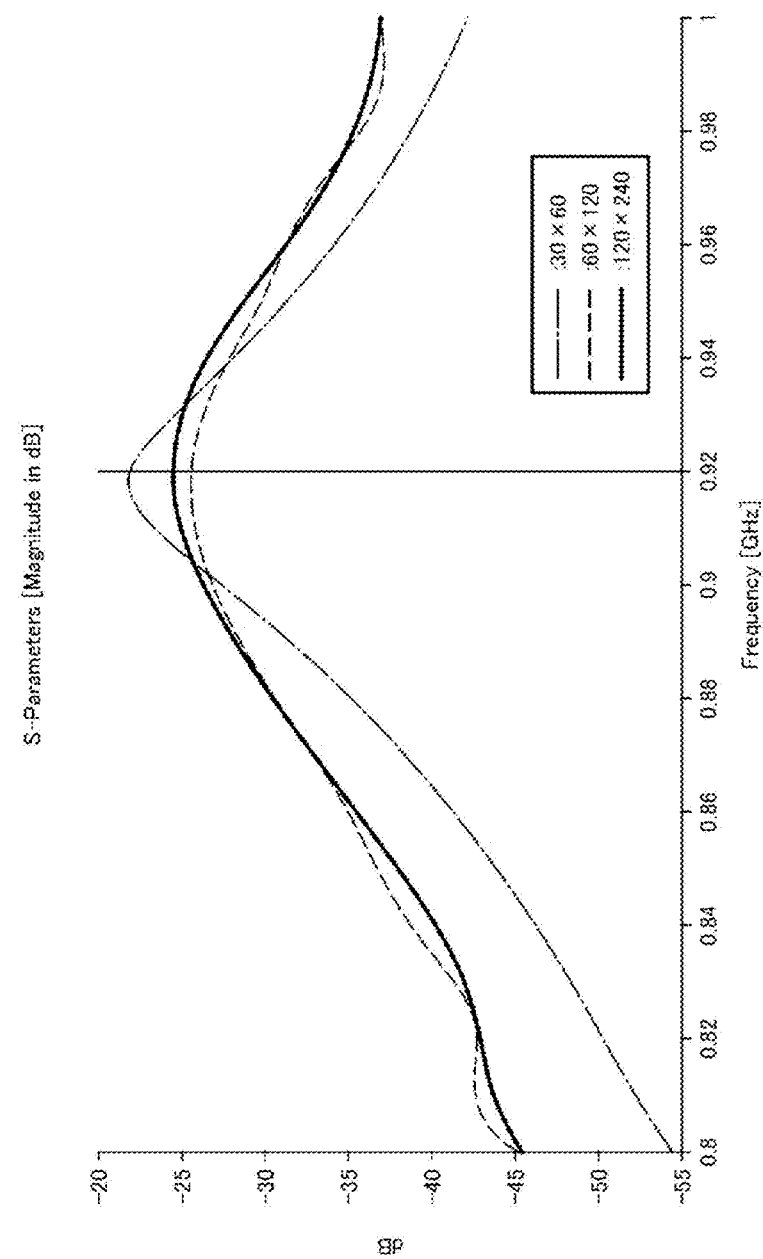
[FIG. 4]

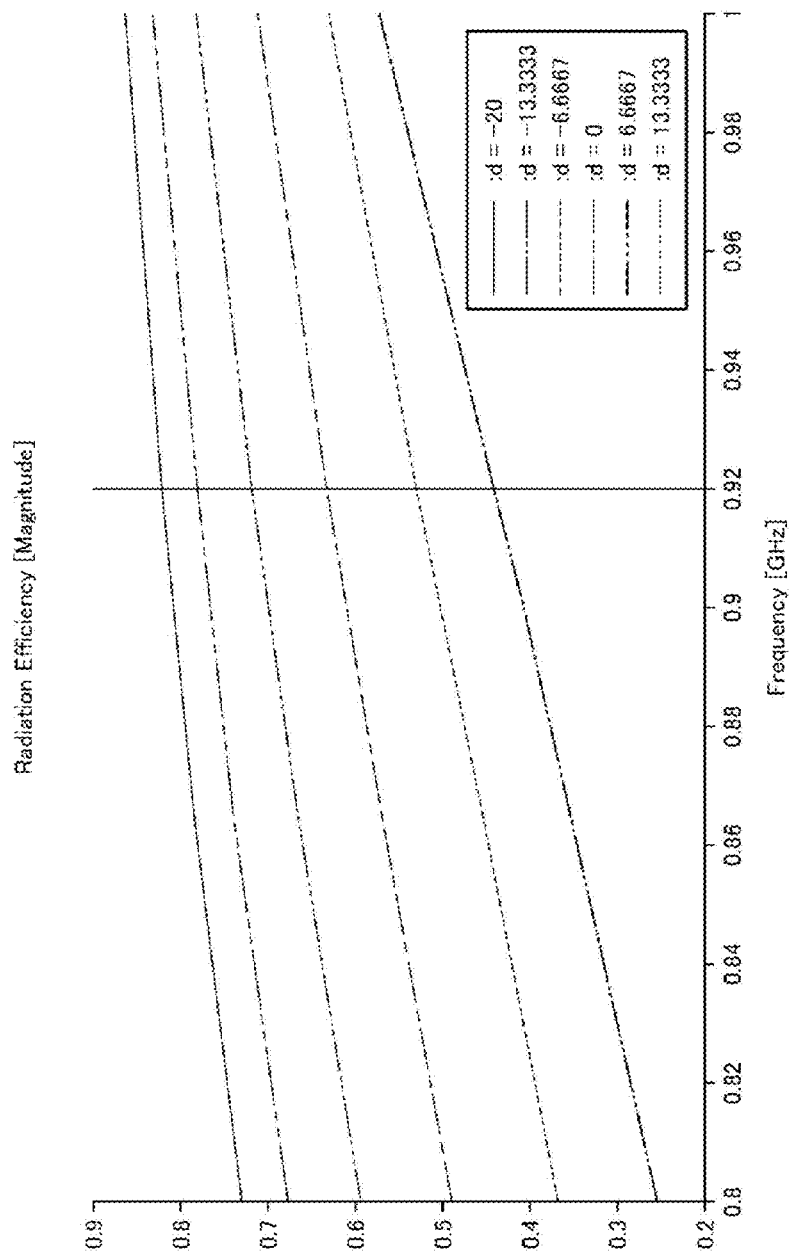
[FIG. 5]

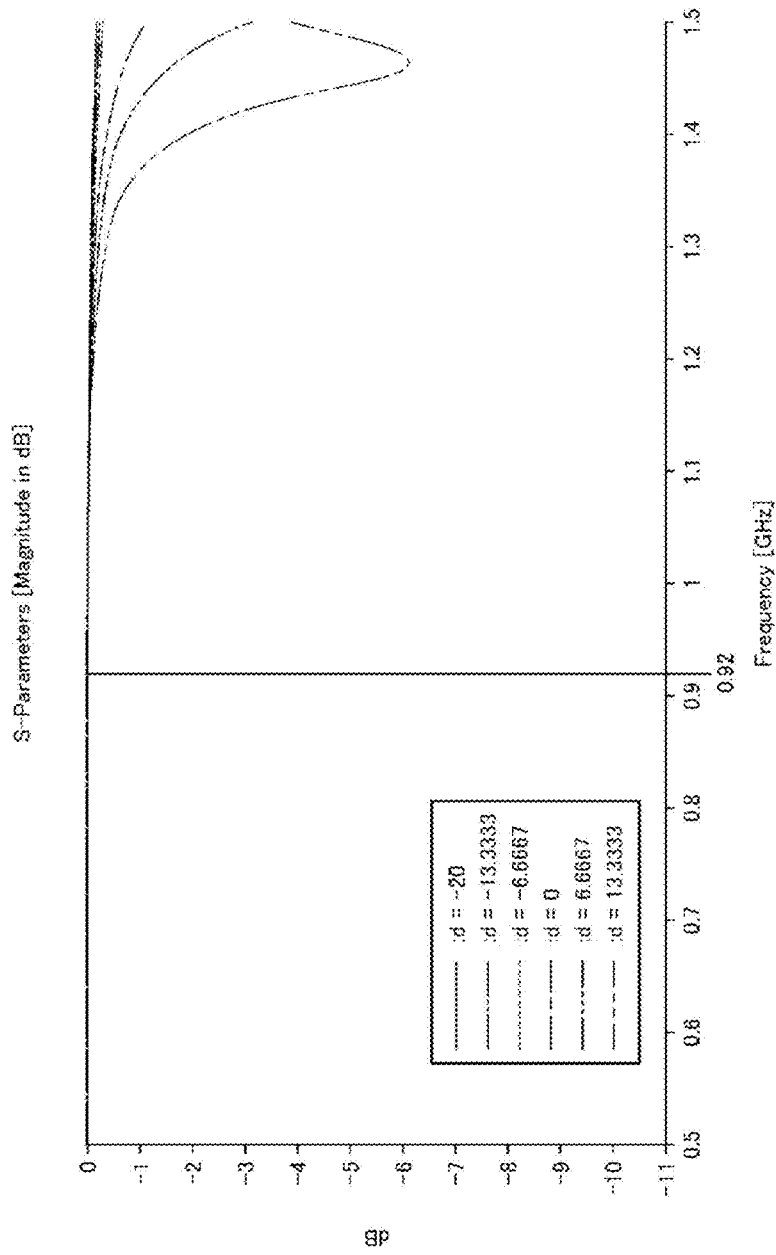
[FIG. 6]

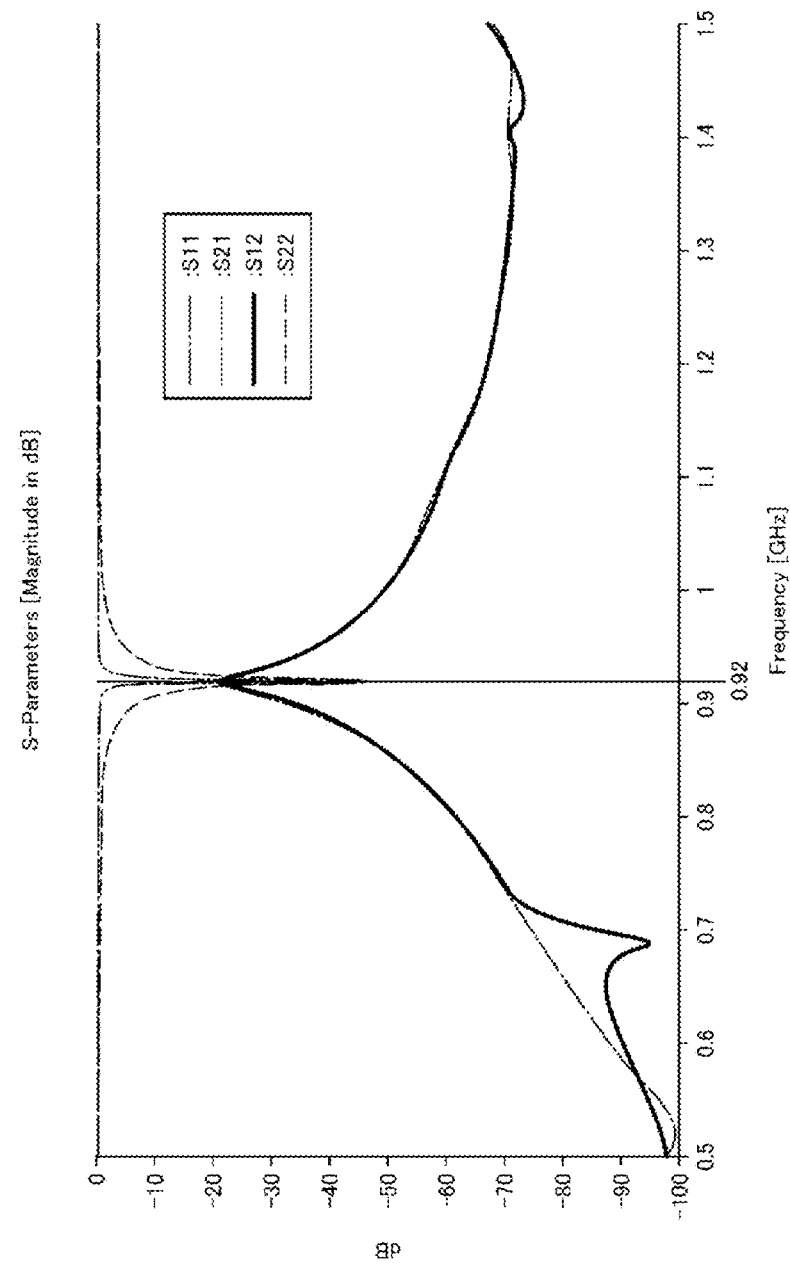
[FIG. 7]

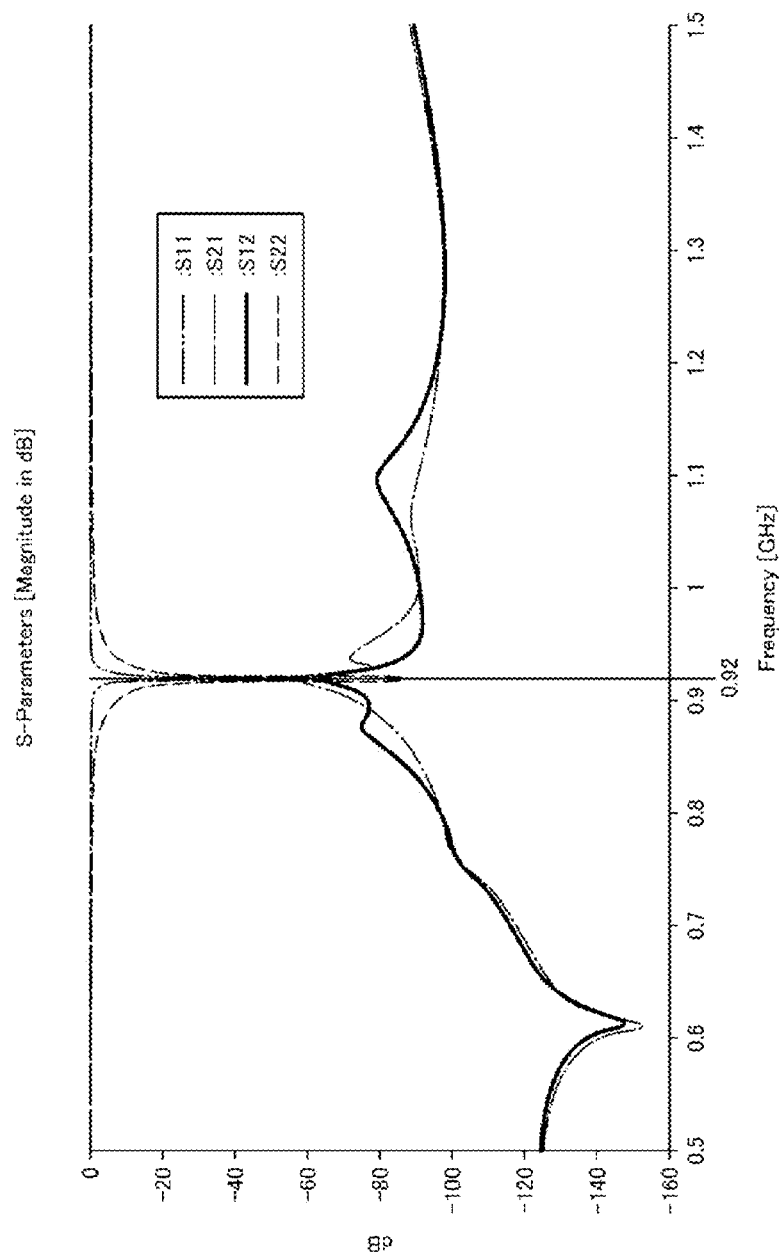
[FIG. 8]

[FIG. 9]
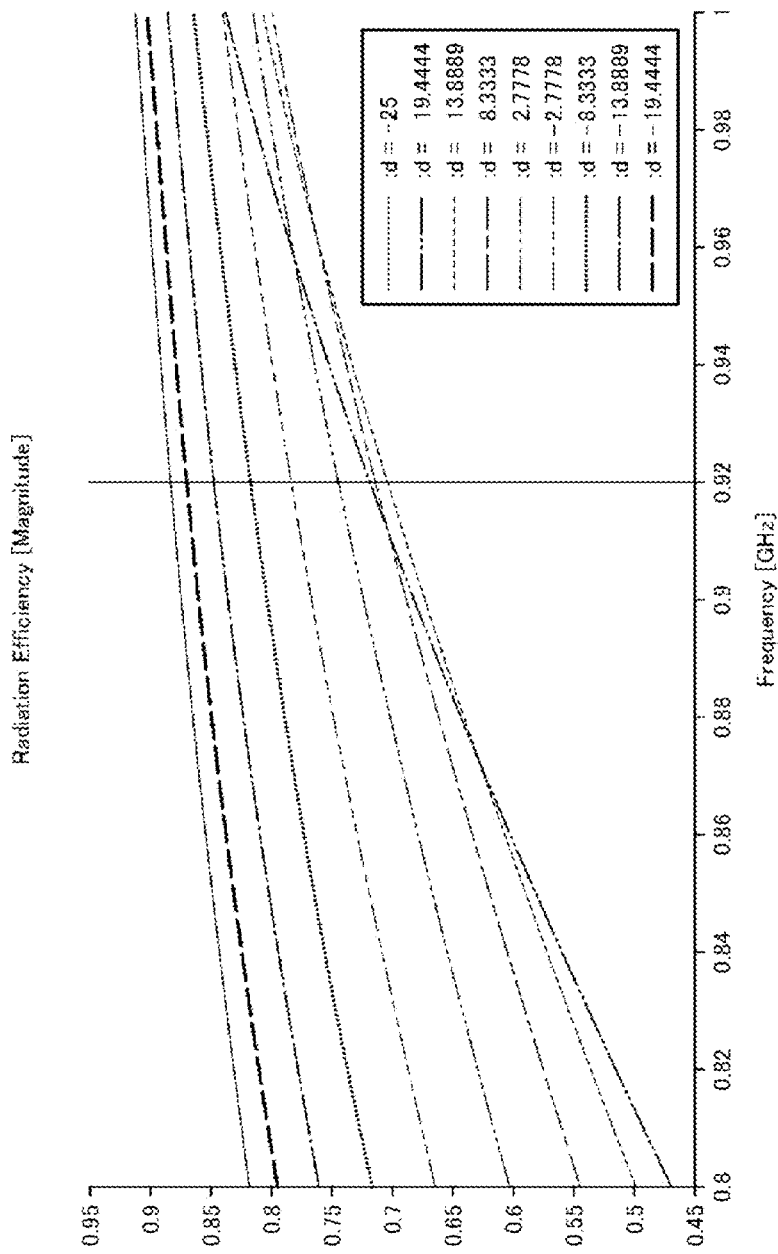

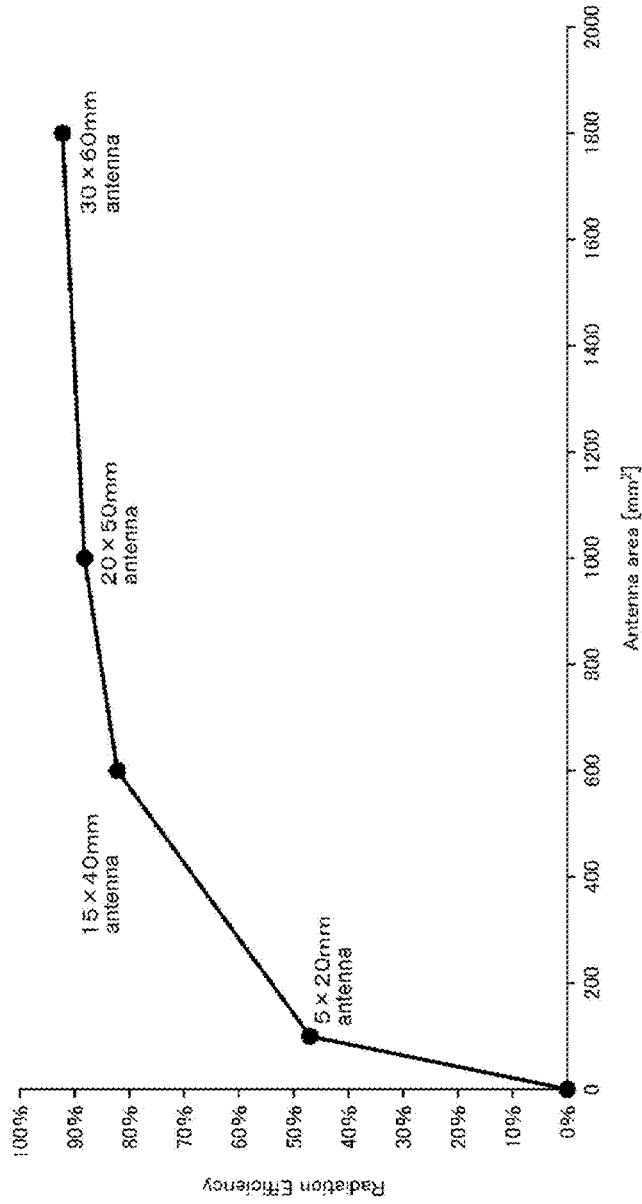
[FIG. 10]

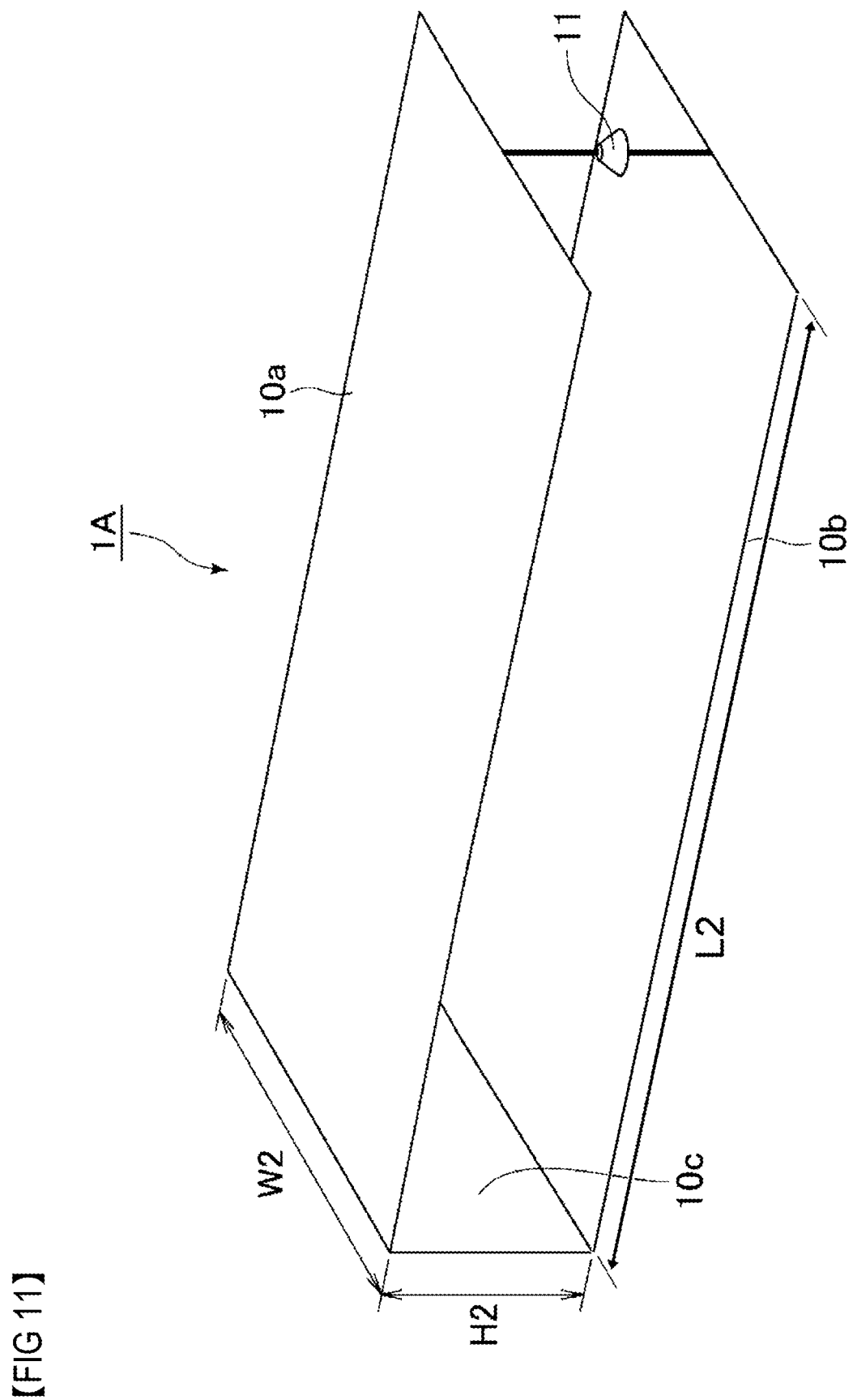
[FIG 11]

[FIG. 12]
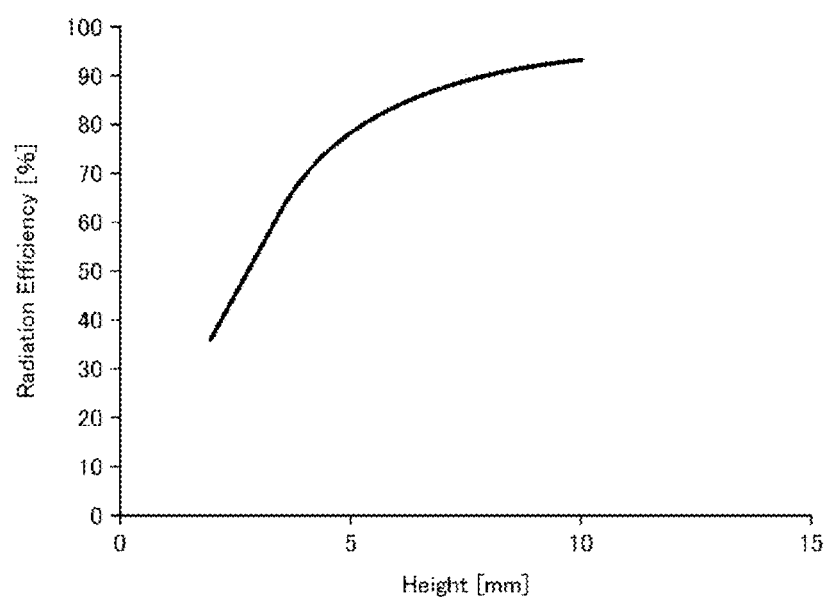
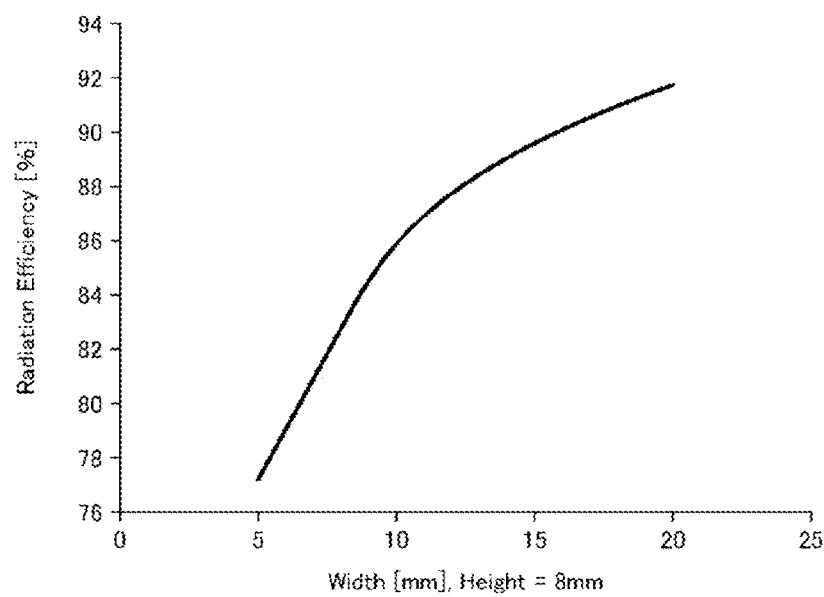

[FIG. 13]
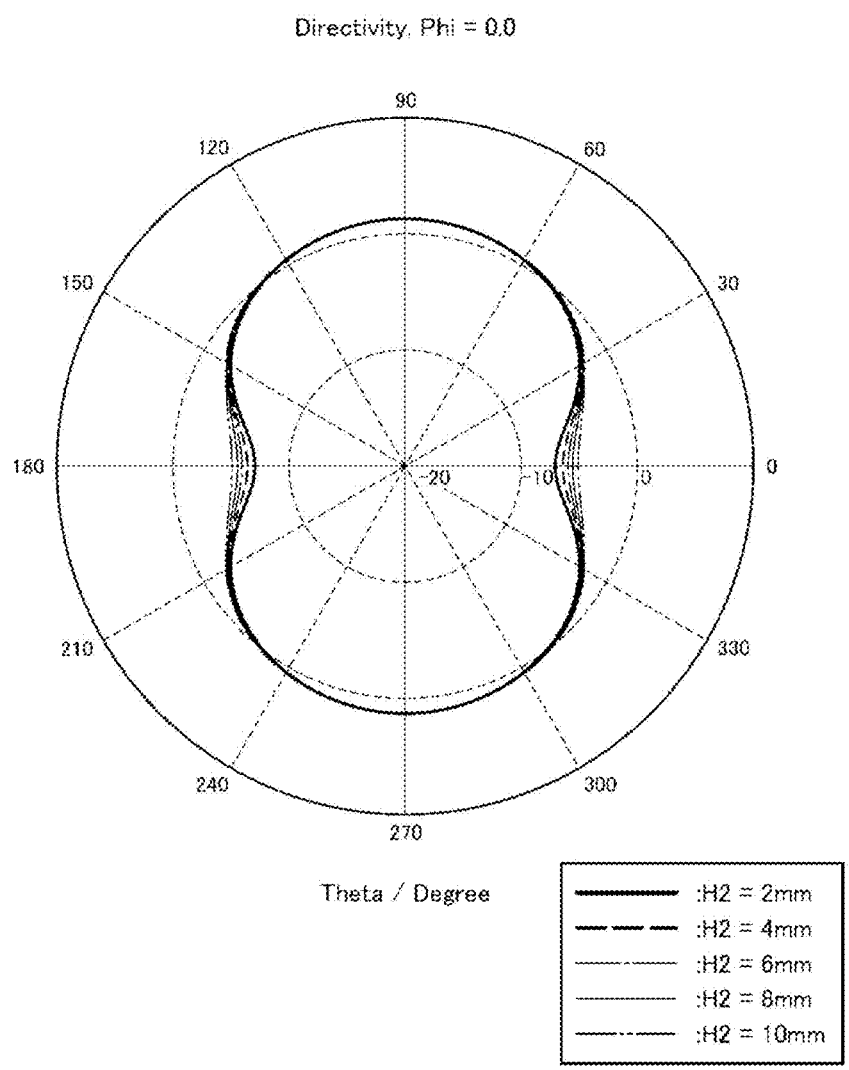

【FIG. 14】
(a)
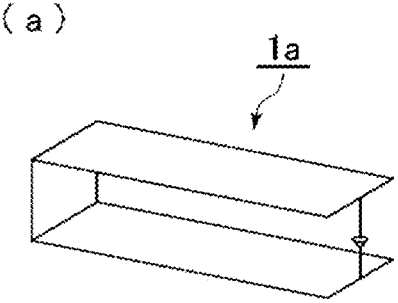
1a
(b)
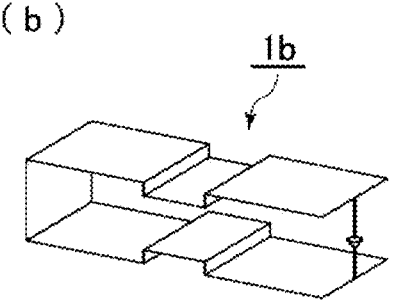
1b
(c)
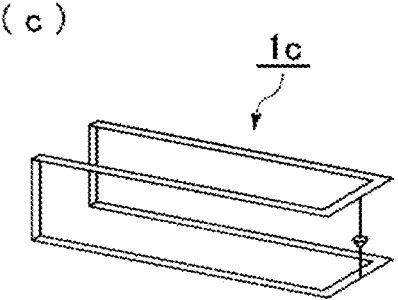
1c
(d)
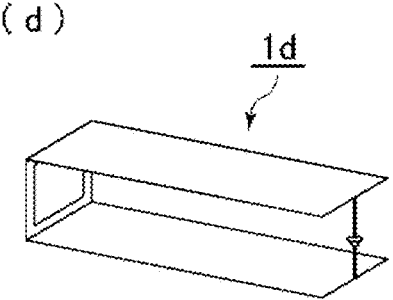
1d
(e)
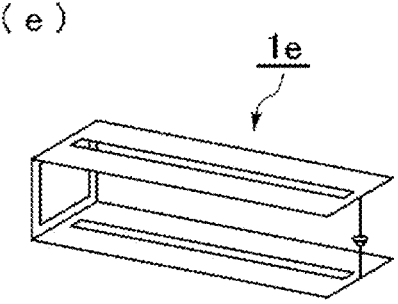
1e
(f)
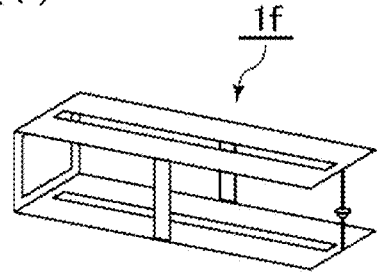
1f 【FIG. 15】
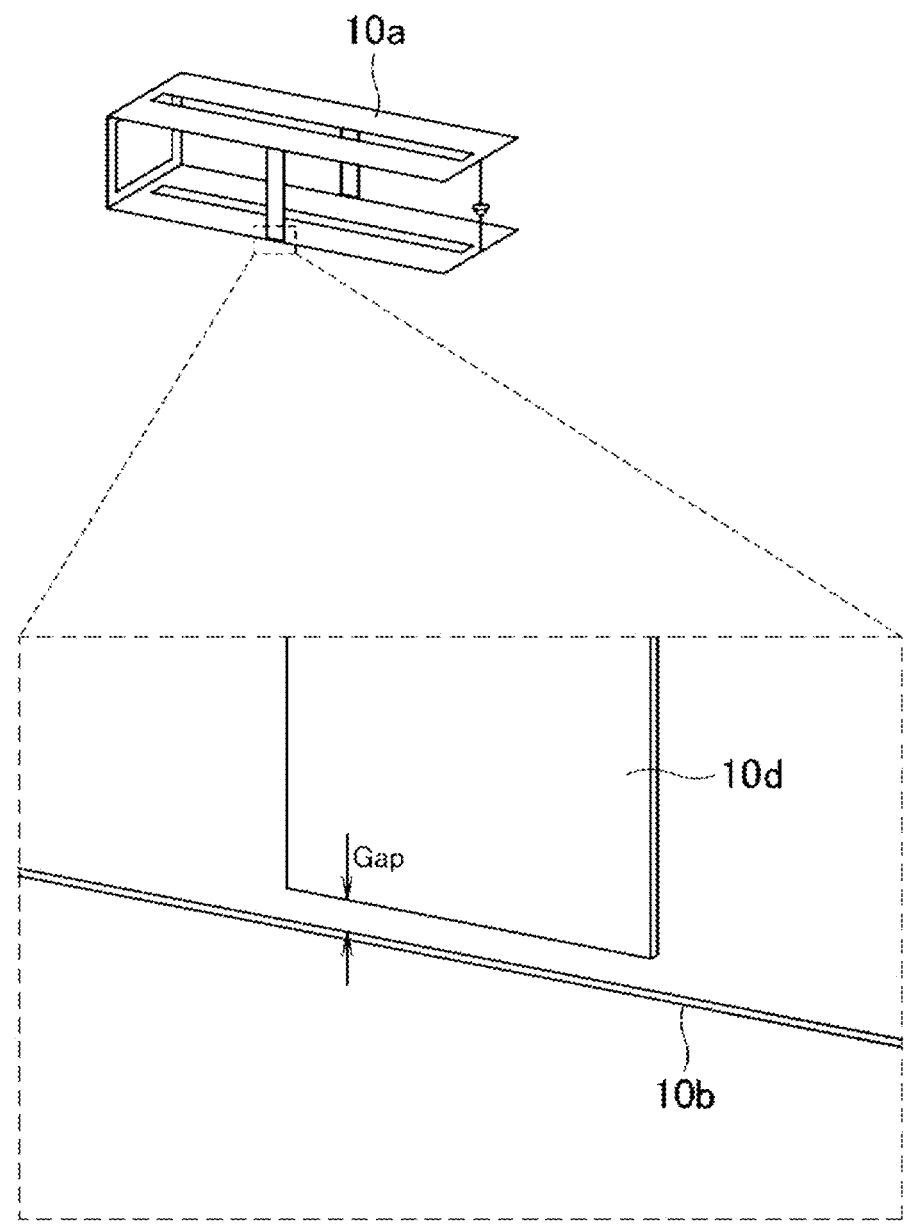

[FIG. 16]
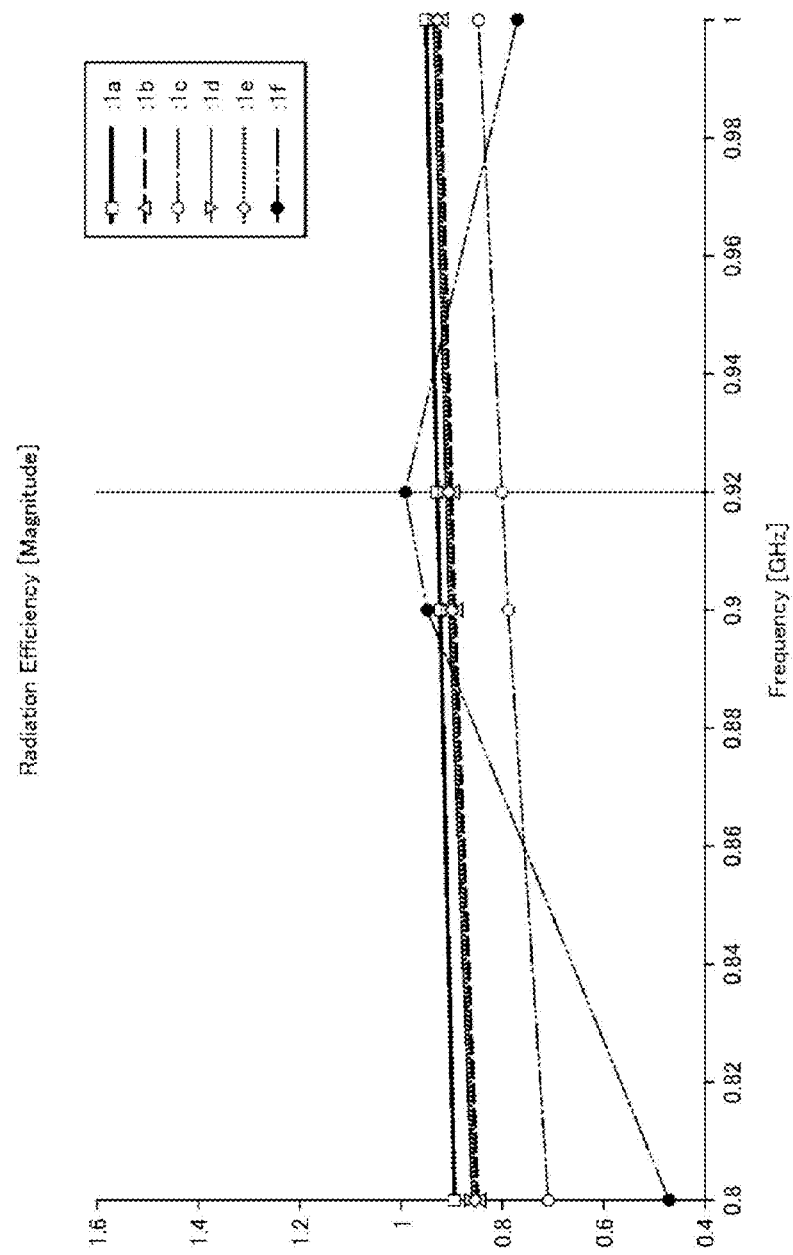

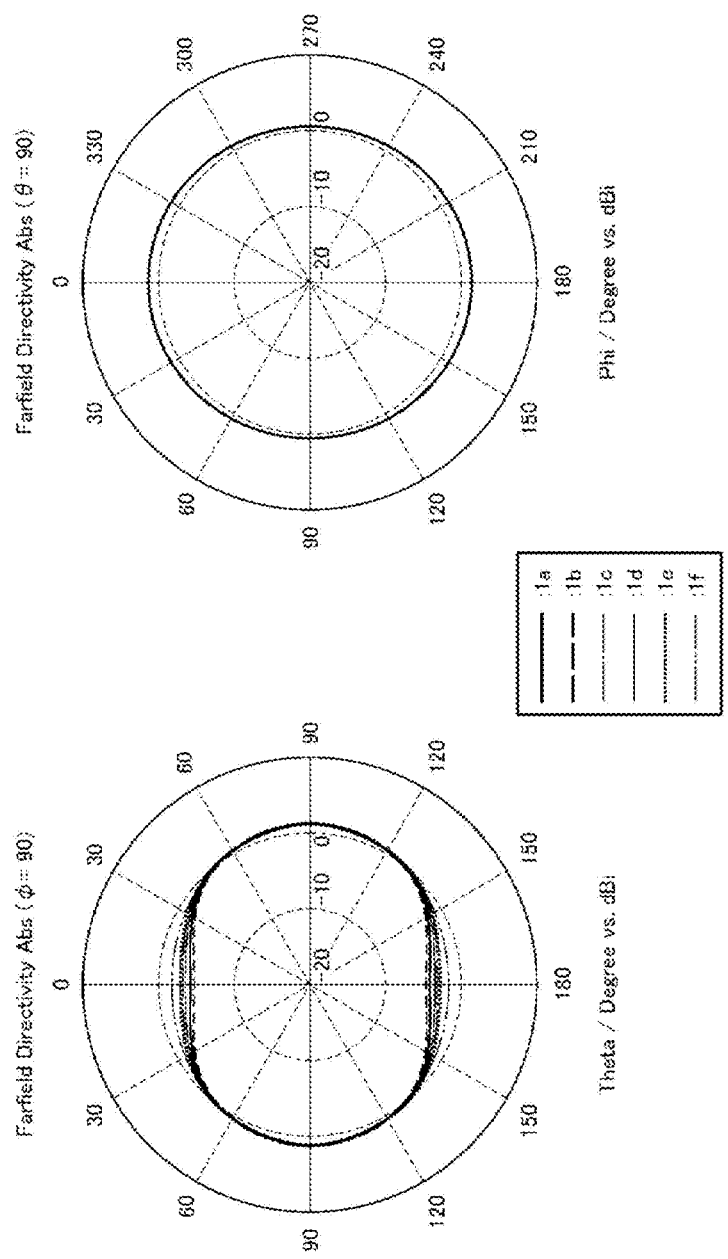
[FIG. 17]

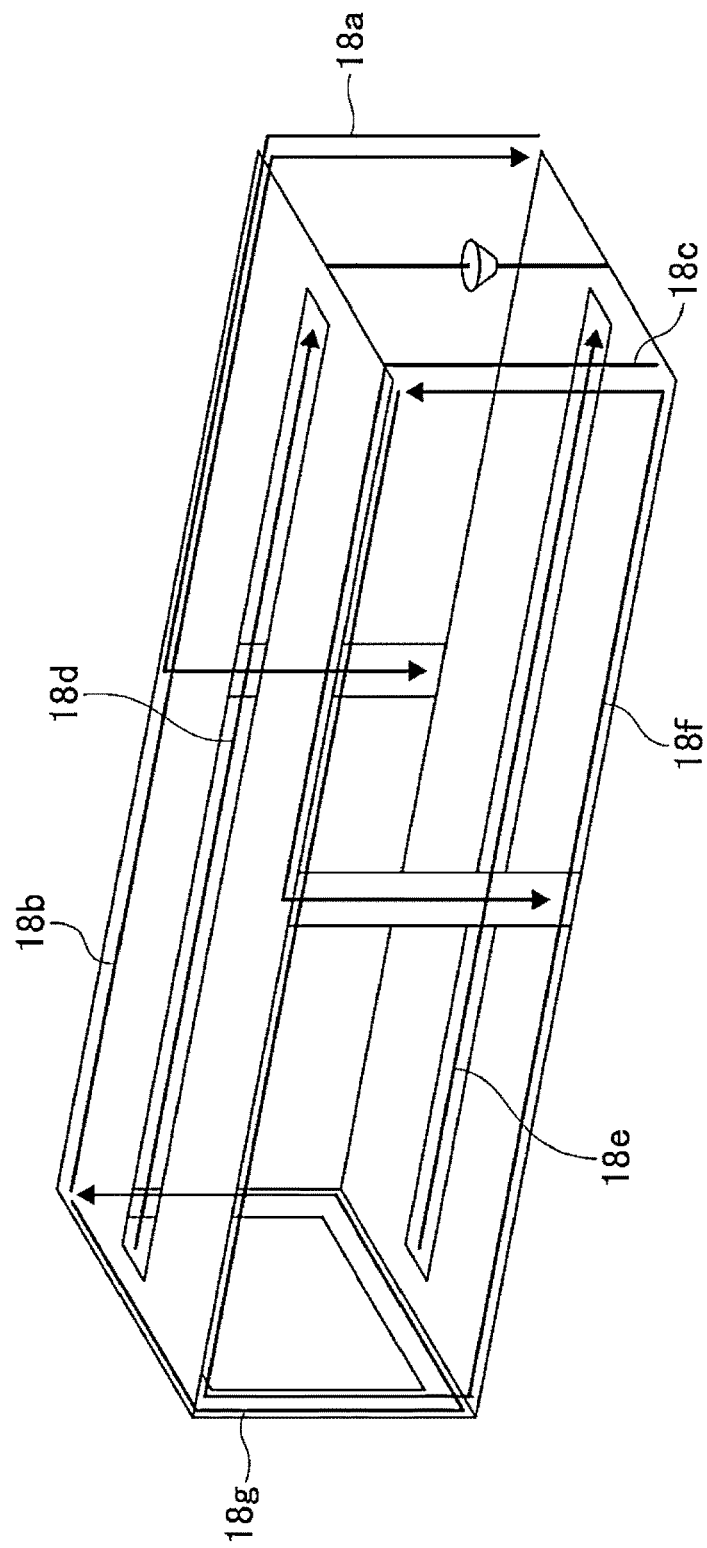
[FIG. 18]

[FIG. 19]
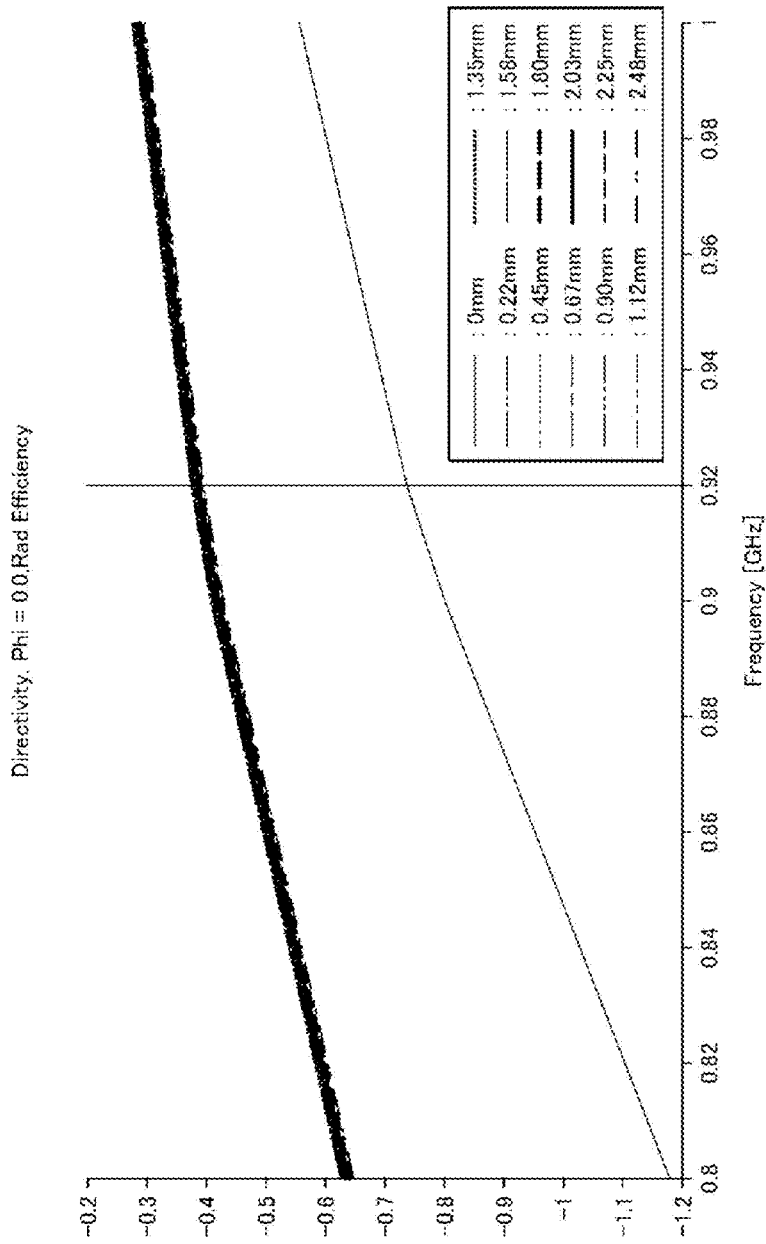

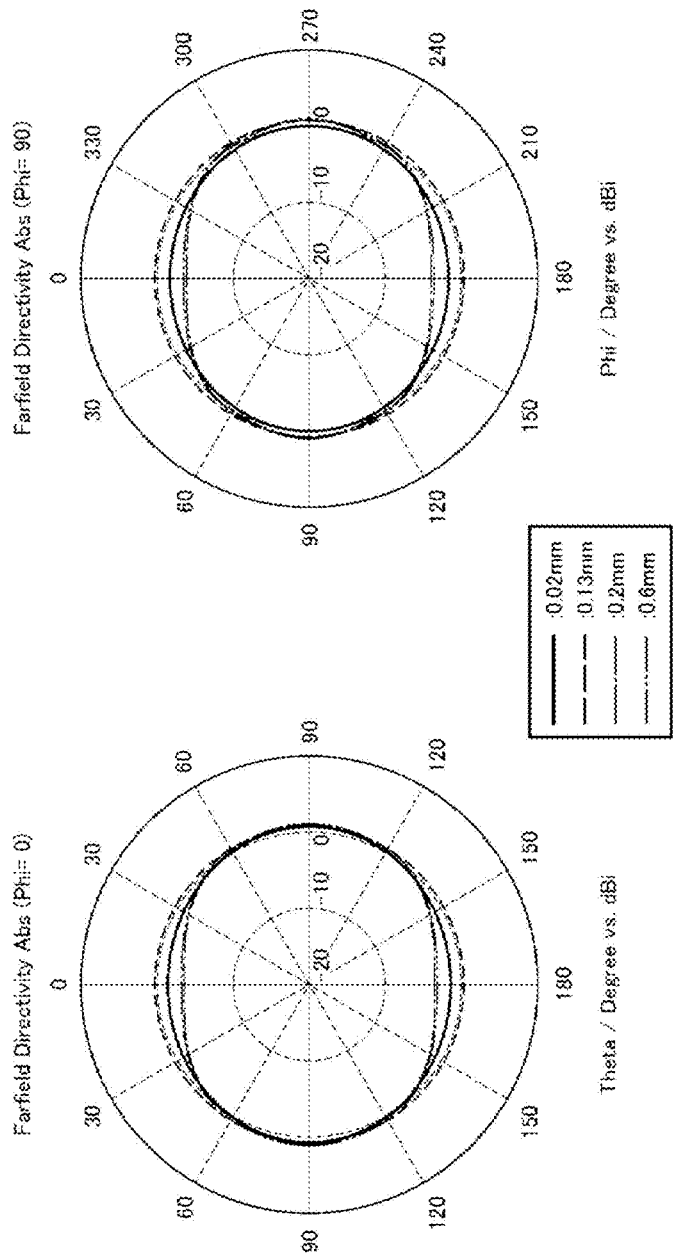
[FIG. 20]

[FIG. 21]
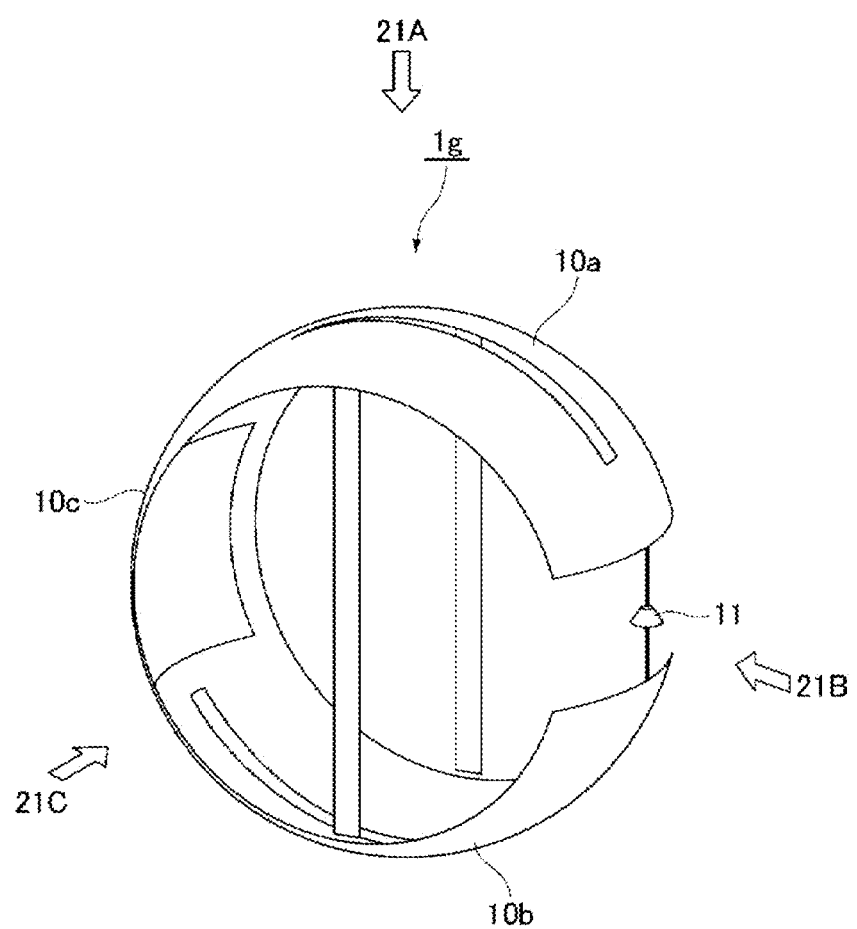

[FIG. 22]
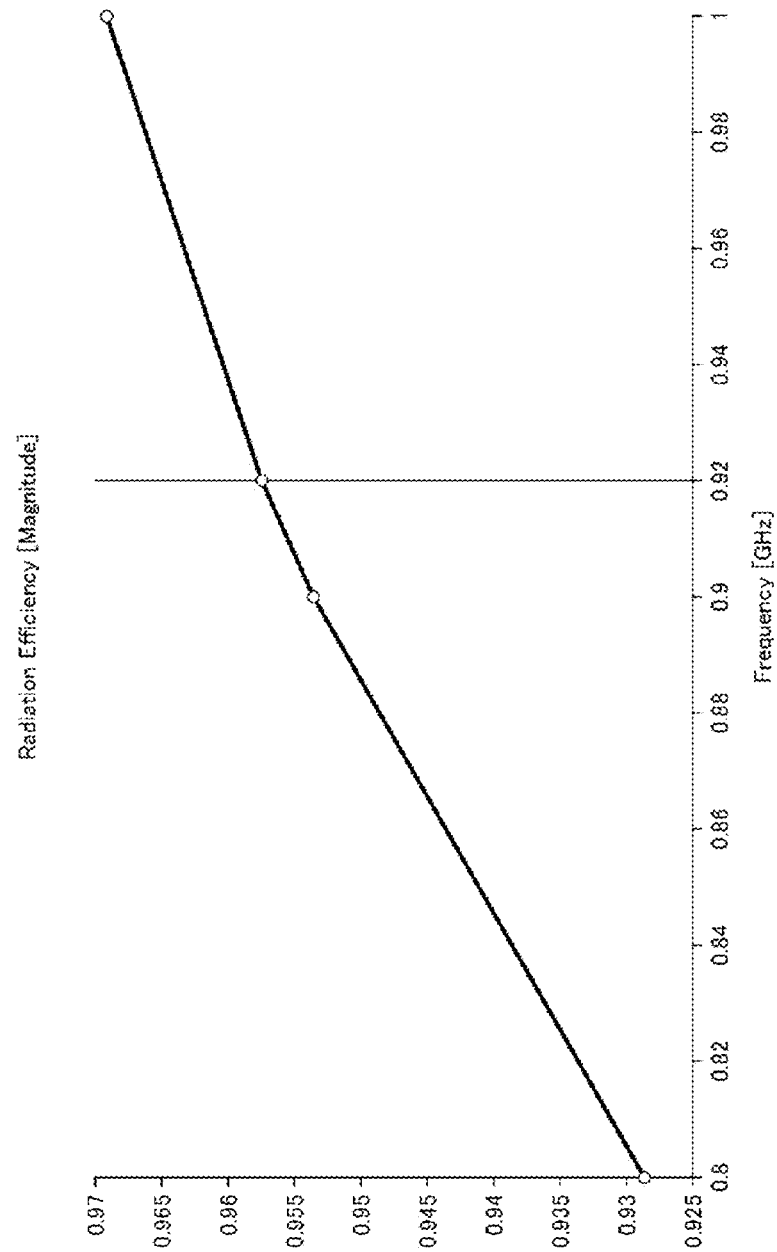

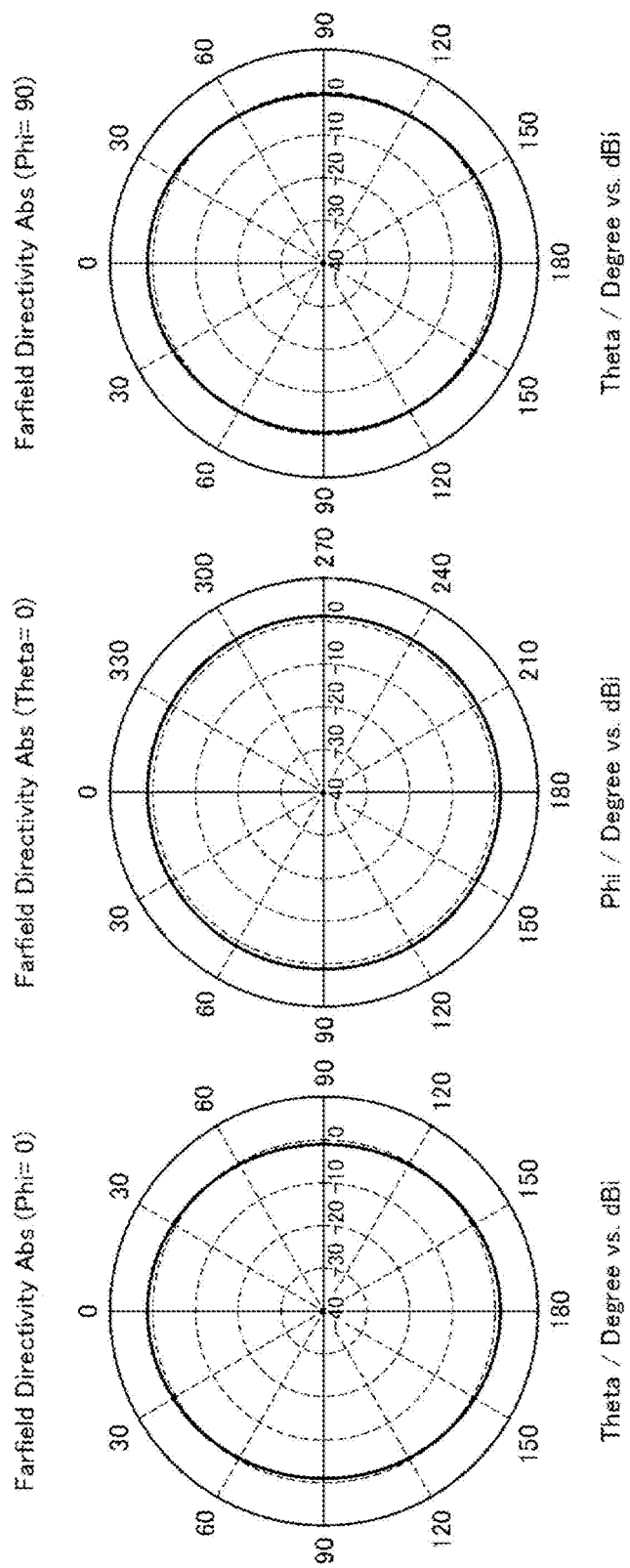
[FIG. 23]

[FIG. 24]
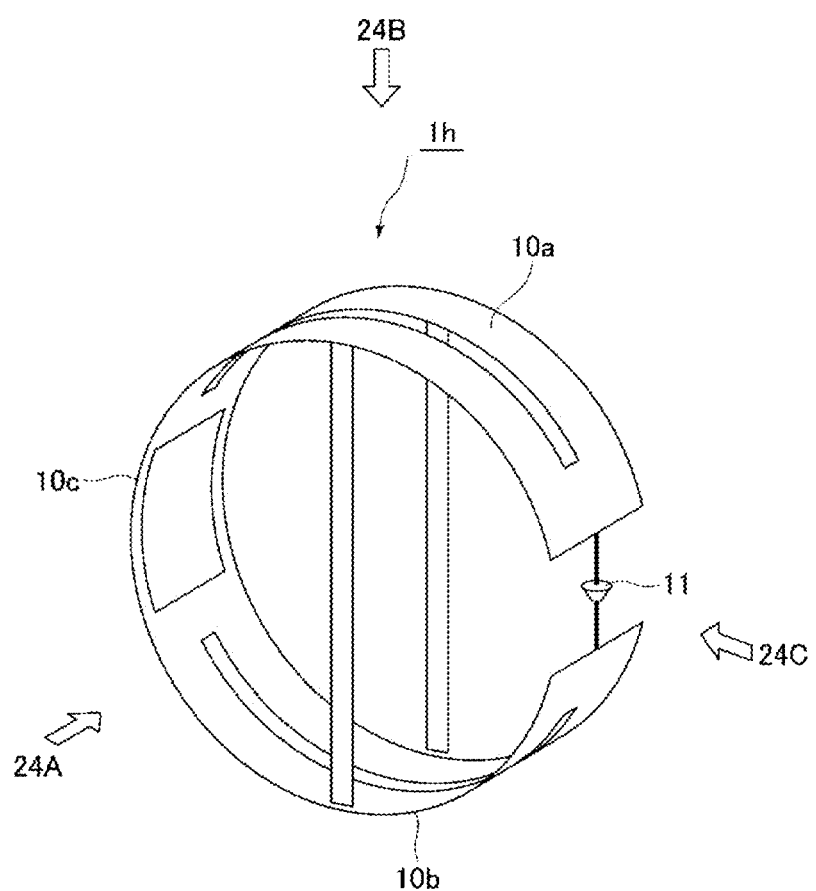

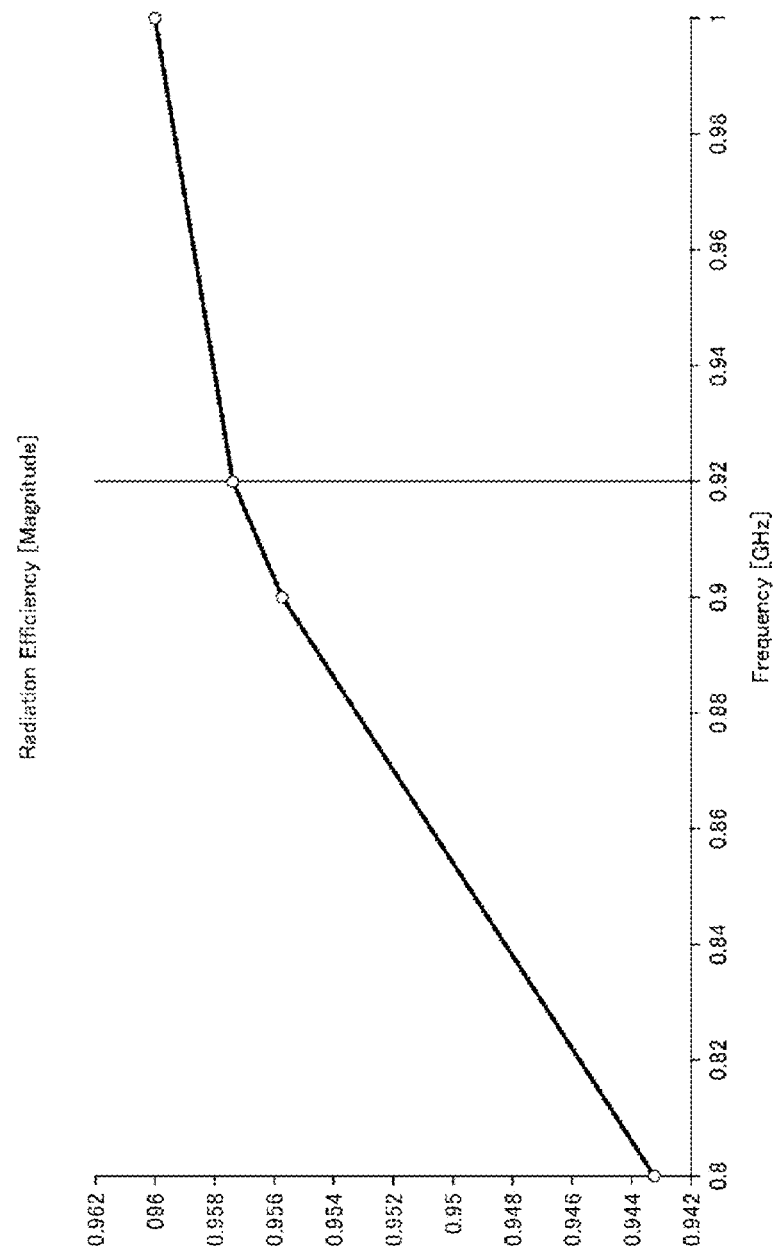
[FIG. 25]

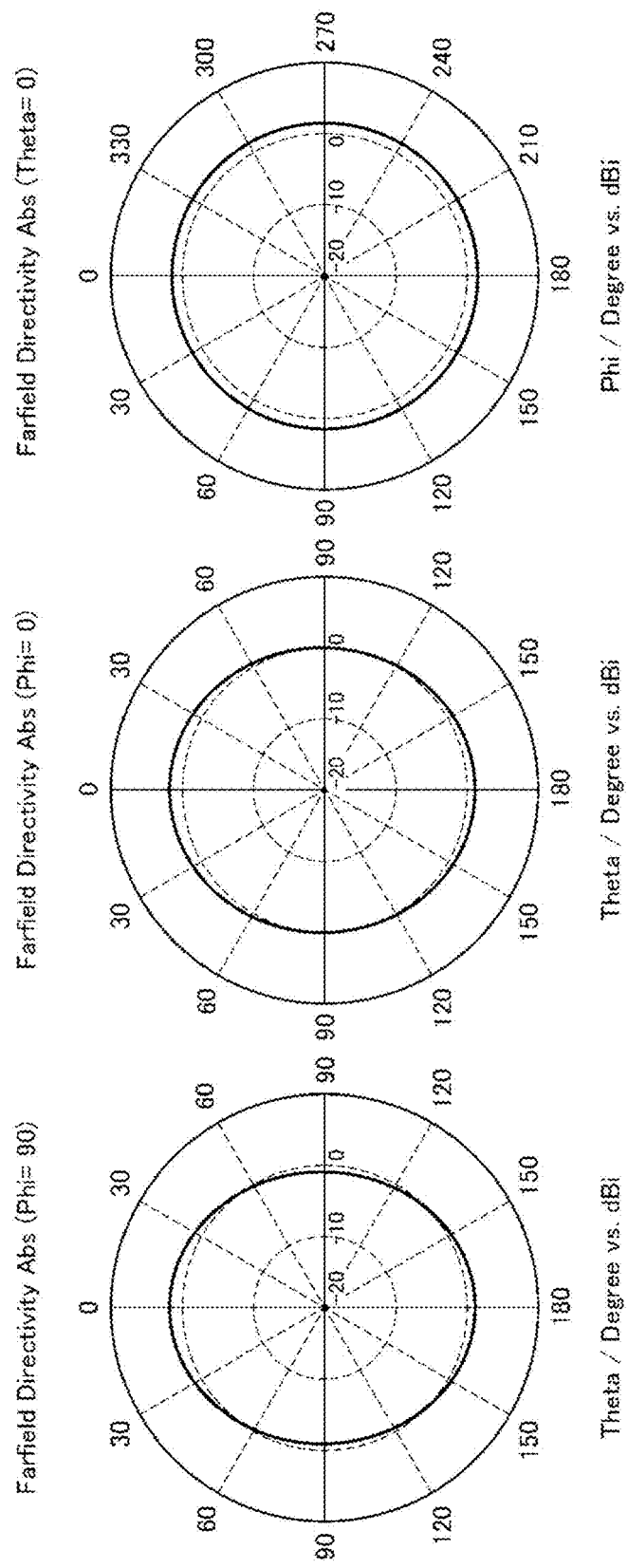
[FIG. 26]

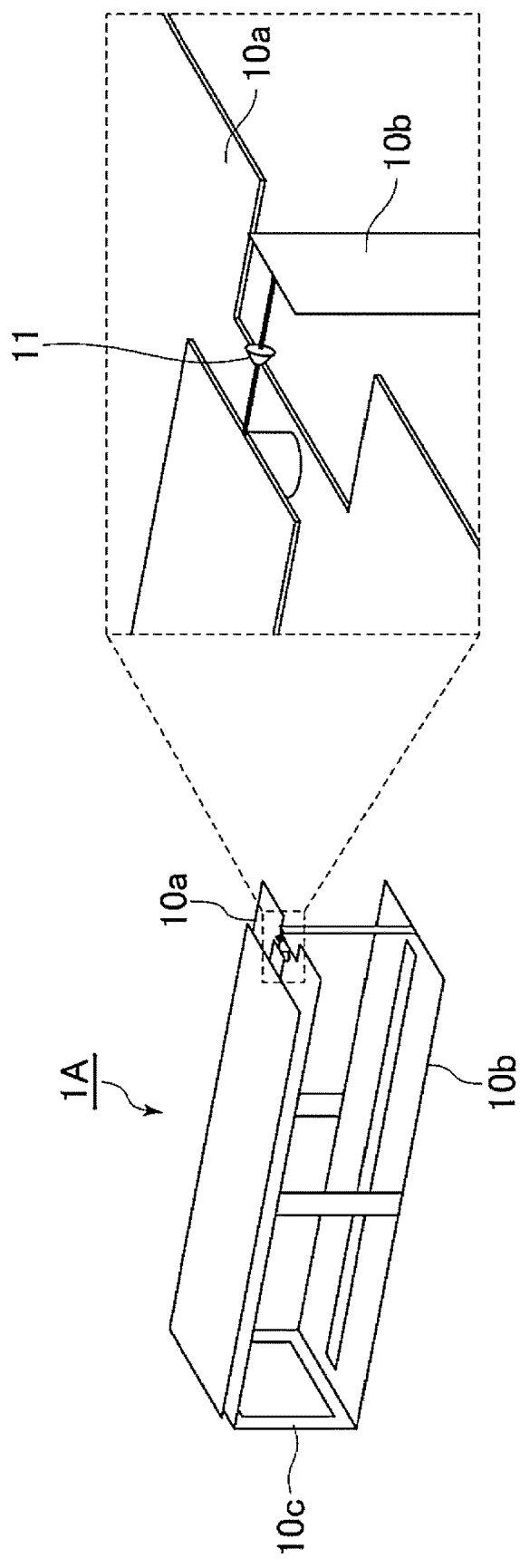
[FIG. 27]

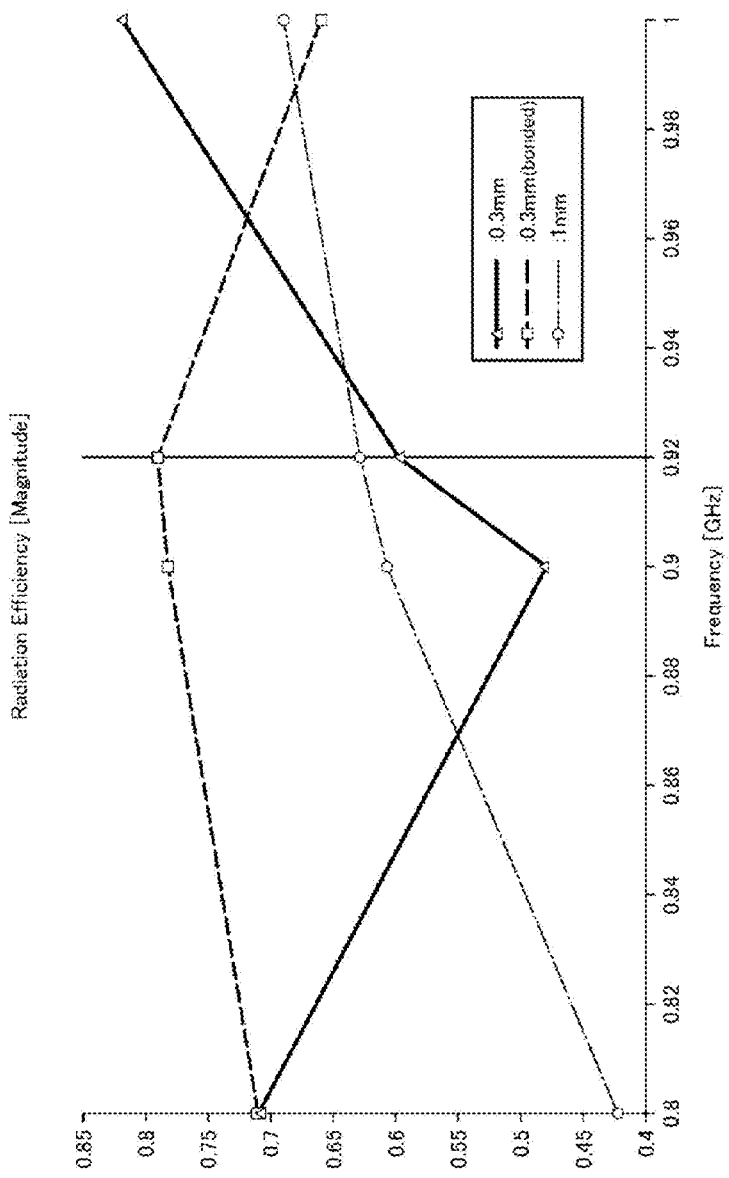
[FIG. 28]

[FIG. 29]
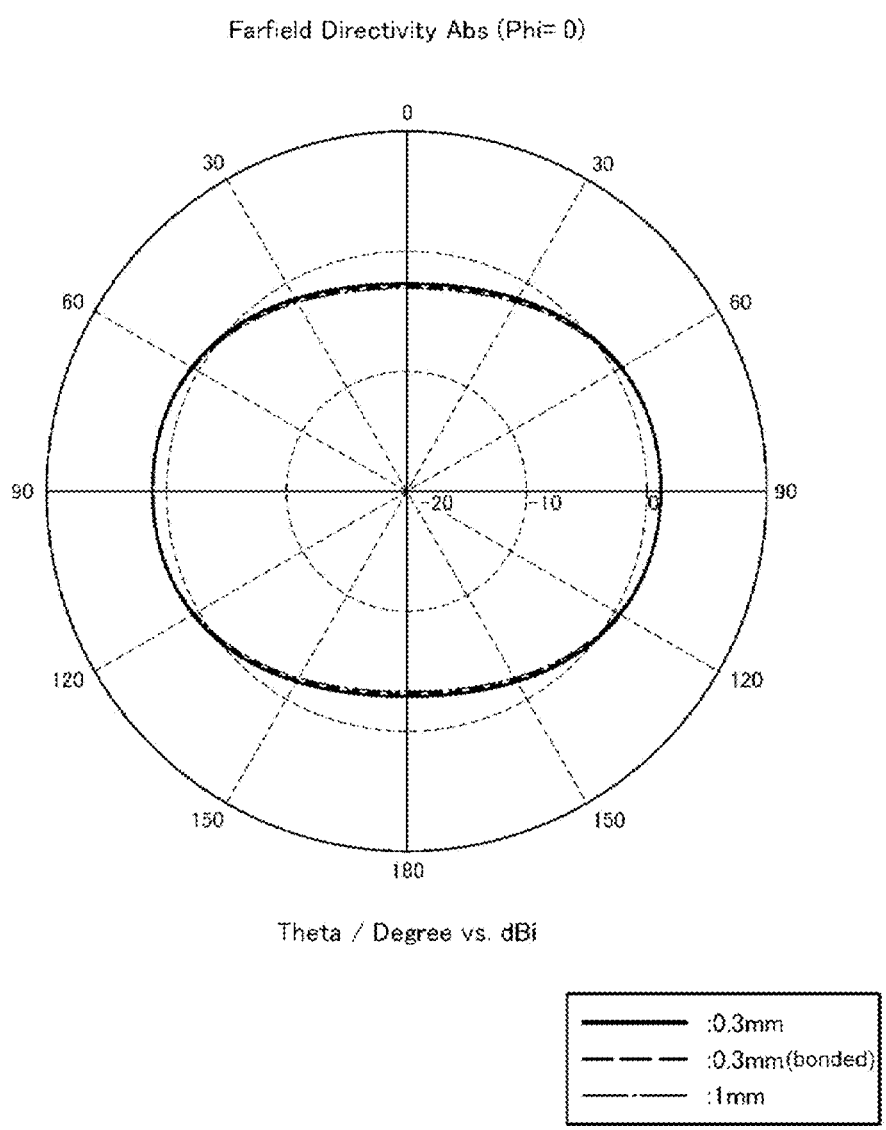

【FIG. 30】
(a)
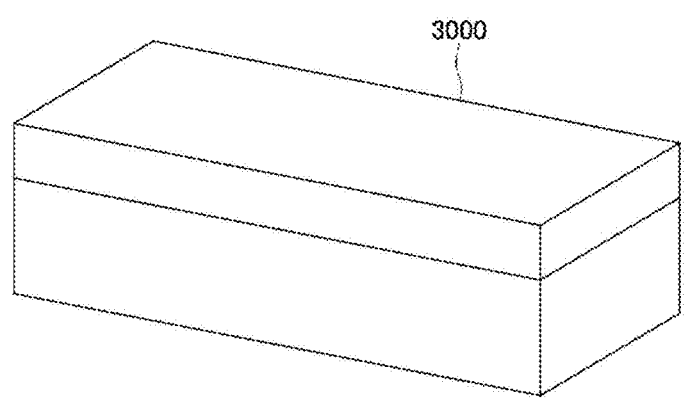
(b)
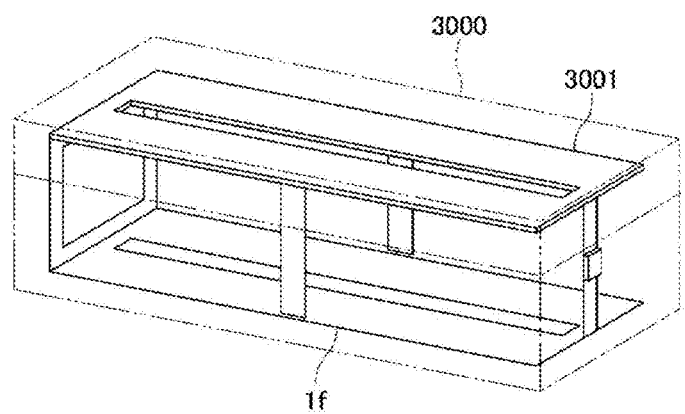

[FIG. 31]
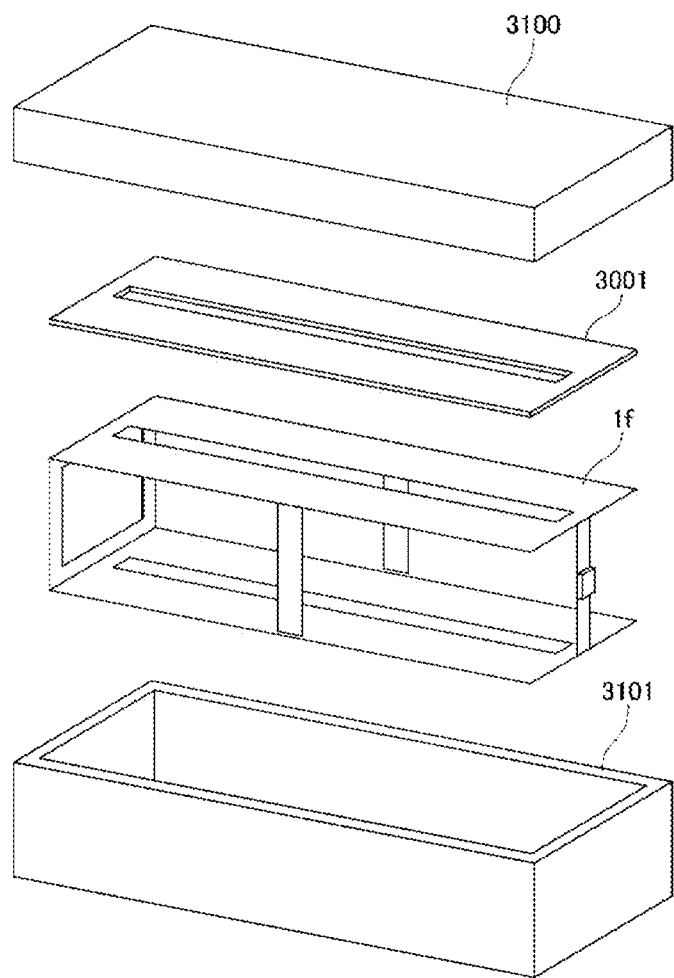

【FIG. 32】
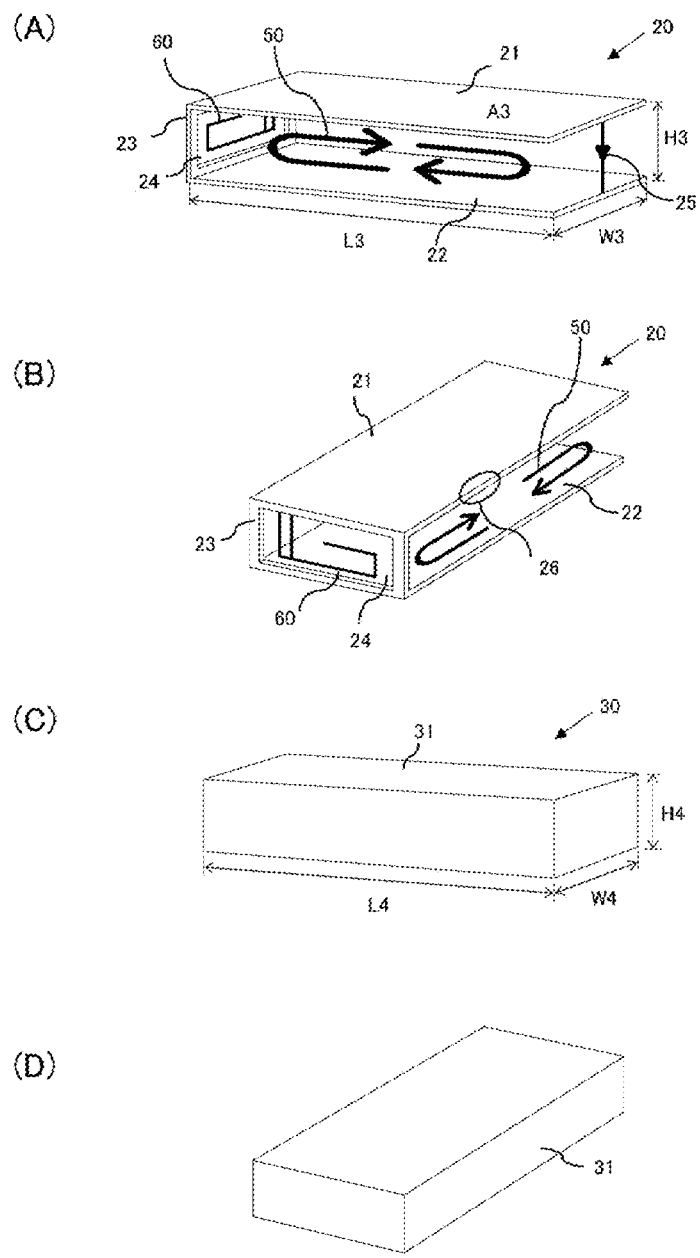

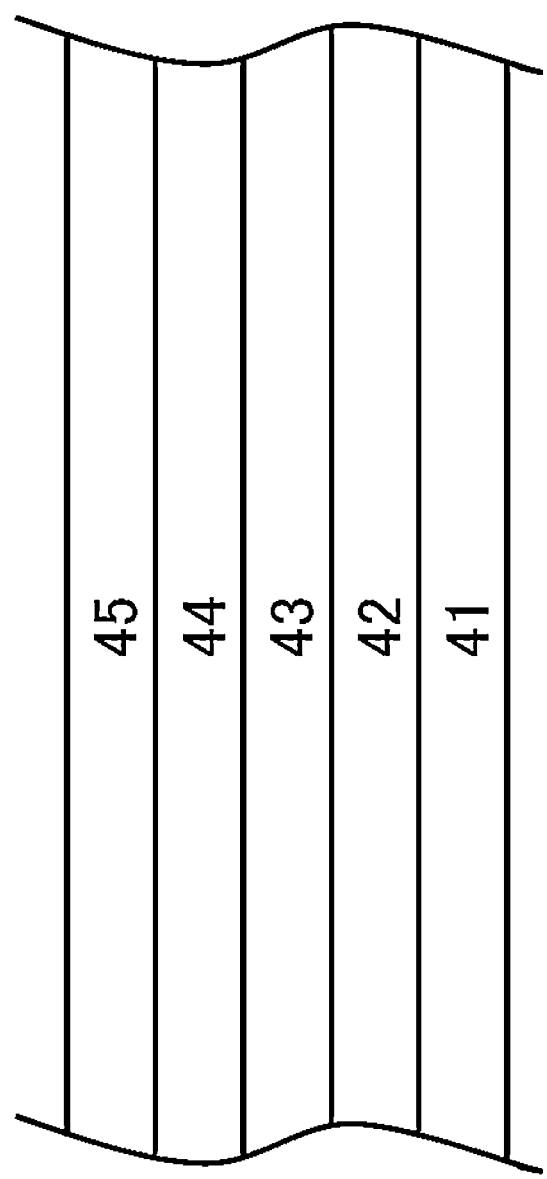
[FIG. 33]

[FIG. 34]
(A)
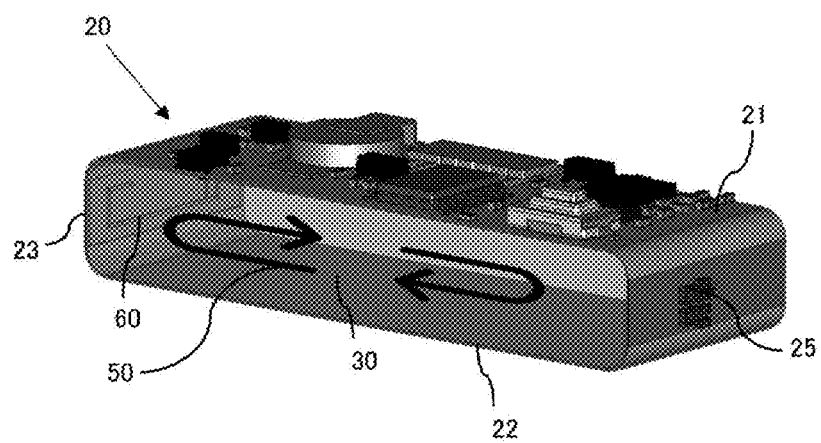
(B)
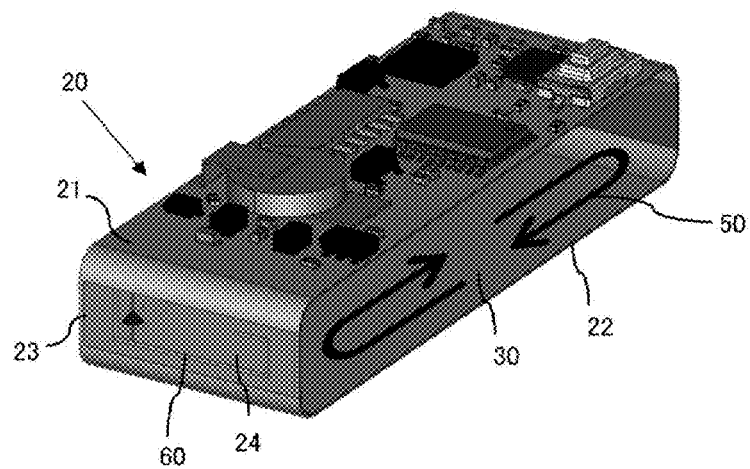

[FIG. 35]
(A)
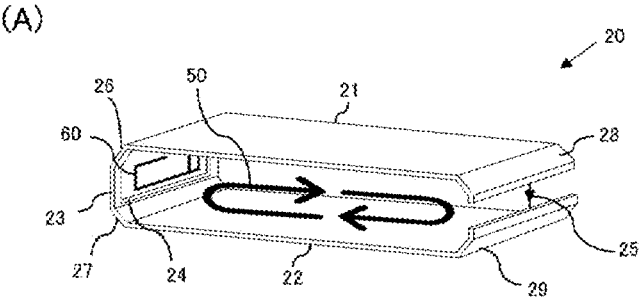
(B)
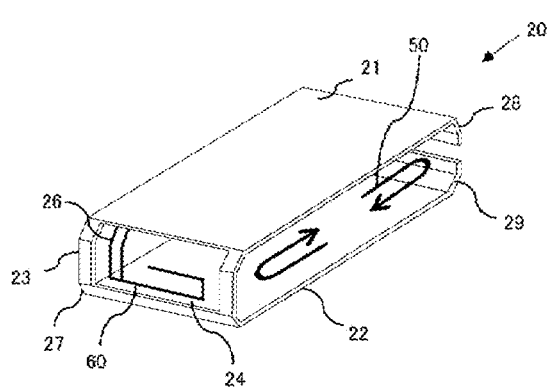
(C)
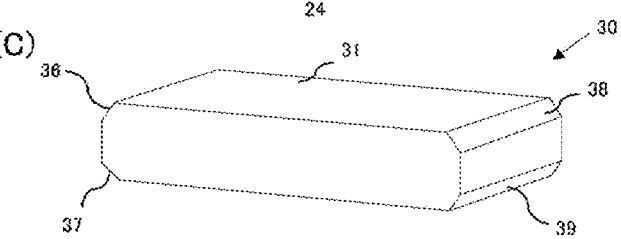
(D)
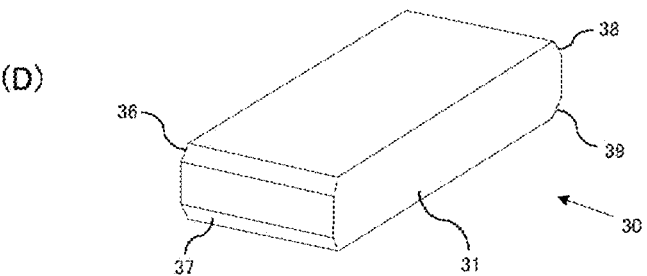

[FIG. 36]
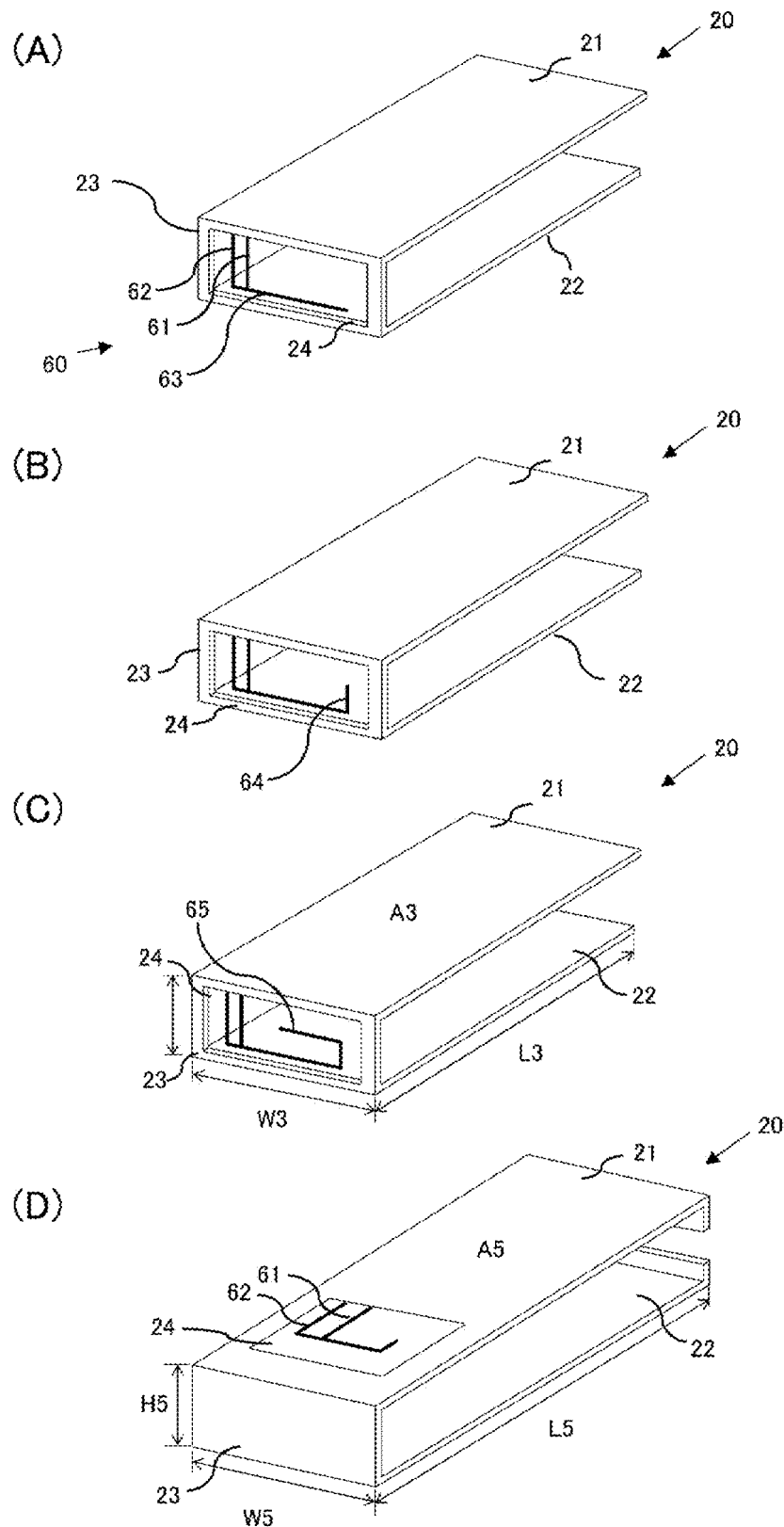

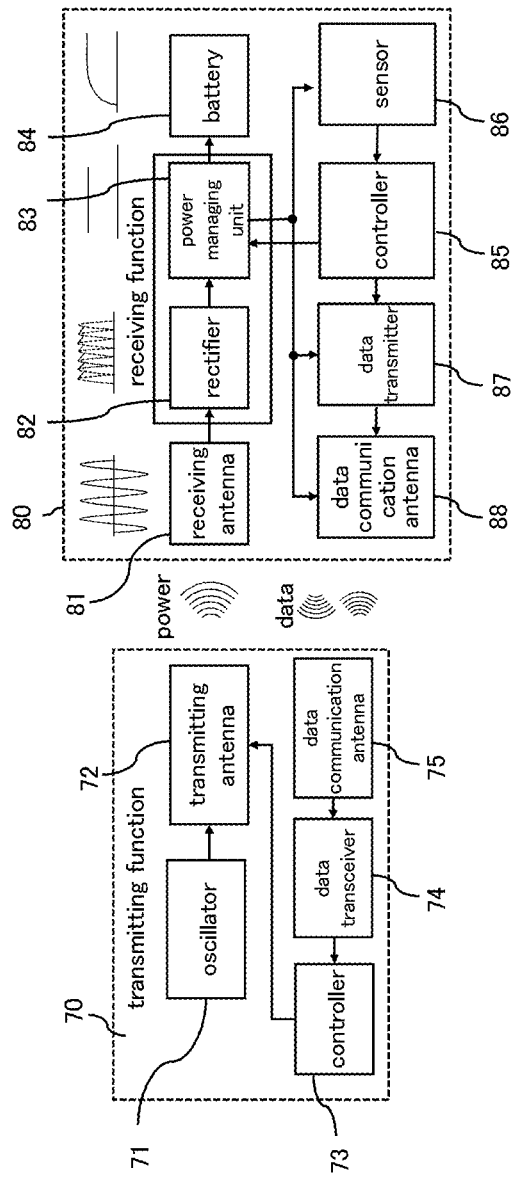
[FIG. 37]

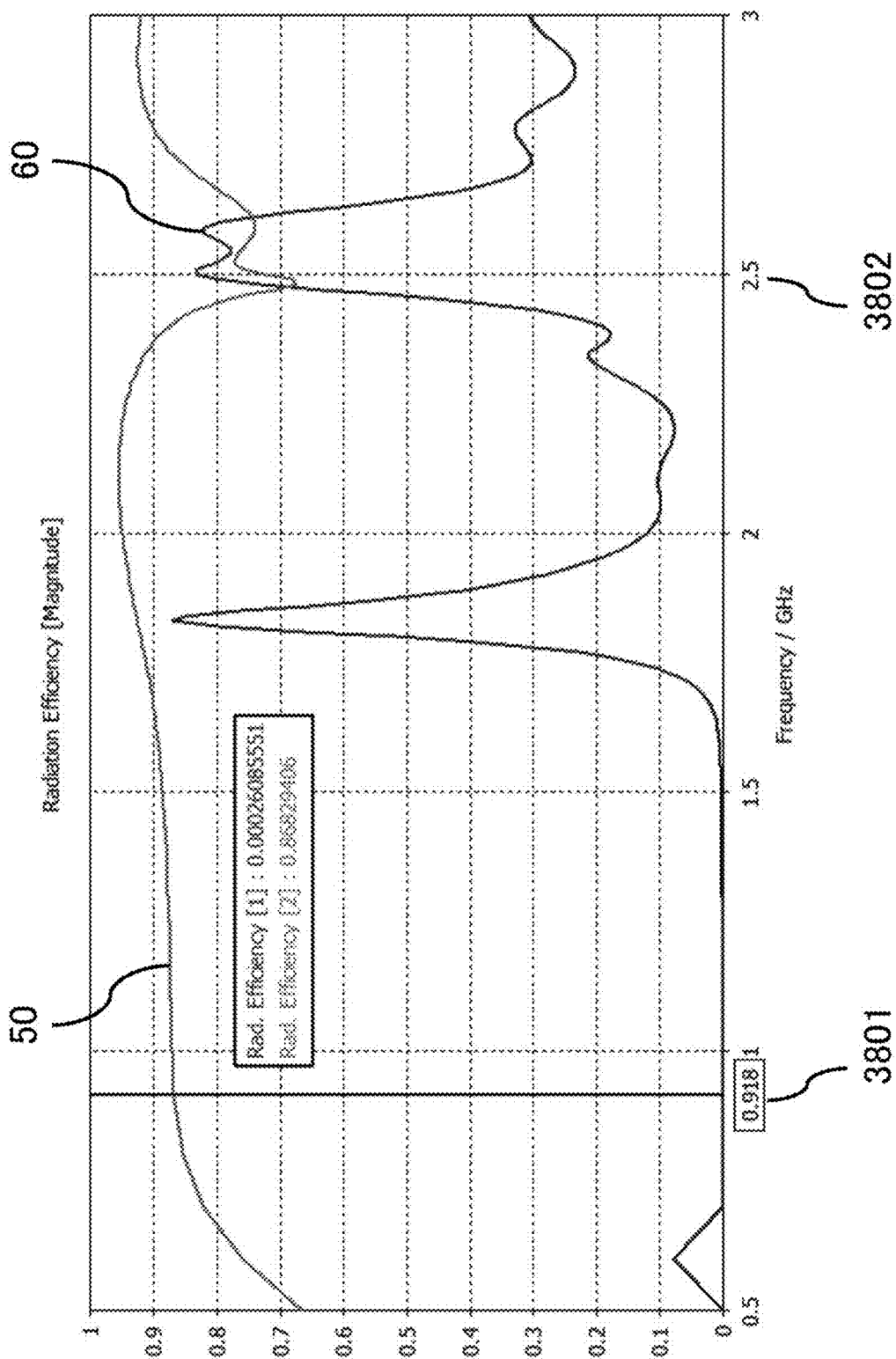
[FIG. 38]

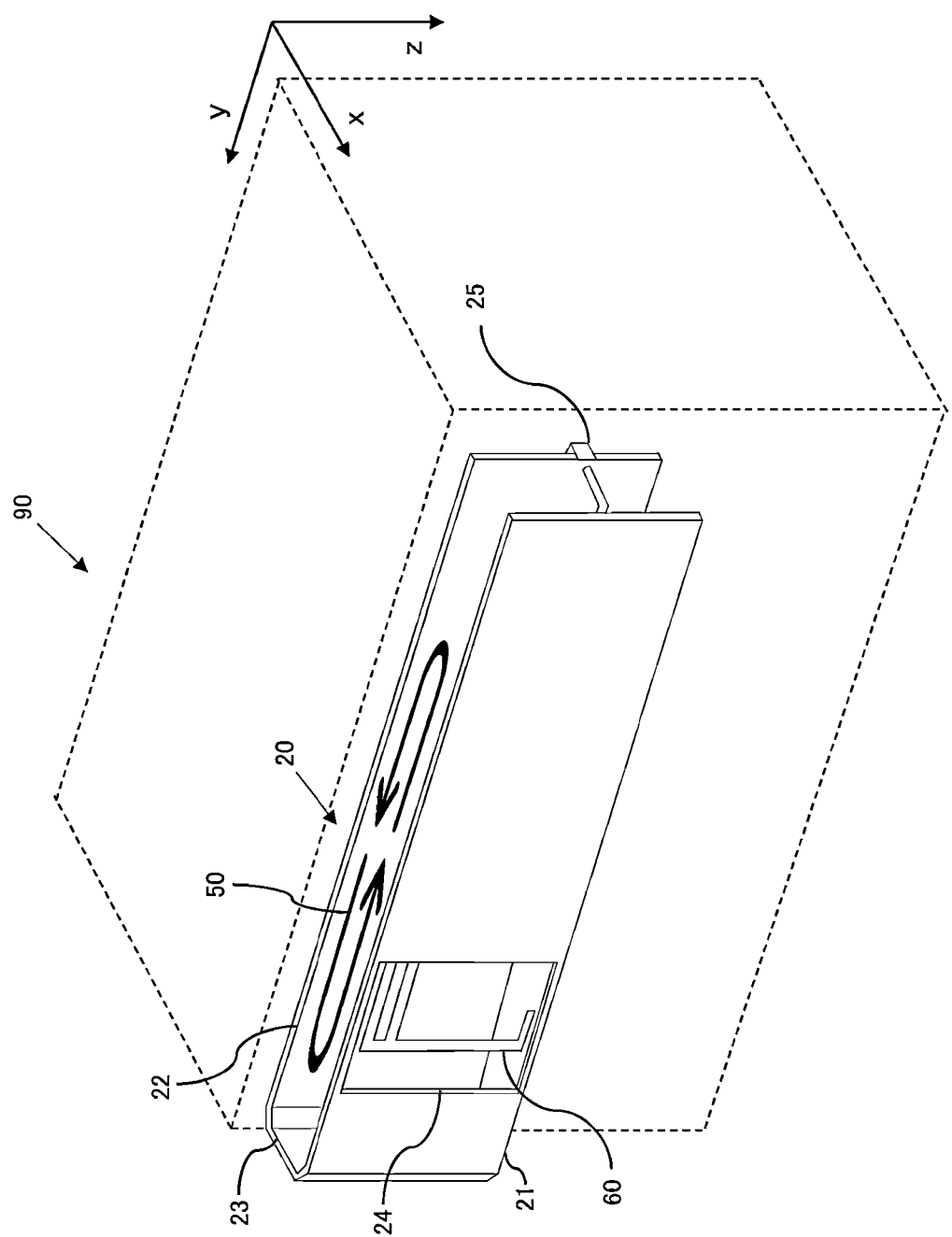
[FIG. 39]

[FIG. 40]
(A)
(B)
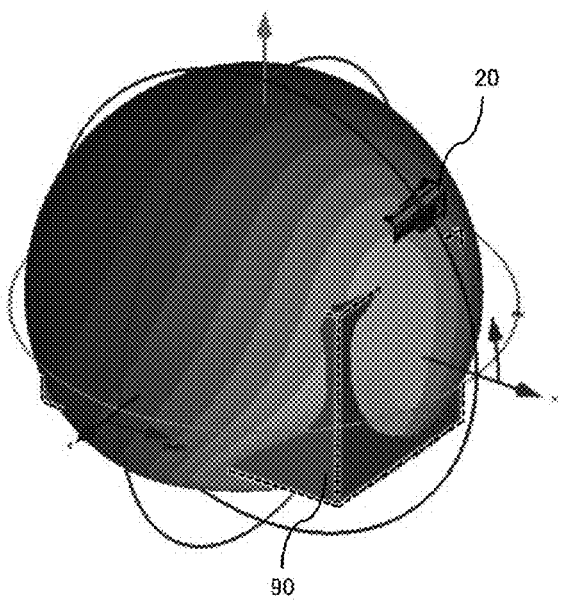

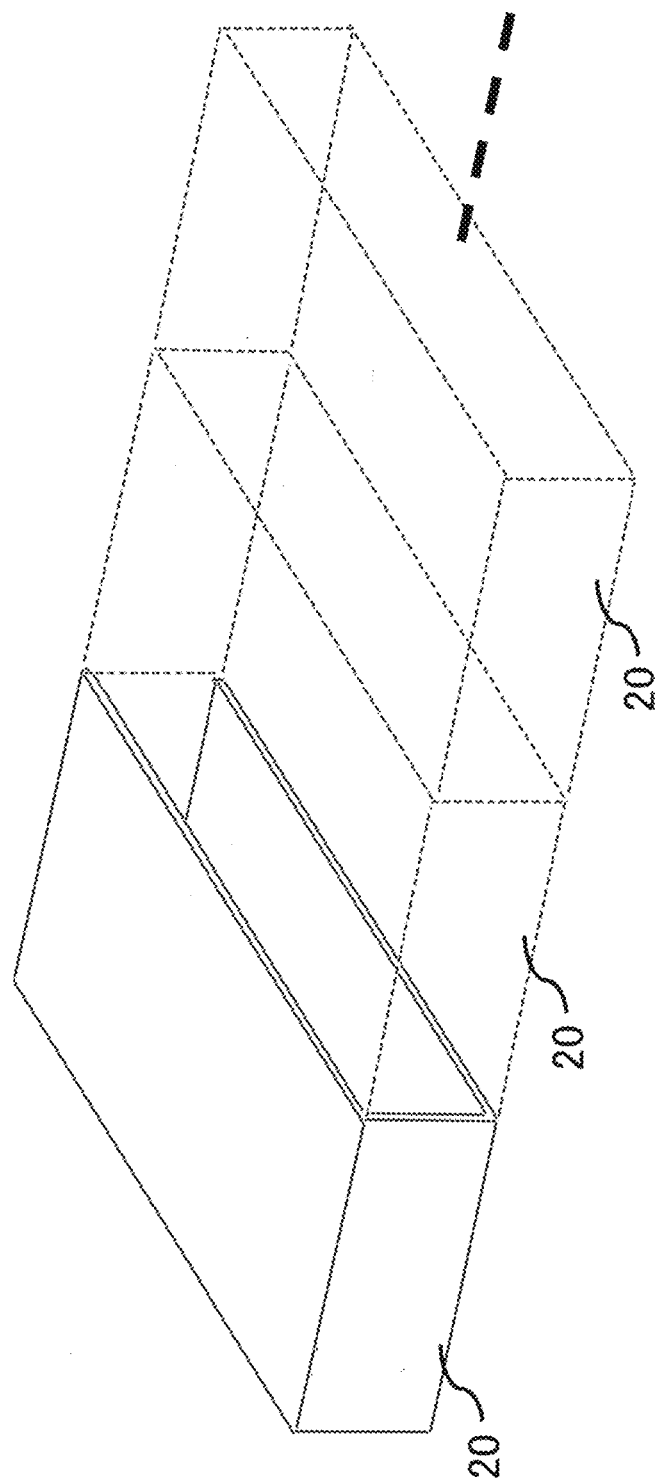
[FIG. 41]

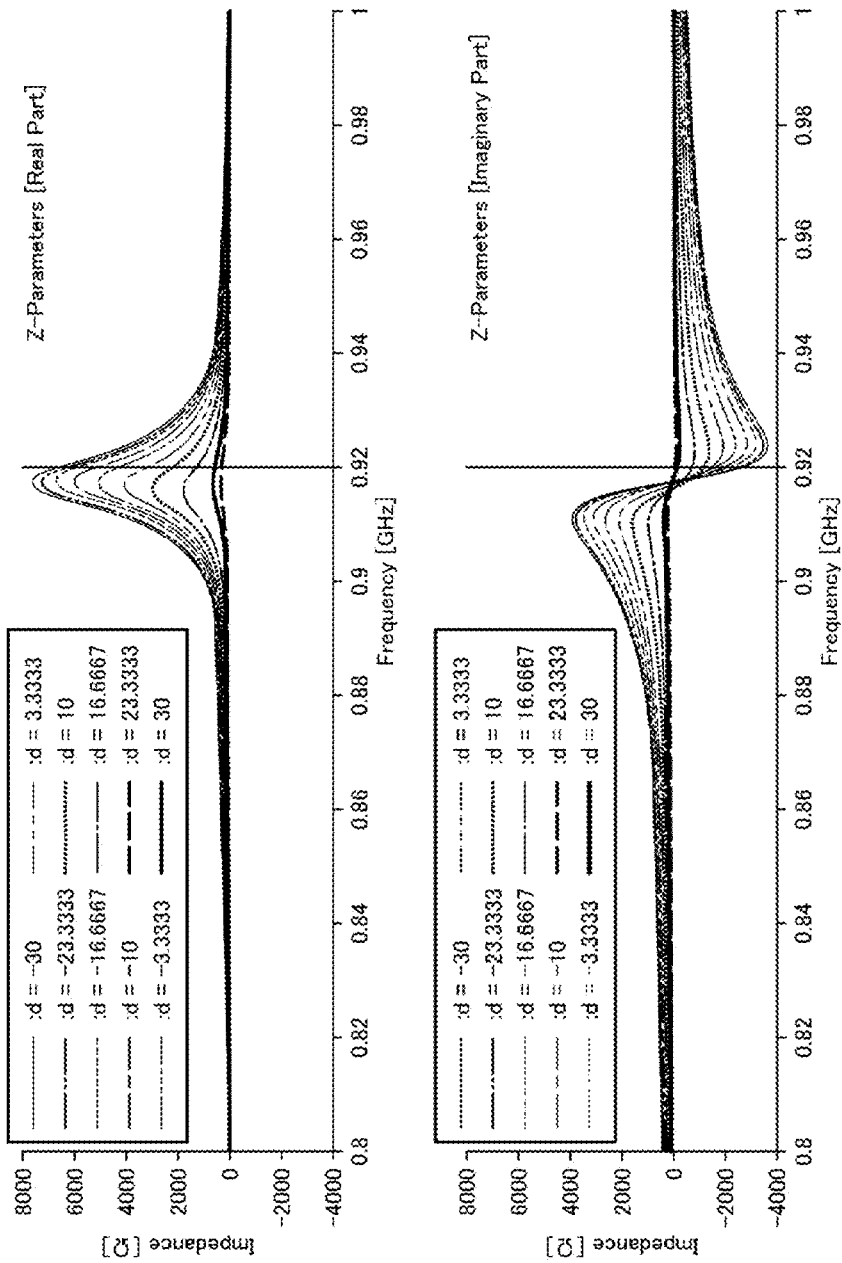
[FIG. 42]

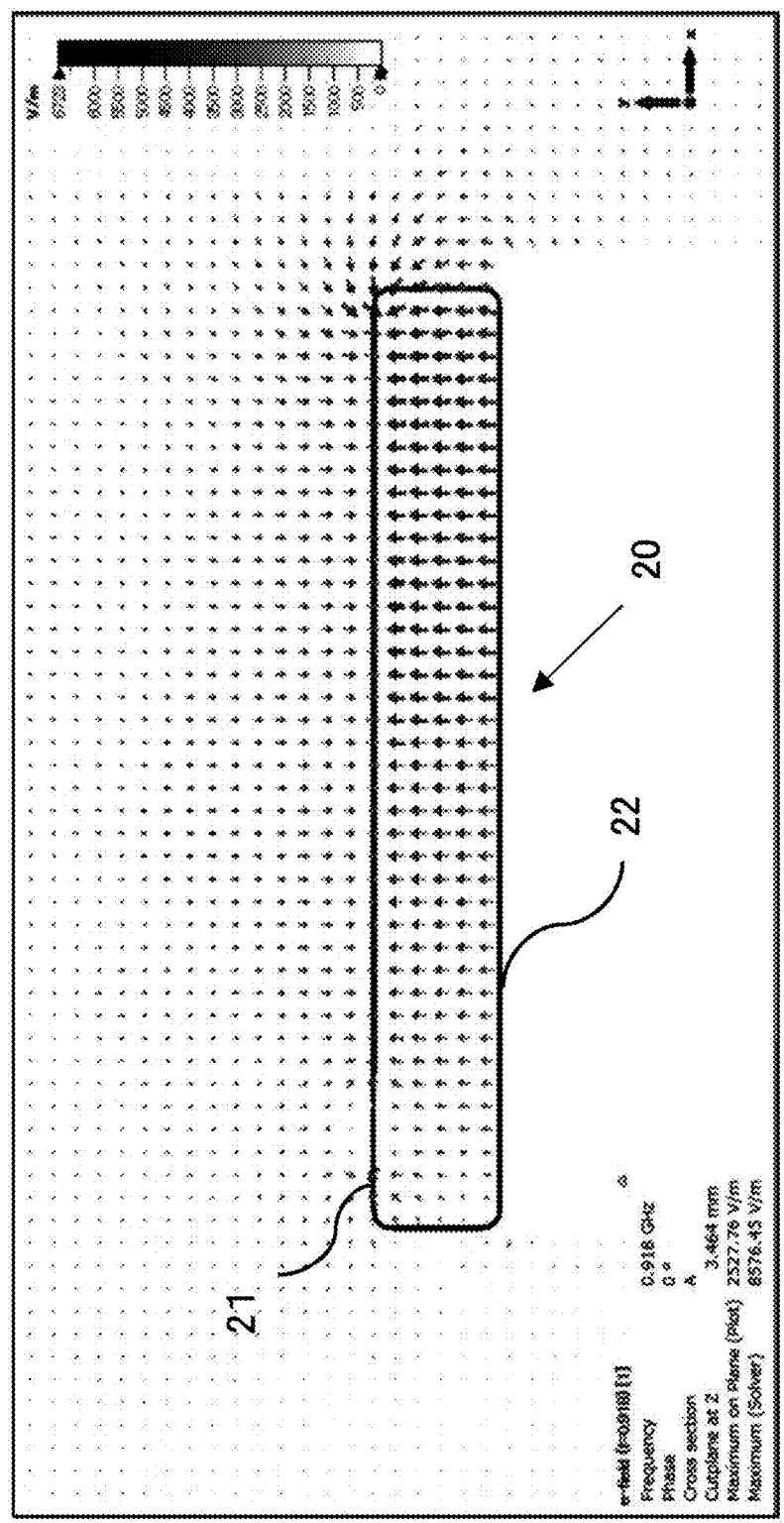
[FIG. 43]

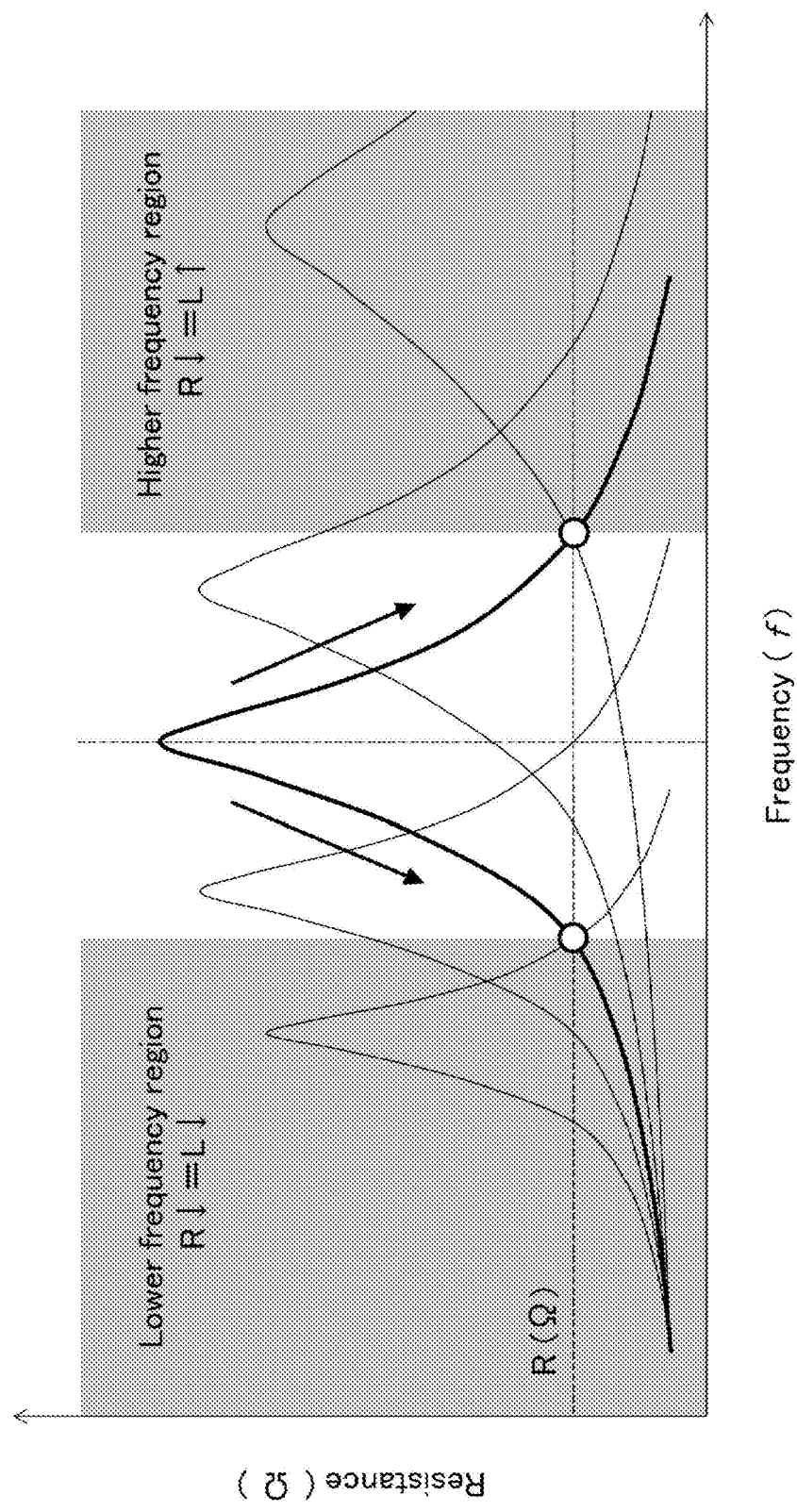
[FIG. 44]

POWER RECEIVING ANTENNA

CROSS-REFERENCE TO RELATED APPLICATION

This application claims priority to International Application No. PCT/JP2021/039559, entitled "POWER RECEIVING ANTENNA," filed on Oct. 26, 2021, and the contents of which is incorporated herein by reference in its entirety.

This disclosure relates to a power receiving antenna for receiving electric power fed wirelessly.

BACKGROUND

Recently, in order to charge and operate various kinds of electronic devices, electric power is fed to them without using wires. According to the below-mentioned Patent Document 1 and Patent Document 2, configurations of power receiving antennas for feeding electric power wirelessly are disclosed.

PRIOR ART DOCUMENTS

[Patent Document 1] JP2016-025502A
[Patent Document 2] JP2020-184718A

SUMMARY

In recent years, various kinds of IoT devices have been developed and used, and many of such IoT devices are configured to be used as various kinds of sensor devices. These sensor devices are desired to be operated for a long period of time. However, temporal restriction is imposed when such a device is driven using a battery. On this point, electric power required for actually operating a sensor device is not so large, and a device may be performed sufficiently even when electric power is fed wirelessly. Accordingly, it is preferably to efficiently receive electric power which is transmitted without using wires, and thus it is desired to develop a power receiving antenna which is capable of efficiently receiving electric power. In addition, from a point of view of a sensor or a similar device, it is required to feed electric power to a sensor and operate it even when the sensor is away from a power transmitting device. According to the power receiving antenna disclosed in the Patent Document 1, a power transmitting device is required to be provided at a location closer to the power receiving antenna. In addition, when the power receiving antenna is mounted on various kinds of devices, the power receiving antenna is required to be in matching with various kinds of shapes.

Therefore, an object of the present disclosure is to provide a power receiving antenna capable of efficiently receiving electric power which is transmitted from a power transmitting device located distantly from the power receiving antenna, and capable of reducing a size of the power receiving antenna in a certain range.

In order to solve the above-mentioned problems, for example, the configurations described in the claims can be adopted.

Although the present application includes a plurality of means for solving the above-mentioned problems, for example, according to an embodiment, a power receiving antenna is provided. The power receiving antenna is configured to include; a first conductive plate; a second conductive plate that faces the first conductive plate; a feeder connecting a first end portion of the first conductive plate and a second end portion of the second conductive plate facing the first end portion; and a conductive member connecting a first other end portion opposite to the first end portion and a second other end portion opposite to the second end portion.

According to another embodiment of the power receiving antenna, the conductive member may be a plate-shaped member connecting the first other end portion of the first conductive plate and the second other end portion of the second conductive plate.

According to another embodiment of the power receiving antenna, the first conductive plate, the second conductive plate, and the plate-shaped conductive member may be integrally formed.

According to another embodiment of the power receiving antenna, the first conductive plate, the second conductive plate, and the plate-shaped conductive member may be formed by bending a single conductive plate.

According to another embodiment of the power receiving antenna, the single conductive plate may have a cutout extending within a predetermined distance from an end portion of the single conductive plate.

According to another embodiment of the power receiving antenna, a center portion in a longitudinal direction of the first conductive plate may be formed in a step shape to project toward the second conductive plate, and a middle part in a longitudinal direction of the second conductive plate may be formed in a step shape to project toward the first conductive plate.

According to another embodiment of the power receiving antenna, the plate-shaped conductive member may have a cutout extending within a predetermined distance from an end portion of the plate-shaped conductive member.

According to another embodiment of the power receiving antenna, the first conductive plate and the second conductive plate may have a slot.

According to another embodiment of the power receiving antenna, a part of the first conductive plate may be a protrusion that protrudes toward the second conductive plate from a substantially center of an end portion in a width direction of the first conductive plate.

According to another embodiment of the power receiving antenna, a tip of the protrusion and the second conductive plate may be separated by a gap.

Effect of the Invention

A power receiving antenna used for wireless power feeding, according to an embodiment, is capable of efficiently receiving electric power based on its shape, and is capable of supplying electric power to an arbitrary device to which the power receiving antenna is connected.

BRIEF DESCRIPTION OF THE DRAWINGS

FIG. 1 is a diagram illustrating a configuration example of an antenna according to the present invention.

FIG. 2 is an example of a graph indicating trends of radiation efficiency according to a communication frequency of the antenna illustrated in FIG. 1.

FIG. 3 is an example of a graph indicating trends of S-parameter according to a communication frequency of the antenna illustrated in FIG. 1.

FIG. 4 is an example of a graph indicating trends of radiation efficiency according to a communication frequency when the size of plate of the antenna illustrated in FIG. 1 is changed.

FIG. 5 is an example of a graph indicating trends of radiation efficiency according to a communication frequency of the antenna having a size different from that of the antenna illustrated in FIG. 1.

FIG. 6 is an example of a graph indicating trends of S-parameter according to a communication frequency of the antenna having a size different from that of the antenna illustrated in FIG. 1.

FIG. 7 is an example of a graph indicating trends of each S-parameter according to a communication frequency of the antenna having a size different from that of the antenna illustrated in FIG. 1.

FIG. 8 is an example of a graph indicating trends of S-parameter in the vertical direction according to a communication frequency of the antenna having a size different from that of the antenna illustrated in FIG. 1.

FIG. 9 is an example of a graph indicating trends of radiation efficiency according to a communication frequency of the antenna having a size different from that of the antenna illustrated in FIG. 1.

FIG. 10 is an example of a graph indicating a relationship between the size of the antenna in the plane direction and the radiation efficiency.

FIG. 11 is a diagram illustrating another antenna having a configuration different from that of the antenna illustrated in FIG. 1.

FIG. 12 is an example of a graph (upper side of the figure) indicating trends of radiation efficiency according to a communication frequency when the height of the antenna is changed; and an example of a graph (lower side of the figure) indicating trends of radiation efficiency according to a communication frequency when the width of the antenna is changed FIG. 13 is a diagram illustrating antenna patterns (directivities) when the height of the antenna is changed.

FIG. 14 is a diagram illustrating configuration examples (a) to (f) of various antennas.

FIG. 15 is an example of an antenna illustrated in FIG. 14(f) and a partially enlarged view thereof.

FIG. 16 is an example of a graph indicating trends of radiation efficiency according to a communication frequency of each antenna illustrated in FIG. 14.

FIG. 17 is a diagram illustrating antenna patterns (directivities) of each antenna illustrated in FIG. 14.

FIG. 18 is a diagram to explain how the antenna illustrated in FIG. 14(f) functions as a composite antenna.

FIG. 19 is a diagram illustrating another antenna having a configuration different from that of the antenna illustrated in FIG. 1.

FIG. 20 is a diagram illustrating antenna patterns (directivities) when the gap between the protrusion of the antenna and the second conductive plate illustrated in FIG. 14(f) is changed.

FIG. 21 is a diagram illustrating a configuration example of an antenna when it is configured in a spherical shape.

FIG. 22 is an example of a graph indicating trends of radiation efficiency according to a communication frequency of the antenna illustrated in FIG. 21.

FIG. 23 is a diagram illustrating antenna patterns (directivities) of the antenna illustrated in FIG. 21.

FIG. 24 is a diagram illustrating a configuration example of an antenna when it is configured in a columnar shape.

FIG. 25 is an example of a graph indicating trends of radiation efficiency according to a communication frequency of the antenna illustrated in FIG. 24.

FIG. 26 is a diagram illustrating antenna patterns (directivities) of the antenna illustrated in FIG. 24.

FIG. 27 is a diagram illustrating a configuration example of an antenna when a power receiving circuit is provided on one of the conductive plates.

FIG. 28 is an example of a graph indicating trends of radiation efficiency according to a communication frequency of the antenna illustrated in FIG. 27.

FIG. 29 is a diagram illustrating antenna patterns (directivities) of the antenna illustrated in FIG. 27.

FIG. 30 is a diagram illustrating an example of a use mode of the antenna according to the present embodiment.

FIG. 31 is an example of an exploded perspective view of the package illustrated in FIG. 30.

FIG. 32 is an example of a diagram illustrating a basic configuration of an antenna according to a second embodiment and a core member applicable therein.

FIG. 33 is an example of a cross-sectional configuration of the first conductive plate illustrated in FIG. 32 (B).

FIG. 34 is a diagram illustrating an implementation example of the antenna according to the second embodiment.

FIG. 35 is an example of a diagram illustrating a modification of the antenna and the core member applicable therein.

FIG. 36 is an example of a diagram illustrating a modification of the antenna which functions at a frequency of about 920 MHz.

FIG. 37 is an example of a diagram illustrating an implementation example in which electric power is supplied to a sensor using the antenna according to the second embodiment.

FIG. 38 is an example of a graph indicating simulation results of radiation efficiencies of two antennas.

FIG. 39 is a diagram illustrating an implementation in which electric power is supplied to a sensor provided in a device using the antenna according to the second embodiment.

FIG. 40 is an example of a graph indicating simulation results of receiving intensities of two antennas.

FIG. 41 is a conceptual diagram to explain how a plurality of antennas are efficiently manufactured.

FIG. 42 is an example of a graph indicating trends of impedance (Z parameter) according to a communication frequency of the antenna illustrated in FIG. 1.

FIG. 43 is an example diagram illustrating a simulation result of an electric field of the antenna.

FIG. 44 is a conceptual diagram to explain a relationship between frequency and impedance.

DETAILED DESCRIPTION

Hereinafter, a power receiving antenna for receiving electric power wirelessly (for feeding electric power wirelessly) according to the present embodiment will be described with reference to the drawings.

Embodiment 1

An antenna 1 according to the present embodiment is, as illustrated in FIG. 1, configured as a power receiving device for receiving electric power wirelessly. The antenna 1 is configured to include a first conductive plate 10a in a shape of an elongated plate and a second conductive plate 10b in a shape of an elongated plate which are facing each other. The first conductive plate 10a and the second conductive plate 10b are connected by a feeder 11 (which is, for example, a rectifier) at an end portion of each of them and also are connected by a conductive member 10c (which is, for example, a short-pin) at an end portion of each of them. The antenna 1 is capable of operating in a frequency band of 920 MHz ("MHz" is an abbreviation of "megahertz") for receiving electric power wirelessly. Please notice that, the communication band to be used is not particularly limited to the above-mentioned frequency band of 920 MHz. For example, the communication band to be used may be such as for example, 2.4 GHz ("GHz" is an abbreviation of "gigahertz"), or such as 5.7 GHz. Hereafter, the communication band to be used is exemplified as 920 MHz.

The antenna 1 is configured as a power receiving antenna to perform long-distance wireless power feeding. The antenna 1 may be used to receive and feed electric power (or charging power) to an IoT device of an arbitrary kind so as to operate it. The antenna 1 may be mounted on or connected to a device of an arbitrary kind. It is preferable that the antenna 1 is capable of coping with various shapes and sizes of devices as much as possible. According to the antenna 1, the antenna may be inductive and the feeder 11 (which is, for example, a rectifier) may be capacitive. Accordingly, the antenna 1 may function as a high-efficiency power receiving antenna by achieving a matching, without using an impedance matching circuit having a loss.

Each of the first conductive plate 10a and the second conductive plate 10b is formed in a shape of a thin flat plate having a length L1 and a width W1. With referring to FIG. 1, for example, the width W1 is made to be 15 mm, the length L1 is made to be 40 mm, and a distance H1 between the two thin plates is made to be 10 mm.

In FIG. 1, it is illustrated that the conductive member 10c may be formed in a rod shape. However, the shape of the conductive member 10c is not particularly limited to the rod shape as long as the conductive member 10c is capable of connecting the first conductive plate 10a and the second conductive plate 10b. For example, the conductive member 10c may be formed in a shape of a plate. Each of the first conductive plate 10a, the second conductive plate 10b and the conductive member 10c may be formed by using an arbitrary material (such as copper, aluminum, or the like) which is capable of efficiently sending a current of electricity therethrough.

The feeder 11 is a so-called a feed line and is provided at an end side of the antenna 1 so as to connect the first conductive plate 10a and the second conductive plate 10b. That is, the feeder 11 is connected to an end portion of the first conductive plate 10a and also to an end portion of the second conductive plate 10b which faces the first conductive plate 10a. In FIG. 1, it is illustrated that the conductive member 10c is provided at a position close to the feeder 11. However, it is preferable that the conductive member 10c is provided at an end side opposite to the end side where the feeder 11 is provided. For example, the opposite end side may refer to the other end portion of the first conductive plate 10a and the other end portion of the second conductive plate 10b along the longitudinal direction as viewed from the end portions of the first conductive plate 10a and the second conductive plate 10b where the feeder 11 is provided to connect them. Hereinafter, the reason for this will be described with referring to FIGS. 2 and 3.

In FIG. 2, radiation efficiencies of the antenna 1 are illustrated when the conductive member 10c is arranged at various positions. The illustrated radiation efficiencies are obtained for each frequency. In FIG. 3, a change of S-parameter of the antenna 1 is illustrated for each frequency. The antenna 1 is configured as a power receiving antenna for receiving electric power wirelessly. The radiation efficiency may be an index to indicate how electric power which is transmitted from a radiation source can be received efficiently to be used as charging power.

The data of FIGS. 2 and 3 are obtained under the condition that the antenna 1 is made to have a width W1 of 30 mm, a length L1 of 60 mm, a height H1 of 10 mm, and a distance d of the conductive member 10c measured from a center of the antenna 1 along the longitudinal direction is made to be changed. With regard to the distance d, a positive direction is made to be a direction coming close to the feeder 11, and then the simulations are performed for the following cases: d=−30, d=−23.3333, d=−16.6667, d=−10, d=−3.3333, d=3.3333, d=10, and d=16.6667. Here, the distance of "d=0" is assumed to be a center of the antenna 1 along the longitudinal direction, and the distance of "d of −30" is assumed to be an end position of the first conductive plate 10a (and also of the second conductive plate 10b) which is provided on a side opposite to a position where the feeder 11 is provided.

In FIG. 2, it can be seen that the radiation efficiencies of the antenna 1 do not largely depend on the position of the conductive member 10c, in a frequency band of 920 MHz. In FIG. 2, communication frequencies are depicted on the horizontal axis, and radiation efficiencies are depicted on the vertical axis.

For example, in a frequency band of 920 MHz, the radiation efficiency becomes a value of 0.92492264 when the distance d is made to be −30.

Also, the radiation efficiency becomes a value of 0.91848839 when the distance d is made to be −23.3333.

Also, the radiation efficiency becomes a value of 0.90653664 when the distance d is made to be −16.6667.

Also, the radiation efficiency becomes a value of 0.89302688 when the distance d is made to be −10.

Also, the radiation efficiency becomes a value of 0.88013362 when the distance d is made to be −3.3333.

Also, the radiation efficiency becomes a value of 0.8730083 when the distance d is made to be 3.3333.

Also, the radiation efficiency becomes a value of 0.87878139 when the distance d is made to be 10.

Also, the radiation efficiency becomes a value of 0.9007059 when the distance d is made to be 16.6667.

Accordingly, it can be seen that, in a frequency band of 920 MHz, the radiation efficiency of 0.85 or more may be obtained in any case.

Also, it can be seen that the radiation efficiency of the antenna 1 becomes high when the conductive member 10c is moved away from the feeder 11, excluding the case of the d of 23.3333. These values are obtained from the simulations which are performed by the applicant. From these values, it can be seen that when d is −30, in other words, when the conductive member 10c is provided on a side opposite to the feeder 11, a relatively high radiation efficiency may be achieved among these investigated arrangements. With referring to FIG. 2, it can be seen that, preferably, the conductive member 10c is provided so as to connect the first conductive plate 10a and the second conductive plate 10b at their end portions on a side opposite to the end portions of the first conductive plate 10a and the second conductive plate 10b where the feeder 11 is provided.

In FIG. 3, a graph indicates trends of S parameter of the antenna 1 (more specifically, trends of S11 parameter) for each frequency band, according to the arrangement positions of the conductive member 10c which are measured from the center of the antenna. In the graph of FIG. 3, communication frequencies are depicted on the horizontal axis, and decibel values are depicted on the vertical axis. The S11 can be used to indicate values corresponding to the input-reflectioncoefficients with regard to the antenna 1. As the reflection becomes smaller, the efficiency becomes higher, and thus the decibel value is preferable to be small. In the example depicted in FIG. 3, the simulations are performed under the condition of the reflection coefficient for 50 ohms. However, in reality, when it is matched with the circuit side directly, the value may not be 50 ohms. Accordingly, the values exemplified in FIG. 3 may be different from the actual values. And yet, it can be seen that when the conductive member 10c is brought close to the feeder 11, the S-parameter may fall, in a frequency band of 920 MHz. Therefore, it is preferable that the conductive member 10c is provided as far away as possible from the feeder 11.

In FIG. 3, the S 11 parameter (which may be abbreviated to S11) is depicted according to each of the arrangement positions of the conductive member 10c in a frequency band of 920 MHz. For example, when the d is made to be −30, in other words, when the conductive member 10c is provided at the farthest possible point from the feeder 11, the S11 parameter becomes a value of −0.11598898.

Also, the S11 becomes a value of −0.12124553 when the distance d is made to be −23.3333.

Also, the S11 becomes a value of −0.13121938 when the distance d is made to be −16.6667.

Also, the S11 becomes a value of −0.14794466 when the distance d is made to be −10.

Also, the S11 becomes a value of −0.17484571 when the distance d is made to be −3.3333.

Also, the S11 becomes a value of −0.21969521 when the distance d is made to be 3.3333.

Also, the S11 becomes a value of −0.302915 when the distance d is made to be 10.

Also, the S11 becomes a value of −0.50750559 when the distance d is made to be 16.6667.

These values are obtained from the simulations which are performed by the applicant.

From these values, it can be seen that "d of 16.6667" is preferable for the antenna 1 from the viewpoint of the reflectance. However, from the viewpoint of the antenna pattern (that is, the directivity of antenna), it is preferable that the antenna pattern gets closer to a non-directional antenna pattern when the conductive member 10c is provided at a position away from the feeder 11. In addition, the antenna 1 is preferably configured as a power receiving antenna which is capable of receiving electric power no matter where it is located in regard to a power transmitting device for transmitting electric power without using wires. Accordingly, it would be better that the antenna pattern is omnidirectional. From the perspective of the radiation efficiency, it can be seen that "d of −30" is preferable. In other words, it is preferable that the conductive member 10c is provided so as to connect the first conductive plate 10a and the second conductive plate 10b at their end portions on a side opposite to the other end portions of the first conductive plate 10a and the second conductive plate 10b where the feeder 11 is provided.

From the perspective of the parameters depicted in FIGS. 2 and 3, and also from the perspective of the antenna patterns and the use conditions of the antenna 1, it is preferable that the antenna 1 is configured to have the conductive member 10c which is provided so as to connect the first conductive plate 10a and the second conductive plate 10b at their end portions on a side opposite to the other end portions of the first conductive plate 10a and the second conductive plate 10b where the feeder 11 is provided. Therefore, it can be said that, preferably, the antenna 1 is configured such that the first conductive plate 10a and the second conductive plate 10b which faces the first conductive plate 10a are connected by the feeder 11 at their one end portions and also are connected by the conductive member 10c at their other end portions so as to be separated from each other at a predetermined distance.

In FIG. 4, a graph indicates trends of the S-parameter of the antenna 1 when the sets of the W1 and the L1 are made to be as below:

(W1 and L1)=(30 mm and 60 mm),
(W1 and L1)=(60 mm and 120 mm), and
(W1 and L1)=(120 mm and 240 mm).

In FIG. 4, values are obtained under the condition that the distance from a power transmitting device to the antenna 1 is made to be 1 m.

As illustrated in FIG. 4, under the condition that the frequency to be used for feeding electric power is in a frequency band of 920 MHz, the best S-parameter (or the highest receiving level (decibel value)) is obtained when the values of (W1 and L1) are (30 mm and 60 mm). The second highest S-parameter is obtained when the values of (W1 and L1) are (120 mm and 240 mm). The lowest S-parameter is obtained when the values of (W1 and L1) are (60 mm and 120 mm). However, there is virtually no significant difference in these numerical values. In other words, it can be said that each numerical value is durable against a practical use. Considering that the occupancy rate of the antenna 1 is preferably made as small as possible in an arbitrary device which consumes actual power, and also considering that it is preferable to improve the receiving accuracy as high as possible, then it can be said that the set of the "(W1 and L1)=(30 mm and 60 mm)" is preferable among the three sets of the conductive plates (i.e. the first conductive plate 10a and the second conductive plate 10b) in FIG. 4.

In FIGS. 2, 3 and 4, performances are compared when the arrangement position of the conductive member 10c is changed and when the sizes of the first conductive plate 10a and the second conductive plate 10b are changed. Further, by referring to FIGS. 5 and 6, while comparing with the FIGS. 2 and 3, the antenna performances are investigated when the arrangement position of the conductive member 10c is changed and when the sizes of the first conductive plate 10a and the second conductive plate 10b are changed. That is, the shape of the antenna 1 is made to be similar to the shape illustrated in FIG. 1, and the shape of the antenna 1 is made to have a width W1 of 15 mm, a length L1 of 40 mm and a height H1 of 10 mm. Then, the antenna performances are investigated when the arrangement position of the conductive member 10c is changed. In other words, the antenna having the performances illustrated in FIGS. 5 and 6 is in relation to an antenna having smaller areas of the first conductive plate 10a and the second conductive plate 10b as compared with the antenna having the performances illustrated in FIGS. 2 and 3. Then, the performances are examined under the condition that the distance d of the arrangement position of the conductive member 10c is measured from the center position of the first conductive plate 10a (and also of the second conductive plate 10b). A positive direction is made to be a direction coming close to the feeder 11, and then the performances are examined for each of the cases of: d=−20, d=−13.3333, d=−6.6667, d=0, d=6.6667, and d=13.3333.

In FIG. 5, a graph indicates trends of the radiation efficiency according to the communication frequency of the antenna having a different size comparing to the antenna illustrated in FIG. 1. As depicted in FIG. 5, it can be seen that, in a frequency band of 920 MHz, the highest radiation efficiency is obtained when the d is made to be −20. Also, it can be seen that as the position of the conductive member 10c becomes closer to the feeder 11, the radiation efficiency becomes smaller.

For example, the radiation efficiency becomes a value of 0.82041534 when the distance d is made to be −20.

Also, the radiation efficiency becomes a value of 0.78161097 when the distance d is made to be −13.3333.

Also. the radiation efficiency becomes a value of 0.71846705 when the distance d is made to be −6.6667.

Also. the radiation efficiency becomes a value of 0.6318809 when the distance d is made to be 0.

Also, the radiation efficiency becomes a value of 0.52839634 when the distance d is made to be 6.6667.

Also. the radiation efficiency becomes a value of 0.43914519 when the distance d is made to be 13.3333.

Accordingly, it can be seen that, based on these values, when the distance d is made to be −20, in other words, when the conductive member 10c is provided on a side opposite to the feeder 11, the highest radiation efficiency may be obtained among these investigated arrangements. Besides, when the sizes of the L1 and W1 are made as 40 mm and 15 mm, respectively, it can be seen that the radiation efficiency may be decreased comparing to the case when the sizes of the L1 and W1 are made to be 60 mm and 30 mm, respectively. However, when the sizes of the L1 and W1 are made to be 40 mm and 15 mm, respectively, it can be seen that it is still possible to have the radiation efficiency to a level for not causing a problem when electric power is fed wirelessly.

In FIG. 6, a graph indicates trends of the S-parameter according to the communication frequency of the antenna 1 having a length L1 of 40 mm and a width W1 of 15 mm. According to FIG. 7, it can be seen that there is almost no difference of the S-parameter in a frequency band of 920 MHz, and there is no change caused by the arrangement position of the conductive member 10c.

For example, the radiation efficiency becomes a value of −0.023152867 when the distance d is made to be −20.

Also, the radiation efficiency becomes a value of −0.025011792 when the distance d is made to be −13.3333.

Also. the radiation efficiency becomes a value of −0.025784824 when the distance d is made to be −6.6667.

Also. the radiation efficiency becomes a value of −0.020420918 when the distance d is made to be 0.

Also. the radiation efficiency becomes a value of −0.020870058 when the distance d is made to be 6.6667.

Also. the radiation efficiency becomes a value of −0.021026152 when the distance d is made to be 13.3333.

Accordingly, it can be seen that there is almost no notable difference in these values.

In the S-parameter depicted in the graph of FIG. 6, a return loss is indicated for 50Ω. Generally, as the S-parameter becomes smaller in the decibel value, in a frequency band that is basically used, then, the reflectance becomes smaller, so that it is preferable. From the graph of FIG. 6, it can be seen that the antenna of this case is not desirable with regard to a return loss for 50Ω in a frequency band of 920 MHz, regardless of where the conductive member 10c is located.

In FIG. 7, a graph indicates trends of the S-parameter according to the communication frequency of the antenna having a length L1 of 40 mm and a width W1 of 15 mm which are changed from the sizes of the antenna illustrated in FIG. 1. The graph is obtained under the condition that the distance from a power transmitting device to the antenna is made to be 1 m. In FIG. 8, a graph indicates trends of each S-parameter in the vertical-direction according to the communication frequency of the same antenna, under the condition that the distance from a power transmitting device to the antenna is made to belm.

In FIG. 7, in a frequency band of 920 MHz, the values of (S11, S12, S21, and S22) are (−46.70311, −21.271524, −21.164399, and −42.548009), respectively. Also, in FIG. 8, in a frequency band of 920 MHz, the values of (S11, S12, S21, and S22) are (−67.655771, −58.391212, −64.442047, and −87.938023), respectively. In each case, under the matched condition, in a frequency band of 920 MHz, the S-parameter (i.e. S11) of the antenna 1 indicates negatively large decibel values, and the S21 (or transmission characteristic) is improved. Accordingly, it can be seen that the antenna 1 may be used without problems at the distance of 1 m.

In FIG. 9, a graph indicates trends of the radiation efficiency according to each communication frequency of the antenna 1 having a width W1 of 20 mm, a length L1 of 50 mm and a height H1 of 10 mm. The performances are examined under the condition that the distance d of the arrangement position of the conductive member 10c is measured from the center position of the first conductive plate 10a (and also of the second conductive plate 10b) along the longitudinal direction. A positive direction is made to be a direction coming close to the feeder 11, and then the performances are examined for each of the cases of: d=−25, d=−19.4444, d=−13.8889, d=−8.3333, d=−2.7778, d=2.7778, d=8.3333, d=13.8889, and d=19.4444.

As depicted in FIG. 9, even when the width W1 is made to be 20 mm and the length L1 is made to be 50 mm, the highest radiation efficiency may be obtained in a frequency band of 920 MHz when the distance d is made to be −25, in other words, when the conductive member 10c is provided at the opposite end portions along the longitudinal direction from the end portions of the first conductive plate 10a and the second conductive plate 10b where the feeder 11 is provided. Basically, as the conductive member 10c becomes closer to the feeder 11, the radiation efficiency becomes smaller.

For example, the radiation efficiency becomes a value of 0.88334688 when the distance d is made to be −25.

Also, the radiation efficiency becomes a value of 0.87004885 when the distance d is made to be −19.4444.

Also. the radiation efficiency becomes a value of 0.84695073 when the distance d is made to be −13.8889.

Also. the radiation efficiency becomes a value of 0.81796392 when the distance d is made to be −8.3333.

Also. the radiation efficiency becomes a value of 0.78302769 when the distance d is made to be −2.7778.

Also. the radiation efficiency becomes a value of 0.74525835 when the distance d is made to be 2.7778.

Also. the radiation efficiency becomes a value of 0.7139987 when the distance d is made to be 8.3333.

Also. the radiation efficiency becomes a value of 0.70413104 when the distance d is made to be 13.8889.

Also. the radiation efficiency becomes a value of 0.71853238 when the distance d is made to be 19.4444.

Accordingly, it can be seen that, even in the case that the width W1 is 20 mm and the length L1 is 50 mm, as the conductive member 10c becomes farther away from the feeder 11, the radiation efficiency of the antenna 1 becomes larger. Also, it can be seen that, even in the case that the width W1 is 20 mm and the length L1 is 50 mm, the antenna 1 may have the radiation efficiency of 0.7 or more in a frequency band of 920 MHz, regardless of where the conductive member 10c is located. As a result, it can be seen that the antenna 1 may exhibit sufficient performance when electric power is fed wirelessly.

As depicted in FIG. 10, while referring to FIGS. 2 to 9, a comparison is made for the antenna having the width W1 of 30 mm and the length L1 of 60 mm; the antenna having the width W1 of 20 mm and the length L1 of 50 mm; and the antenna having the width W1 of 15 mm and the length L1 of 40 mm. Then, it can be seen that the former may have higher radiation efficiency. On the other hand, it can be seen that when the area of the antenna is increased, the value of the radiation efficiency may move sidewise near the case of "W1=15 mm and L1=40 mm". Accordingly, it can be seen that there is no big difference in performances among them. In fact, even in the case of "W1=15 mm and L1=40 mm", the antenna 1 may exhibit sufficient performance as a power receiving device when electric power is fed wirelessly. On the contrary, when the antenna 1 is mounted on a relatively small IoT device, the antenna 1 having smaller size may be preferable for the IoT device. Accordingly, it can be said that the small size of the antenna 1 such as the above-mentioned size of "15 mm×40 mm" is desirable. However, it can be seen that regardless of the size of the antenna 1, the antenna 1 according to the present invention may exhibit sufficient performance above a prescribed level as a power receiving antenna when electric power is fed wirelessly.

In FIG. 11, another configuration example of the antenna is illustrated, as compared to the configuration of FIG. 1. As exemplified in FIG. 11, the antenna 1A is configured to include the conductive member 10c in a form of a single conductive plate to be used in the antenna 1. In other words, in the antenna 1A, the first conductive plate 10a and the second conductive plate 10b are connected by the feeder 11 at their one end portions, and also the first conductive plate 10a and the second conductive plate 10b are connected by the conductive plate 10c (which is capable of efficiently sending a current of electricity) at their other end portions. The first conductive plate 10a, the second conductive plate 10b, and the conductive plate 10c may be formed separately and connected to each other in an electrically-conductive state. Alternatively, the first conductive plate 10a, the second conductive plate 10b, and the conductive plate 10c may be formed integrally, for example, by bending a single conductive plate.

In the upper side of FIG. 12, a graph indicates trends of the radiation efficiency according to the communication frequency when the height of the antenna is changed. In the lower side of FIG. 12, a graph indicates trends of the radiation efficiency according to the communication frequency when the width of the antenna is changed.

In the upper side of FIG. 12, a graph indicates trends of the radiation efficiency of the antenna 1A when the height H2 is changed while the length and the width of the first conductive plate 10a and of the second conductive plate 10b are fixed (for example, L2=60 mm and W2=30 mm). As depicted in the upper side of FIG. 12, it can be seen that as the height H2 of the antenna 1A becomes larger, the radiation efficiency becomes higher. However, as depicted in the upper side of FIG. 12, when the height H2 increases more than 5 mm, the value of the radiation efficiency may move sidewise. As a result, it is anticipated that the radiation efficiency may not be further increased near the height H2 of 10 mm. Considering that the antenna 1 is intended to be mounted on a relatively small device, it can be said that the antenna 1 having smaller size is preferred if it is possible. Accordingly, considering both of the size and the radiation efficiency, it can be said that the height H2 of about 5 to 10 mm may be preferable. The same applies to the height H1 of the antenna 1 illustrated in FIG. 1.

In the lower side of FIG. 12, a graph indicates trends of the radiation efficiency of the antenna 1A when the width W2 is changed while the length and the height of the first conductive plate 10a and those of the second conductive plate 10b are fixed (for example, L2=60 mm and H2=8 mm). As depicted in the lower side of FIG. 12, it can be seen that as the width W2 of the antenna 1A becomes larger, the radiation efficiency becomes higher. However, as depicted in the lower side of FIG. 12, similar to the case of the height, when the width W2 increases more than a prescribed size, the value of the radiation efficiency may decrease. For example, when the width W2 increases more than 10 mm, the value of the radiation efficiency may move sidewise. Accordingly, considering both of the size and the radiation efficiency, it can be said that the width W2 of about 10 to 30 mm may be desirable. However, the width W2 may be limited by sizes of the device on which the antennae 1A is mounted.

In FIG. 13, antenna patterns (directivities) are illustrated when the height of the antenna is changed. In the present embodiment, it is assumed that, for example, the center of the antenna 1 is made to be an origin. Also, a surface passing though the origin parallel to the first conductive plate 10a and the second conductive plate 10b is made to be an X-Y plane. Also, a shorter direction of the antenna 1 (i.e. the direction along the W1 in FIG. 1) is made to be an X-axis. Also, a longer direction (or a longitudinal direction) of the antenna 1 (i.e. the direction along the L1 in FIG. 1) is made to be a Y-axis. Also, a direction perpendicular to the X-axis and the Y-axis is made to be a Z-axis. Further, the angle of the Z-axis with regard to the X-Y plane is represented by Theta ($\theta$), and the azimuth angle around the Z-axis is represented by Phi ($\phi$). The antenna patterns are illustrated when viewed from the direction indicated by the angle of Theta and Phi.

In FIG. 13, the antenna patterns are illustrated centering on the antenna 1A when it is viewed from the front side (or, in the front view by placing the feeder 11 on the right side, the conductive member 10c on the left side, the first conductive plate 10a on the upper side, and the second conductive plate 10b on the lower side). The antenna patterns are illustrated on the Y-Z plane when the Theta is 90 degrees and the Phi is 0 degree. The antenna 1A may be used as a power receiving antenna when electric power is fed wirelessly. An actual position of a device (for example, a sensor or the like) on which the antenna 1A is mounted may not be predicted. Accordingly, it would be better that the directivity of the antenna 1A is made to be omnidirectional as much as possible.

In FIG. 13, the antenna patterns (directivities) of the antenna 1A are illustrated when the areas of the first conductive plate 10a and the second conductive plate 10b are fixed while the height H1 is changed such as 2 mm, 4 mm, 6 mm, 8 mm, and 10 mm.

As illustrated in FIG. 13, relatively large depressions may appear in the antenna pattern at 0 degree and 180 degrees when the height H2 is made to be 2 mm. It can be seen that as the height H2 becomes larger, the depressions become smaller. Also, it can be seen that the antenna pattern may be formed in an approximately circular shape having small depressions (close to omnidirectional) when the height H2 is made to be 10 mm. Therefore, it can be said that the height H2 of 10 mm is preferable for a power receiving antenna among these heights. However, the higher height H2 may not necessarily mean better. It may depend on a permissible capacity of a device on which the antenna 1A is mounted. In addition, it is preferable that the antenna pattern is not distorted when the height H2 is increased.

Therefore, as illustrated in FIG. 1, it is preferable that the antenna 1 is configured to include the first conductive plate 10a in a shape of an elongated plate and the second conductive plate 10b in a shape of an elongated plate which are disposed opposite with each other, and the first conductive plate 10a and the second conductive plate 10b are connected by the feeder 11 at their end portions and connected by the conductive member 10c at their other end portions. Further, as illustrated in FIGS. 2 to 13, it is preferable that the distance between the first conductive plate 10a and the second conductive plate 10b, namely, the height of the antenna 1 is made to be about 10 mm. Also, it is preferable that the conductive member 10c is provided so as to connect the first conductive plate 10a and the second conductive plate 10b at the position separated from the feeder 11 as much as possible. In other words, it is preferable that the conductive member 10c is provided at the other end portions of the first conductive plate 10a and the second conductive plate 10b on a side opposite to the end portions thereof where the feeder 11 is provided. In addition, in regard to the sizes of the first conductive plate 10a and the second conductive plate 10b, a range centering a size of 15 mm×40 mm is preferable among the above-mentioned variable sizes. However, the antenna 1 may exhibit sufficient performance as a power receiving antenna regardless of the size of the antenna 1 as long as the antenna length of the shapes illustrated in FIGS. 1 and 11 is close to ¼λ (or, one-fourth of λ) in a frequency band of 920 MHz.

With referring to FIG. 14(a) to (f), various variations of the antenna according to the present invention are illustrated in order to exemplify various types of the configurations of the antenna. Although reference numerals are not necessarily depicted in FIG. 14(a) to (f), basically, the first conductive plate 10a, the second conductive plate 10b, and the conductive plate 10c are arranged along a nearly U-shape and the end portion of the first conductive plate 10a and that of the conductive plate 10c are connected by the feeder 11, as illustrated in FIG. 11. Under these preconditions, the details will be described below.

The antenna 1a illustrated in FIG. 14(a) is configured similar to the antenna 1A illustrated in FIG. 11. This configuration is provided in FIG. 14 for comparison with the other configurations.

With referring to FIG. 14(b), an antenna 1b is illustrated as a modification of the antenna 1a. According to the antenna 1b of FIG. 14(b), a middle part of the first conductive plate 10a is formed in a step shape to project toward the second conductive plate 10b, and a middle part of the second conductive plate 10b is formed in a step shape to project toward the first conductive plate 10a. Thus, the antenna 1b is configured to have the first conductive plate 10a, the second conductive plate 10b facing the first conductive plate 10a, the conductive plate 10c and the feeder 11. The conductive plate 10c is provided to connect the end portion of the first conductive plate 10a and the end portion of the second conductive plate 10b which faces the end portion of the first conductive plate 10a. Further, the feeder 11 is provided to connect the other end portion of the first conductive plate 10a and the other end portion of the second conductive plate 10b which faces the other end portion of the first conductive plate 10a.

With referring to FIG. 14(c), an antenna 1c is illustrated as another modification of the antenna 1a. As illustrated in FIG. 14(c), the first conductive plate 10a, the second conductive plate 10b and the conductive plate 10c of the antenna 1a are cut out so as to leave the outer edges of them. In other words, the conductive plates 10a, 10b, and 10c are formed by a single conductive plate which has a cutout extending within a predetermined distance from each end portion of the single conductive plate, and the single conductive plate is bent so as to form the antenna 1c in a condition illustrated in FIG. 14(c), and then the end portions of the single conductive plate are connected by the feeder 11. Accordingly, the antenna 1c is configured to include the first conductive plate 10a extending in a nearly U-shape, the second conductive plate 10b which faces the first conductive plate 10a and extends in a nearly U-shape, the frame-shaped conductive plate 10c, and the feeder 11. The conductive plate 10c is provided to connect the end portion of the first conductive plate 10a and the end portion of the second conductive plate 10b which faces the end portion of the first conductive plate 10a. Further, the feeder 11 is provided to connect the other end portion of the first conductive plate 10a and the other end portion of the second conductive plate 10b which faces the other end portion of the first conductive plate 10a.

With referring to an antenna 1d illustrated in FIG. 14(d), the inside of the conductive plate 10c is cut out so that the conductive plate 10 is made to be frame-shaped. Thus, the antenna 1d is configured to include the first conductive plate 10a, the second conductive plate 10b which faces the first conductive plate 10a, the frame-shaped conductive plate 10c, and the feeder 11. The conductive plate 10c is provided to connect the end portion of the first conductive plate 10a and the end portion of the second conductive plate 10b which faces the end portion of the first conductive plate 10a. Further, the feeder 11 is provided to connect the other end portion of the first conductive plate 10a and the other end portion of the second conductive plate 10b which faces the other end portion of the first conductive plate 10a.

With referring to the antenna 1e illustrated in FIG. 14(e), which is modified from the antenna 1d, a slot is additionally provided to each of the first conductive plate 10a and the second conductive plate 10b. Accordingly, the antenna 1e is configured to include the first conductive plate 10a which is provided with a slot elongating along the longitudinal direction, and the second conductive plate 10b which is provided with a slot elongating along the longitudinal direction. The first conductive plate 10a and the second conductive plate 10b are facing to each other, and the end portion of the first conductive plate 10a and that of the second conductive plate 10b are connected by the feeder 11. Further, the other end portion of the first conductive plate 10a and that of the second conductive plate 10b are connected by the conductive plate 10c which is in a shape of a plate.

With referring to the antenna 1f illustrated in FIG. 14(f), which is modified from the antenna 1e, protrusions 10d are additionally provided in the first conductive plate 10a so as to protrude toward the second conductive plate 10b. The protrusions 10d are provided at end portions in the width direction (or W2 direction) in a middle part in a longitudinal direction of the first conductive plate 10a. Accordingly, the antenna 1f is configured to include the first conductive plate 10c which is provided with a slot elongating along the longitudinal direction and also vertically extending protrusions 10d which are provided at the end portions in the width direction in the vicinity of the middle part in the longitudinal direction, and the second conductive plate 10b which is provided with a slot elongating along the longitudinal direction. The first conductive plate 10a and the second conductive plate 10b are facing to each other, and the end portion of the first conductive plate 10a and that of the second conductive plate 10b are connected by the feeder 11. Further, the other end portions of the first conductive plate 10a and that of the second conductive plate 10b are connected by the conductive plate 10c which is in a shape of a plate.

In FIG. 15, the antenna 1f of FIG. 14(f) and its partially enlarged view are illustrated. As can be seen from the partially enlarged view of FIG. 15, the protrusions 10d may be provided at the end portions of the first conductive plate 10a in the width direction (W) in the vicinity of the central part of the first conductive plate 10a in the longitudinal direction (L) so as to protrude toward the second conductive plate 10b. The protrusions 10d are provided not to be contacted with the second conductive plate 10b. In other words, a gap is defined between the second conductive plate 10b and each of the protrusions 10d. The performance of the antenna 1f may be varied due to the length of the gap. This will be described later with reference to FIG. 19.

Hereinafter, a desired shape of the antenna 1 will be examined by comparing each of the antennas illustrated in FIG. 14.

In FIG. 16, a graph indicates trends of the radiation efficiency according to the communication frequency of each of the antennas illustrated in FIG. 14. As depicted in FIG. 16, in a frequency band of 920 MHz, the order of the strength of the radiation efficiency is found to be in the sequence of the antenna 1f, the antenna 1a, the antenna 1d, the antenna 1b, the antenna 1e, and the antenna 1c. More specifically, the following data are obtained by the computer simulations.

For example, the radiation efficiency of the antenna 1f in a frequency band of 920 MHz becomes a value of 0.99010068.

Also, the radiation efficiency of the antenna 1a in a frequency band of 920 MHz becomes a value of 0.93002356.

Also, the radiation efficiency of the antenna 1d in a frequency band of 920 MHz becomes a value of 0.90709889.

Also, the radiation efficiency of the antenna 1b in a frequency band of 920 MHz becomes a value of 0.90532426.

Also, the radiation efficiency of the antenna 1e in a frequency band of 920 MHz becomes a value of 0.90475959.

Also, the radiation efficiency of the antenna 1c in a frequency band of 920 MHz becomes a value of 0.79928906.

Accordingly, it can be seen that, from the view of the radiation efficiency, the most suitable antenna in a frequency band of 920 MHz is in the shape of the antenna 1f. However, it can be said that each shape may satisfy the requirement as a power receiving antenna, by having the radiation efficiency of 0.7 or more.

In FIG. 17, antenna patterns (directivities) are illustrated for each of the antennas which are illustrated in FIG. 14.

On the right side of FIG. 17, antenna patterns of each of the antennas of FIG. 14 are illustrated when viewed from the top surface (or view from the first conductive plate 10a) by placing the feeder 11 on the upper side. In other words, the antenna patterns are illustrated on the X-Y plane when the θ is made to be 90 degrees. According to the results of the simulations, it can be seen that the antenna patterns are depicted in a shape of nearly a perfect circle for each of the antennas illustrated in FIG. 14. Therefore, it can be said that there is no significant difference in the antenna patterns when they are viewed from the top surface for each of the antennas of FIG. 14.

On the other hand, on the left side of FIG. 17, antenna patterns of each of the antennas of FIG. 14 are illustrated when viewed from the conductive member 10c. In other words, the antenna patterns are illustrated on the X-Z plane when the Φ is made to be 90 degrees. With referring to FIG. 17, each antenna pattern is formed in an elliptical shape having a long axial radius in the direction of 90 degrees and a short axial radius in the direction of 180 degrees. It can be seen that the short axis radius of the antenna pattern of the antenna 1f is the longest, and the antenna pattern of the antenna 1f is depicted in a shape closest to a circle. It can be seen that the length of the short axial radius is gradually reduced in the sequence of the antenna 1f, the antenna 1e, the antenna 1c, the antenna 1a, and the antenna 1b. As described above, the antennas illustrated in FIG. 14 are intended to be used as a power receiving device when electric power is fed wirelessly. For example, it is assumed that the antennas can be used as the IoT device and mounted on a small sensor or the like. It is desirable that the antenna patterns are formed to receive electric power no matter which direction radio waves are transmitted wirelessly even when the position of the IoT device is previously unknown. Accordingly, it can be said that, from the view of the antenna pattern, the antenna 1f is the most preferable among those of the antennas 1a to 1f.

With referring to FIGS. 16 and 17, it can be inferred that the shape of the antenna 1f is the most suitable among the antennas illustrated in FIG. 14, as a power receiving antenna when electric power is fed wirelessly. Hereinafter, the reason why the antenna 1f is highly suitable will be described with referring to FIG. 18.

In FIG. 18, it is illustrated that the antennas of FIG. 14(f) is capable of functioning as a composite antenna. As seen from FIGS. 16 and 17, it can be said that the antenna 1f is efficient as a power receiving antenna, because it is presumed that the antenna 1f is capable of functioning as a composite antenna as illustrated in FIG. 18.

As illustrated in FIG. 18, it can be estimated that the antenna 1f is configured to function as a combination of two loop antennas, two slot antennas, and three dipole antennas.

In other words, it can be said that the antenna 1f is configured as a compound antenna including six kinds of antennas of:

a loop antenna 18g which is formed of the periphery of the frame of the conductive member 10c, a loop antenna 18f which is formed of the first conductive plate 10a, the conductive member 10c, the second conductive plate 10b, and the feeder 11, a slot antenna 18d which is formed of the slot provided in the first conductive plate 10a, a slot antenna 18e which is formed of the slot provided in the second conductive plate 10b, a dipole antenna 18a which is formed of the feeder 11, the first conductive plate 10a extending from the end to the middle thereof, and the protrusions 10d, and a dipole antenna 18b which is formed of the first conductive plate 10a and the feeder 11.

As a result, the antenna 1f may exhibit excellent antenna performances.

In FIG. 19, a graph indicates the radiation efficiency according to the communication frequency of the antenna illustrated in FIG. 14(f) when the gap which is formed between the protrusions 10d and the second conductive plate 10b is changed. In the graph of FIG. 19, the frequencies are depicted on the horizontal axis, and the decibel values are depicted on the vertical axis. It can be seen that as the decibel value becomes smaller, the efficiency becomes smaller.

In FIG. 19, the radiation efficiencies are illustrated when the distance (gap) between the protrusion(s) 10d and the second conductive plate 10b is changed in a range of from 0 to 2.48 mm. As illustrated in FIG. 19, the radiation efficiencies are different between the case where the gap is not provided (in other words, the length of the gap is 0 mm) and the case where the gap is provided. It can be seen that in the case where the gap is not provided, the radiation efficiency may become significantly inferior comparing to the case where the gap is provided. More specifically, it can be seen that in the case where the gap is provided more than 0 mm, the radiation efficiency may exhibit around 90% for any type of the gap. As a result, with regard to the antenna 1f, it can be said that it is preferable that the gap is provided between the second conductive plate 10b and the protrusion(s) 10d which extend from the first conductive plate 10a.

In FIG. 20, antenna patterns (directivities) of the antenna of FIG. 14(f) are illustrated when the distance (gap) formed between the protrusion(s) 10d and the second conductive plate 10b is changed. In FIG. 20, antenna patterns are illustrated when the gap is formed to have a length of 0.02 mm, 0.13 mm, 0.2 mm, or 0.6 mm. On the left side of FIG. 20, antenna patterns of the antenna 1f are illustrated, as viewed from the top plate, when the longitudinal direction of the antenna 1f is arranged in the horizontal direction of the figure. On the right side of FIG. 20, antenna patterns of the antenna 1f are illustrated, as viewed from the end portion, namely, from the feeder 11. In other words, on the left side of FIG. 20, the antenna patterns are illustrated on the Y-Z plane when the Φ is made to be 0 degree. Also, on the right side of FIG. 20, the antenna patterns are illustrated on the X-Z plane when the Φ is made to be 90 degrees.

As can be seen from FIG. 20, when the gap is formed to have a length of 0.13 mm, the antenna pattern is formed in a shape closest to a circle. Based on the results of the simulations, it can be seen that the antenna patterns are decreased in the order of the 0.02 mm, 0.6 mm, and 0.2 mm of the length of the gap and the shapes of the antenna patterns are formed in a shape similar to an ellipse. As stated above, the antenna according to the present embodiment is intended to be used as a power receiving antenna when electric power is fed wirelessly. During manufacturing, an actual position of the antenna may not be previously known. Therefore, it is desirable that the antenna pattern is configured to have an omnidirectional antenna pattern as wide range as possible.

Accordingly, with referring to FIGS. 19 and 20, it can be said that in the case of the antenna 1f, it is better to provide a gap between the protrusion(s) 10d and the second conductive plate 10b so as to have a length of the gap as small as possible in order to have a nearly omnidirectional antenna pattern, while with referring to FIG. 20, taking into account (i) the antenna pattern is formed in a shape closest to a circle, (ii) even though the length of the gap is narrowed, the radiation efficiency is not significantly reduced comparing to the case of the highest radiation efficiency where the gap is formed to have a length of 2.48 mm, (iii) the antenna pattern of the case where the gap is formed to have a length of 0.6 mm having the highest radiation efficiency becomes greatly inferior comparing to the cases where the gap is formed to have a shorter length of 0.13 mm and 0.02 mm (where the antenna patterns are formed in an elliptical shape).

In FIG. 21, a configuration example is illustrated when the antenna is formed to have a spherical shape as a whole. More specifically, in FIG. 21, the illustrated antenna is modified from the antenna if illustrated in FIG. 14(f) to be formed to have a curved-surface shape (for example, in the figure, in a spherical shape). As illustrated in FIG. 21, the antenna 1g is formed by connecting the end portions of the first conductive plate 10a which is provided with a slot, and of the second conductive plate 10b which is provided with a slot, by the conductive member 10c which is cut out to have a framed shape. The other end portions of the first conductive plate 10a and of the second conductive plate 10b are connected by the feeder 11. The first conductive plate 10a, the second conductive plate 10b, and the conductive member 10c are curved in a spherical shape as a whole as illustrated in the figure. In addition, plate-shaped protrusions are provided in the vicinity of the middle part of the first conductive plate 10a in the longitudinal direction so as to protrude to the second conductive plate 10b. The protrusions are provided not to connected with the second conductive plate 10b as illustrated in the figure.

In FIG. 22, a graph indicates the radiation efficiency according to the communication frequency of the antenna illustrated in FIG. 21.

As illustrated in FIG. 22, the antenna 1g having the shape of FIG. 21 may exhibit high radiation efficiency of 0.95751033 in a frequency band of 920 MHz. Accordingly, it can be seen that this antenna may exhibit sufficient performance as a power receiving antenna.

In FIG. 23, antenna patterns (directivities) of the antenna of FIG. 21 are illustrated. On the left side of FIG. 23, the antenna pattern of the antenna 1g when viewed from the top plate, (i.e. from the direction of the arrow 21A in FIG. 21) is illustrated. On the center side of FIG. 23, the antenna pattern of the antenna 1g when viewed from its side surface direction (i.e. from the direction of the arrow 21B in FIG. 21) is illustrated. On the right side of FIG. 23, the antenna pattern of the antenna 1g when viewed from its front surface direction (i.e. from the direction of the arrow 21C in FIG. 21) is illustrated. In other words, on the left side of FIG. 23, the antenna pattern on the X-Y plane is illustrated when the Φ is made to be 0 degree. On the center side of FIG. 23, the antenna pattern on the X-Z plane is illustrated when the θ is made to be 90 degrees. On the right side of FIG. 23, the antenna pattern on the Y-Y plane is illustrated when the Φ is made to be 90 degrees.

As illustrated in FIG. 23, it can be seen that the antenna patterns of the antenna 1g are illustrated in a shape of nearly a perfect circle in the left side and the right side in the FIG. 23 even though they are somewhat formed in a shape of an ellipse. Also, it can be seen that in the center side of the FIG. 23, the antenna pattern is illustrated in a shape of nearly a perfect circle. Accordingly, it can be seen that the antenna patterns are formed as a nearly ideal shape from the perspective of omnidirectional antenna.

Therefore, it can be seen that the antenna 1g which is configured by bending its body as illustrated in FIG. 21 may also be used as a power receiving antenna.

In FIG. 24, a configuration example is illustrated when the antenna is formed to have a columnar shape (or annular shape). More specifically, in FIG. 24, the illustrated antenna is modified from the antenna if of FIG. 14(f) to be formed in a columnar shape. As illustrated in FIG. 24, the antenna 1h is configured by bending the antenna 1f in the longitudinal direction so as to have a columnar shape. Both of the end portions of the first conductive plate 10a which is bended along the longitudinal direction and provided with a slot and of the second conductive plate 10b which is bended along the longitudinal direction and provided with a slot are connected by the conductive member 10c which is cut out to have a framed shape. The other end portions of the first conductive plate 10a and of the second conductive plate 10b are connected by the feeder 11.

In FIG. 25, a graph indicates the radiation efficiency according to the communication frequency of the antenna 1h of FIG. 24. As illustrated in FIG. 25, the antenna 1h having the shape of FIG. 24 may exhibit high radiation efficiency of 0.95761551 in a frequency band of 920 MHz. Accordingly, it can be seen that this antenna may exhibit sufficient performance as a power receiving antenna.

In FIG. 26, antenna patterns (directivities) of the antenna 1h of FIG. 24 are illustrated. On the left side of FIG. 26, the antenna pattern of the antenna 1h when viewed from the direction of the arrow 24A is illustrated. On the center side of FIG. 26, the antenna pattern of the antenna 1h when viewed from the direction of the arrow 24B is illustrated. On the right side of FIG. 26, the antenna pattern of the antenna 1h when viewed from the direction of the arrow 24C is illustrated. In other words, on the left side of FIG. 26, the antenna pattern on the Y-Z plane is illustrated when the Φ is made to be 90 degrees. On the center side of FIG. 26, the antenna pattern on the X-Z plane is illustrated when the Φ is made to be 0 degree. On the right side of FIG. 26, the antenna pattern on the X-Z plane is illustrated when the θ is made to be 0 degree. As illustrated in FIG. 26, the antenna patterns which are viewed from the arrows 24A and 24B are formed in a shape of an ellipse without having a large distortion. Also, the antenna pattern which is viewed from the arrow 24C is formed similar to a circle. Accordingly, it can be seen that the antenna 1h is configured as a sufficiently omnidirectional antenna to be used as a power receiving device.

As illustrated in FIGS. 21 to 26, whether the antenna if is formed in a spherical shape or in a columnar shape, it may be adequately used as a power receiving antenna when electric power is fed wirelessly, while comparing with the case when the antenna if is formed in a rectangular shape as illustrated in FIG. 14(f). The antenna if formed in any of the above-mentioned shapes may be provided in an arbitrary IoT device to be used in a natural mode without attracting attention. For example, the antenna if may be connected to a human detecting sensor or the like and may be provided in a natural mode by being attached to a penholder which is formed in a rectangular shape or the like. For example, the IoT device may be configured to perform a sensing operation by using electric power which is received by the antenna if and also to send the data which is detected during the course of the sensing operation.

In FIG. 27, a configuration example is illustrated when one of the conductive plates of the antenna is provided with a power receiving circuit. In the example illustrated in FIG. 27, the first conductive plate 10a is provided with a power receiving circuit. The power receiving circuit and the second conductive plate 10b are connected by the feeder 11. In FIG. 27, it is illustrated that the second conductive plate 10b is narrowed in the width direction so as to extend to the first conductive plate 10a. Instead of that, a conductive member which is connected to the second conductive plate 10b may be connected with the power receiving circuit via the feeder.

With the configuration illustrated in FIG. 27, the antenna 1 may be easily configured, and the rigidity of the antenna 1 may be improved as compared with the cases illustrated in FIGS. 1 and 11, etc. Next, the performance of the antenna of FIG. 27 will be described with referring to FIGS. 28 and 29.

In FIG. 28, a graph indicates the radiation efficiencies according to the communication frequency of the antenna illustrated in FIG. 27. The radiation efficiency of the antenna illustrated in FIG. 28 corresponds to the radiation efficiency of the antenna which has a thinness of the first conductive plate 10a combined with a PCB (which is an abbreviation of Printed Circuit Board) on which a power receiving circuit, a power storage circuit, a sensor, a power storage device, and a microcontroller are provided. For example, simulations are performed for three cases such as the following: a case when the first conductive plate 10a and the PCB have a combined thickness of 0.3 mm; a case when the first conductive plate 10a and the PCB have a combined thickness of 1 mm; and a case when the first conductive plate 10a and the PCB are bonded so as to have a combined thickness of 0.3 mm. As a result, a graph indicating the radiation efficiencies is obtained as illustrated in FIG. 28.

According to this graph, when the first conductive plate 10a and the PCB are bonded so as to have a combined thickness of 0.3 mm, the radiation efficiency of the antenna becomes a value of 0.79228273 in a frequency band of 920 MHz.

Also, when the first conductive plate 10a and the PCB have a combined thickness of 1 mm, the radiation efficiency of the antenna becomes a value of 0.62782387 in a frequency band of 920 MHz.

Also, when the first conductive plate 10a and the PCB have a combined thickness of 0.3 mm without being bonded, the radiation efficiency of the antenna becomes a value of 0.59796367 in a frequency band of 920 MHz.

It can be seen that the values of the radiation efficiency are successively increased in this order.

According to the radiation efficiencies illustrated in FIG. 28, it can be presumed that the first conductive plate 10a of the antennae is preferably bonded with the PCB so as to be thin.

With referring to FIG. 29, antenna patterns (directivities) of the antenna of FIG. 27 are illustrated. In FIG. 29, the antenna patterns when viewed from the top plate of the antenna of FIG. 27 are illustrated. From the figure, it can be seen that the antenna patterns are formed in a shape of an ellipse in every case, and there may be no large difference.

Therefore, with referring to both of FIGS. 28 and 29, it can be presumed that the first conductive plate 10a of the antennae is preferably bonded with the PCB and the thickness may be reduced.

Although it is not illustrated, the antenna 1 according to the present embodiment (or any one of the antennas 1A, 1a to 1h) may be configured as a power receiving device for receiving electric power wirelessly, as stated above. The antenna 1 may be configured as an arbitrary IoT device capable of receiving electric power which is transmitted from a power transmitting device, by including a capacitor or the like, and also capable of supplying the power to a sensor or the like for operating it. Here, the electric power received by the antenna 1 may be directly supplied to a sensor or the like. Also, a sensing data obtained during the course of the sensing operation may be transmitted to an external server device or the like, by using electric power which is received by the antenna 1, from the communication circuit, separately. Thus, the antenna 1 may be used as an antenna for performing communication in order to transmit and/or receive data as long as communication is allowed, as necessary.

With referring to FIG. 30, it can be seen that the antenna 1 according to the present embodiment may be configured as an IoT device having a casing. In FIG. 30(a), an external view of the IoT device is exemplified, and in FIG. 30(b), a perspective view of inside of the disassembled IoT device is exemplified. In addition, with referring to FIG. 31, a perspective view of the exploded IoT device of FIG. 30(a) is illustrated.

As illustrated in FIG. 30(a), the IoT device may be provided with a box-shaped casing 3000. As illustrated in FIG. 30(b), the antenna if (as one example of the antenna according to the present embodiment) and the PCB 3001 which is provided on and connected to the antenna if are included in the casing 3000. Here, the shape of the casing 3000 is not particularly limited to the box-like shape as long as it can include the antenna 1 and the PCB 3001 therein. For example, the casing 3000 may be formed in a columnar shape, a conical shape, or a spherical shape, etc.

In FIG. 31, a perspective view of the disassembled casing 3000 is illustrated. As illustrated in FIG. 31, the PCB 3001 is provided on and connected to the antenna if. Although it is not illustrated, the PCB 3001 may be provided with various circuits for realizing functions of the IoT devices which includes, for example, a sensor corresponding to sensing operations executed by the IoT device, a power receiving circuit, a power storage circuit, a power storage device, and a microcontroller, etc. Then, the antenna if having provided the PCB 3001 is sandwiched and included between an upper housing 3100 and a lower housing 3101 so as to form the IoT device, As described above, the antenna 1 according to the present embodiment may be provided as a part of an arbitrary IoT device.

When the antenna is provided as an IoT device, the antenna of high performance for receiving electric power may be provided and mounted to have the most proper size according to the size of the IoT. Accordingly, it becomes possible to provide an IoT device that may realize desired functions and may be continuously operated as long as it receives electric power from a power transmitting device. In this case, it may not be required to include a large battery for operating the IoT device. As a result, it becomes possible to relatively reduce the size of the IoT device and to restrain the cost of it from increasing by including a large battery. Besides, in FIG. 31, it is illustrated that the PCB is provided with a slot in accordance with the antenna if. However, the PCB may not necessarily be provided with a slot.

In addition, the antenna 1 may be configured as a variable-shape structure. For example, the antenna 1 may be configured to have a variable-length structure so as to change the length of the antenna by changing the length of the conductive member 10c and/or the feeder 11 by using an arbitrary stretchable member (for example, a member that can be stretched by using a slide mechanism or the like).

The power receiving antenna according to the present invention is capable of efficiently receiving electric power which is transmitted from a power transmitting device isolated from the antenna with a certain fixed distance or more (for example, the distance may be 1 m, but it is not necessarily limited to 1 m, and, the distance may be more than 1 m). In addition, the power receiving antenna according to the present invention is capable of reducing a planar area of the antenna comparing to that of a planar loop antenna which is frequently used for feeding electric power wirelessly. Thus, the power receiving antenna according to the present invention may be provided as a power receiving antenna to be used in an IoT device, etc., having a sensor. In addition, the power receiving antenna according to the present invention is capable of obtaining the radiation efficiency above a certain level, even though its size is variously changed. When the power receiving antenna according to the present invention is included in a device of various sizes, the antenna having the radiation efficiency above a certain level may be formed in an arbitrary size corresponding to the device. Further, the power receiving antenna according to the present invention is capable of having the radiation pattern in which its directivity may be substantially 0 dbi in all directions. Therefore, the device provided with the power receiving antenna is capable of receiving electric power and functioning even if it is disposed at any position as long as the device is positioned within a predetermined distance from a power transmitting device, if there is no obstacle which can interfere with wireless feeding between the antenna and the power transmitting device.

Besides, it is conceivable that the antenna 1A illustrated in FIG. 11 is capable of functioning as an inverted-F antenna. For example, it can be considered that the first conductive plate 10a may serve as an antenna element, the second conductive plate 10b may serve as a ground with respect to the first conductive plate 10a, and the conductive plate 10c may serve as a shorting point when the antenna 1A is regarded as an inverted-F antenna. The first conductive plate 10a may be short-circuited to the second conductive plate 10b by the conductive plate 10c. In FIG. 11, it can be seen that the width of the first conductive plate 10a, and the width of the second conductive plate 10b which is capable of functioning as the ground are substantially the same. Also, in FIG. 11, it can be seen that the width of the first conductive plate 10a, the width of the second conductive plate 10b, and the width of the conductive plate 10c are substantially the same.

In FIG. 11, it can be seen that the feeder 11 is provided so as to connect the end portion of the first conductive plate 10a and that of the second conductive plate 10b on a side opposite to the other end portion of the first conductive plate 10a and that of the second conductive plate 10b where the conductive member 10c is provided to connect them. In a regular inverted-F antenna, the shorting point and the feed point are positioned at a predetermined distance. As described above, according to the antenna 1A, the end portions of the first conductive plate 10a and of the second conductive plate 10b are connected by the feeder 11 on a side opposite to the other end portions where the conductive member 10c is provided to connect them. Accordingly, proper simulation results are obtained with regard to the radiation efficiency, the reflectance, and the directivity.

As can be seen from FIG. 10, the length L2 of the antennae 1A has, for example, a length of from 40 mm to 60 mm. Assuming that the radio waves having a wavelength of A are received by the antenna 1A. Then, the length L2 is approximately equal to one-fourth of wave length A, for example, in a frequency band of 920 MHz. In the present description, the expressions "the length is approximately equal to" mean that, for example, the length has the same number of digits. In other words, the expressions mean that the deviation of the length is in a range of 10 times of the value. When the length L2 of the antenna 1A has a length of from 40 mm to 60 mm, it may efficiently receive radio waves in 920 MHz band.

The characteristic impedance of the first conductive plate 10a, the second conductive plate 10b and the conductive plate 10c and the characteristic impedance of the feeder 11 are designed to match with each other. Specifically, for example, the characteristic impedance of the first conductive plate 10a, the second conductive plate 10b and the conductive plate 10c and the characteristic impedance of the feeder 11 are designed to be matched by using the complex conjugate. For example, the characteristic impedance of the first conductive plate 10a, the second conductive plate 10b and the conductive plate 10c may be made to be "R+jX". In addition, the characteristic impedance of the feeder 11 may be made to be "R−jX".

When a coaxial cable having a predetermined characteristic impedance is attached to a feed point in a regular inverted-F antenna, it is required to match the characteristic impedance of the antenna to that of the coaxial cable. In the present embodiment, only the real part of the characteristic impedance may be matched because the imaginary part may be canceled by the complex conjugate.

Accordingly, it becomes possible to effectively perform matching of impedance. In general, as the value of an inductance or a capacitance becomes larger, an insertion loss becomes higher. Thus, by decreasing the number of the components and by decreasing the value, it becomes possible to perform matching with reduced loss. In particular, it is ideal that the value of R of the characteristic impedance "R+jX" of the first conductive plate 10a, the second conductive plate 10b and the conductive plate 10c is equal to the value of R of the characteristic impedance "R−jX" (complex conjugate), of the feeder 11 (for example, a rectifier circuit or the like). Accordingly, in order to achieve this, it is necessary to determine a length of a base material having a common value of R at a place where frequency is low or high while avoiding a vicinity of the resonance (λ/4) of the antenna.

The antenna 1A includes the second conductive plate 10b as the ground so that it becomes possible to avoid a situation where the antenna characteristics are affected by a surface material of a member to which the antenna 1A is attached. As a result, it becomes possible to allow the antenna 1A to be placed on a metallic surface, a conductive device, or a surface of a sensor, thereby greatly enhancing usability of the antenna.

Further, the Z parameter, or, the impedance of the antenna 1 of FIG. 1 will be described. With referring to FIG. 42, trends of the Z parameter, that is, trends of the impedance of the antenna 1 of FIG. 1 are illustrated for various frequencies. In FIG. 42, simulation results are obtained for each of the real part and the imaginary part at various frequencies. On the upper side of FIG. 42, a graph indicates trends of the Z parameter according to the communication frequency of the real part. On the lower side of FIG. 42, a graph indicates trends of the Z parameter according to the communication frequency of the imaginary part. The component of the imaginary part may also be referred to as reactance.

According to the FIG. 42, when the position of the conductive member 10c is changed, values of the impedance and the reactance in a frequency band of 920 MHz are obtained as follows:

For example, when the value of d is −30, the values of (real part, imaginary part) are (6513.8669Ω, −2519.7886Ω), Also, when the value of d is −23.3333, the values of (real part, imaginary part) are (6096.2638Ω, −2551.2409Ω), Also, when the value of d is −16.667, the values of (real part, imaginary part) are (5876.8777Ω, −2089.0102Ω), Also, when the value of d is −10, the values of (real part, imaginary part) are (5154.6372Ω, −1921.7748Ω), Also, when the value of d is −3.3333, the values of (real part, imaginary part) are (3278.0904Ω, −1488.178Ω), Also, when the value of d is 10, the values of (real part, imaginary part) are (2220.3885Ω, −1198.5983Ω), Also, when the value of d is 16.6667, the values of (real part, imaginary part) are (1301.1842Ω, −730.6931Ω), Also, when the value of d is 23.3333, the values of (real part, imaginary part) are (268.3113Ω, −80.5999Ω), and Also, when the value of d is 30, the values of (real part, imaginary part) are (555.1255Ω, −153.2234Ω), According to the upper side of FIG. 42, it can be seen that the values are rapidly increased in the vicinity of 920 MHz band, regardless of where the conductive member 10c is located. Accordingly, it can be seen that the antenna 1 is configured as an antenna that resonates with respect to the 920 MHz band. In addition, it can mean that as the value of the dB becomes higher, the degree of resonance becomes higher. With referring to FIG. 42, it can be seen that when d is made to be −30, the impedance becomes the highest in a frequency band of 920 MHz. Therefore, it can be seen that when the conductive member 10c is disposed at a position of "d=−30", that is, when it is disposed at the farthest possible position from the feeder 11, the radiation efficiency becomes the highest.

Supposing that the "R+jX" corresponds to the impedance of the antenna, then there may be two positions to be the real part R (c.f. FIG. 44). As described above, it is ideal that the impedance of the antenna is the complex conjugate of the rectifier circuit. Under an ideal matching condition, the impedance of the antenna will be "R+jX" and the impedance of the rectifier circuit will be "R−jX". However, it may be difficult to perform this matching in practice. In general, the real part of the rectifier circuit is 50 ohms or less, and is often about several tens of ohms. When a very high R value (for example, of several thousand ohms) is obtained in the vicinity of the resonance of the antenna, preferably, the value may be adjusted to several tens of ohms.

As illustrated in FIG. 44, with regard to the performing matching between the real part of the impedance of the antenna and the real part of the impedance of the rectifier, it is possible to reduce the R value by decreasing the antenna length L by 10 to 30%, preferably by about 20%, in a low frequency band, so as to perform matching to the desired R value. In addition, it is possible to reduce the R value by increasing the antenna length L by 10 to 30%, preferably by about 20%, in a high frequency band, so as to perform matching to the desired R value. By performing impedance matching in a low frequency band, it becomes possible to shorten the antenna length L by about 10 to 30% from the initial state so as to attain miniaturization of the antenna as a whole.

When the value is below a specified target value, that is, when the R value becomes too low, and thus it is required to increase the value, it is possible to adjust the R value by increasing the antenna length L in a low frequency band or by decreasing the antenna length L in a high frequency band. The ideal length of the antenna is one-fourth of the wavelength, and it is possible to bring the value close to an ideal matching condition by adjusting the antenna length by about ±20%.

Once values of the impedance R are uniformized, only the jX values is needed to be adjusted. Accordingly, it becomes possible to perform impedance matching by using a single component. For example, when the antenna has a length of 60 mm, a width of 16 mm, and a height of 8 mm (using Teflon (registered trademark) for its base material), in a frequency band of 920 MHz, then, it is possible to perform impedance matching between the antenna and the rectifier by inserting an inductor having a value of 22 nH, in series.

By performing impedance matching at a low frequency, a length of the antenna may be shorten than a length in which a frequency band of radio waves assumed to be received is a resonance frequency (in other words, the antenna length is one-fourth of the received wavelength λ in the initial state), by from 10% to 30%, preferably by approximately 20%. As a result, the miniaturization of the antenna may be attained as a whole.

From the above, it is preferable that the conductive member 10c is positioned as far away as possible from the feeder 11. Preferably, the end portions of the first conductive plate 10a and the second conductive plate 10b are connected by the conductive plate 10c on a side opposite to the other end portions of the first conductive plate 10a and the second conductive plate 10b where the feeder 11 is provided.

Embodiment 2

As described above, various configurations of the power receiving antennas 1, 1A, 1a to 1h according to the first embodiment have been described with referring to FIGS. 1 to 31 and 42.

Next, the antenna 20 according to the second embodiment will be described.

Hereinafter, the overlapped portions with the descriptions in the above-mentioned antennas 1, 1A, 1a to 1h according to the first embodiment may be omitted with a view to limiting overlapping descriptions to a minimum.

Similar to the cases of the first embodiment, the antenna 20 according to the second embodiment may be used as a power receiving device when electric power is fed wirelessly.

In short, the antenna 20 according to the second embodiment may be used as a power receiving device which is capable of receiving energy transmitted wirelessly in a three-dimensional space, based on WPT (which is an abbreviation of Wireless Power Transmission or Wireless Power Transfer).

For example, the antenna 20 according to the second embodiment is capable of receiving energy and of transmitting the received energy to an arbitrary target such as a sensor, a robot, a device, and a PC (which is an abbreviation of personal computer).

For example, the antenna 20 according to the second embodiment may be provided as an antenna or a rectenna.

For example, the antenna 20 according to the second embodiment may be provided as a module (for example, an antenna module or the like) in which an antenna or rectenna, and an associated electronic component are integrated.

For example, the antenna 20 according to the second embodiment may be provided as a module (for example, a sensor module or the like) in which an antenna or rectenna, an associated electronic component, and a sensor or the like to which the received power is supplied are integrated.

Firstly, a basic constitution of the antenna 20 according to the second embodiment will be described with referring to FIGS. 32 to 37.

In FIG. 32, a basic constitution of the antenna according to the second embodiment and a core member capable of being applied into the basic constitution of the antenna are illustrated.

Referring to FIG. 32 (A), a perspective view of the antenna 20 according to the second embodiment is illustrated when viewed in the same way as the antenna 1A according to the first embodiment illustrated in FIG. 11.

Referring to FIG. 32 (B), a perspective view of the antenna 20 when viewed from the direction opposite to the above-mentioned direction is illustrated. By referring to these two figures, it becomes possible to grasp the basic configuration of the antenna 20 according to the second embodiment along a circumferential direction of the antenna 20 as a whole.

In the cases of the power receiving antennas 1, 1A, 1a to 1h according to the first embodiment, the antennas have been schematically illustrated without depicting the thicknesses of the plates (c.f. for example, FIGS. 11 and 14(a) to (f)). On the other hand, in FIGS. 32 (A), (B), the thicknesses of the plates of the antenna 20 are depicted more concretely.

The antenna 20 illustrated in FIG. 32 (A) has a polyhedral shape. Preferably, the antenna 20 has a substantially rectangular parallelepiped shape. In particular, the antenna 20 illustrated in FIG. 32 (A) is configured to have a width dimension W3 along a predetermined width direction (for example, the X-axis direction), a length dimension L3 along a longitudinal direction (for example, the Y-axis direction), and a height dimension H3 along a height direction (for example, the Z-axis direction).

The above-mentioned dimensions are adjustable, when practically used. For example, it is possible to reduce the height dimension H3 in the height direction so as to realize a structure of a low attitude entirely. Also, it is possible to reduce the area which is derived from multiplication of the width dimension W3 in the width direction by the length dimension L3 in the longitudinal direction so as to reduce the installing area entirely.

In the antenna 20, as illustrated in FIG. 32 (A), a first conductive plate (or conductive member) 21 and a second conductive plate (or conductive member) 22 are disposed face to face with each other, in the same way as the first embodiment (which is, for example, illustrated in FIG. 11). An end portion of the first conductive plate 21 and that of the second conductive plate 22 are connected by a feeder (or rectifier) 25, and the other end portion of the first conductive plate 21 and that of the second conductive plate 22 are connected by a third conductive plate (or conductive member) 23.

Each of the first conductive plate 10a, the second conductive plate 10b and the third conductive member 10c is formed by using an arbitrary material (such as copper, aluminum, or the like) which is capable of efficiently sending a current of electricity therethrough.

Therefore, a closed current path is made by the first conductive plate 21, the third conductive plate 23, the second conductive plate 22, and the feeder 25, as illustrated by the arrows in FIG. 32 (A), (B), so that it is possible to think that a loop antenna 50 is formed.

The above-mentioned loop antenna 50 can be strictly different from a general "loop antenna". However, in this specification, as long as a loop of a current is made by the conductive plates 21, 22, 23 and the feeder 25, it can be referred to as "loop antenna". For example, this antenna is capable of functioning as a power receiving antenna (for receiving charging power). Similarly, the loop antenna 18f according to the first embodiment (c.f. FIG. 18) which is formed by the first conductive plate 10a, the conductive member 10c, the second conductive plate 10b, and the feeder 11 can be strictly different from the general loop antenna, in principle. However, as long as a loop is made, it can be referred to as "loop antenna". Further, the directions of arrows of the loop antenna 50 illustrated in FIGS. 32 (A), (B) may be reversed.

Preferably, the first conductive plate 21 and the second conductive plate 22 are spaced apart from each other by a predetermined distance and extend substantially in the same direction and substantially in parallel. However, the first conductive plate 21 and the second conductive plate 22 may not be necessarily made parallel with each other.

Preferably, each of the first conductive plate 21, the second conductive plate 22, and the third conductive plate 23 is formed in a long plate shape. However, it is possible to variously adjust the lengths and directions of the four sides of the long plate shape of the first conductive plate 21, the second conductive plate 22, and the third conductive plate 23. In addition, the first conductive plate 21, the second conductive plate 22, and the third conductive plate 23 may be entirely or partially formed in a flattened shape, in a curved shape, or in a shape with a combination of the flattened shape and the curved shape.

In the illustrated embodiment, the third conductive plate 23 is connected to the first conductive plate 21 and the second conductive plate 22 in a substantially orthogonal direction. However, as will be described in detail below, the connection angle of the third conductive plate 23 is not limited to 90 degrees, particularly from the perspective of the efficiency of the loop antenna 50.

Preferably, the first conductive plate 21, the second conductive plate 22, and the third conductive plate 23 are formed by bending a single conductive plate. For example, the first conductive plate 21, the second conductive plate 22, and the third conductive plate 23 may be formed by bending a single copper plate so as to be formed in a nearly U-shape or in a nearly C-shape in a cross-sectional view. In the bending process, for example, a copper plate or the like may be plastically processed by using an arbitrary mold.

Alternatively, the first conductive plate 21, the second conductive plate 22, and the third conductive plate 23 may be separated conductive plates and be connected with each other to permit an electric current to flow through them.

In the second embodiment, a hollow space 24 having a predetermined size may be made by executing punching to at least one of the first conductive plate 21, the second conductive plate 22, and the third conductive plate 23. For example, a nearly rectangular hollow space 24 may be made by executing punching to the third conductive plate 23 at an arbitrary position. The size and the shape of the hollow space 24 may be defined so as to accommodate an inverted-F antenna 60 in the hollow space 24.

Besides, according to the first embodiment (c.f. for example, FIG. 14(d) and FIG. 18), the inside of the conductive plate 10c of the antenna 1d is configured to have a cutout so that the loop antenna 18g is formed by the surrounding frame of the hollow space. In contrast, in the second embodiment, the inside of the conductive plate 23 is also cut out, but the main purpose of the punching is not to form a loop antenna. Accordingly, in the second embodiment, the size, the thickness, etc., of the surrounding frame of the hollow space 24 may be different from those of the first embodiment.

Therefore, it can be seen that the antenna 20 illustrated in FIGS. 32 (A), (B) is configured as a dual-band antenna having the "loop antenna 50" which is composed of the first conductive plate 21, the second conductive plate 22, the third conductive plate 23 and the feeder 25, and the "inverted-F antenna 60" which is disposed in the hollow space 24 of the third conductive plate 23.

Accordingly, two antenna patterns of different frequencies are made available because the loop antenna 50 and the inverted-F antenna 60 are provided. The loop antenna 50 and the inverted-F antenna 60 may be used for different purposes. For example, the loop antenna 50 may be used as an antenna for receiving electric power (or a power receiving antenna), and the inverted-F antenna 60 may be used as an antenna for performing data communication.

More concretely, in the antenna 20 according to the second embodiment, an antenna for transmitting and/or receiving electric power in a frequency band of 920 MHz may be constituted by the loop antenna 50, and an antenna for performing data communication in a frequency band of 2.4 GHz may be constituted by the inverted-F antenna 60. However, the band of each antenna may not be particularly limited to the above-mentioned example. For example, an antenna for receiving electric power may be provided by the loop antenna 50 in a frequency band of 900 MHz, and an antenna for performing data communication may be provided by the inverted-F antenna 60 in a frequency band of 5.6 GHz.

As stated above, the two different types of antennas 50 and 60 are made available in the antennas 20 as illustrated in FIGS. 32 (A) and (B). Accordingly, the application field of the antenna may be enlarged, and it may contribute to reduce a user's burden of designing the antenna.

Especially, the antenna 20 is suitable in the application field where electric power is fed wirelessly. In the wireless sensor networks, an antenna for receiving electric power and an antenna for performing data communication are required. For example, in a sensing operation of an IoT using wireless power feeding, two different bands may be required at the same time for wirelessly receiving electric power in a frequency band of 920 MHz and for wirelessly performing data communication in 2.4 GHz band. The antenna illustrated in FIGS. 32 (A) and (B) is suitable in this field because two different antennas can be provided as stated above.

Further, in the antenna 20 according to the second embodiment, the above-mentioned two antennas are integrated while reducing the sizes in the antenna 20. Accordingly, it becomes possible to attain miniaturization of the antenna, the rectenna, and/or the module so as to be used widely in various fields.

For example, in the antennae 20 illustrated in FIGS. 32 (A) and (B), each of the first conductive plate 21 and the second conductive plate 22 has a width dimension W3 along a predetermined width direction and a length dimension L3 along a predetermined longitudinal direction. Thus, the antennae 20 has a predetermined two-dimensionally area A3 (which is obtained by multiplying the W3 by the L3). The area A3 may be used to mount an electronic circuitry or the like on a surface of the first conductive plate 21.

For example, a PCB (which is an abbreviation of printed circuit board) may be mounted on a surface of the first conductive plate 21. Here, the PCB is a type of board. The PCB may be a PWB (which is an abbreviation of printed wiring board) on which an electronic component is mounted and made operable as an electronic circuit.

The specific configuration of the electronic circuit may be arbitrarily selected when it is used. For example, the electronic circuit may be configured to include, but is not limited to, a power receiving circuit, a power storage circuit, a sensor, a power storage device, and a microcontroller, etc.

The antenna 20 illustrated in FIGS. 32 (A), (B) may be configured as a dual-band antenna (or a multi-band antenna) so as to be placed in many different locations when it is used. Especially, even when the conductive plate 22 of the antenna 20 is placed on a metal surface or a conductor, the loop antenna can be formed so that a current of electricity flows along a looped route in a space sandwiched between the conductive plate 21 and the conductive plate 22, without greatly decreasing the power-receiving efficiency of the antenna. As a result, the antenna 20 is capable of being placed on a metal surface, an electrically conductive device, or a surface of a sensor, thereby greatly enhancing usability of the antenna.

With referring to FIGS. 32 (A), (B), the basic constitution of the antenna 20 has been conceptually illustrated.

In FIG. 34 (A), (B), a more concrete example of the antenna according to the second embodiment is illustrated.

With referring to FIG. 34 (A), (B), in particular, a layer 44 (c.f. FIG. 33) of an electronic circuit mounted on the first conductive plate 21 is more specifically illustrated.

Please notice that the configuration illustrated in FIGS. 32 (A), (B) and the configuration illustrated in FIG. 34 (A), (B) may not necessarily be matched with each other. For example, it is possible to partially omit a coverlay 45 which is illustrated in FIG. 33, according to a three-dimensional shape of the electronic circuit. Also, it is possible to attach the electronic circuit not only on the top surface of the first conductive plate 21, but also on a part of the third conductive plate 23 and/or the second conductive plate 22 (illustration abbreviated). The description of the coverlay 45 and the like will be described later.

By inserting a core member 30 into the antenna 20 illustrated in FIG. 34 (A), the miniaturization of the antenna may be attained due to a wavelength shortening effect. For example, the antenna 20 may be formed to have a size capable of being hold in an adult person's hand. The core member and the like will be described later.

For example, with regard to the length dimension L3 illustrated in FIG. 32 (A), the antennae 20 may have a dimension of from about 40 mm to about 60 mm.

Also, with regard to the thickness of each conductive plate, the antennae 20 may have a dimension of several mm, or may have a dimension of from about 5 mm to about 8 mm.

However, each dimension of the antenna 20 is not particularly limited to the above-mentioned numerical range.

With referring to FIG. 34 (A), (B), it can be seen that, for example, a power source, a sensor drive circuit and/or a wireless communication circuit may be mounted on the antenna 20, as an electronic circuit to be used on the antenna 20.

When the antenna 20 is configured as a dual-band antenna, it is conceivable that the loop antenna 50 is used to receive electric power (e.g., in 920 MHz) and the inverted-F antenna 60 is used to transmit data acquired from a sensor (e.g., in 2.4 GHz). With regard to the sensor, it may be required to connect components by wired connections. Therefore, when the PCB (e.g., electronic circuit) is mounted on the antenna 20, the height dimension of the antenna 20 may be increased accordance with the added thickness.

Thus, when the antenna 20 is configured, it is conceivable that a FPC (which is an abbreviation of flexible printed circuit) may be used instead of the above-mentioned PCB. For example, the FPC is flexible and may be formed by using a thin insulating material (such as a plastic film).

For example, the antennae 20 may be configured by using a two-layered FPC. In this case, the first layer may be used for an antenna in a frequency band of 920 MHz (for example, the loop antenna 50), and the second layer may be used for an antenna in a frequency band of 2.4 GHz band (for example, the inverted-F antenna 60), a rectifier circuit, a power source, a sensor control circuit, and a radio communication circuit.

Preferably, the antenna is configured to realize a relatively small and low-attitude structure (with suppressed height) by using the PCB or FPC.

Next, the internal structure of the antenna 20 will be described.

In the first embodiment, as illustrated in FIG. 11, etc., the first conductive plate 10a, the second conductive plate 10b, and the third conductive plate 10c are formed in a nearly U-shape or in a nearly C-shape in a cross-sectional view, and the inside thereof is hollowed out. Therefore, there are advantages from the viewpoint of suppressing the weight of the product, suppressing the number of parts of the product, suppressing the cost of the product, and suppressing the time and effort required for manufacturing the product.

Likely, in the second embodiment, as illustrated in FIGS. 32 (A), (B), the first conductive plate 21, the second conductive plate 22, and the third conductive plate 23 are formed in a nearly U-shape or in a nearly C-shape in a cross-sectional view, and the inside thereof is hollowed out. Also, in this case, there are advantages from the viewpoint of suppressing the weight of the product and the like while securing the performance of the loop antenna 50.

When the internal shape of the antenna 20 is hollowed out, it is preferable to fix the distance between the two parallel conductive plates 21 and 22 so as to maintain the shape of the product and to secure the strength of the product.

Therefore, in the second embodiment, a rigid core member 30 made of a dielectric material is inserted into a space formed between the two parallel conductive plates 21 and 22 so that the shape and the strength of the product are improved. At the same time, it becomes possible to attain miniaturization of the loop antenna 50 due to the wavelength shortening effect.

With referring to FIGS. 32 (C), (D), the core member 30 capable of being inserted into the antenna's shape (c.f. FIGS. 32 (A), (B)) is illustrated. The core member 30 may be formed to have an external shape corresponding to the internal shape of the antenna 20.

For example, the antenna 20 illustrated in FIG. 32 (A) is formed nearly in a rectangular parallelepiped shape as a whole, and has the width dimension W3 in the predetermined width-direction, the length dimension L3 in the longitudinal direction, and the height dimension H3 in the height direction.

Likely, the core member 30 illustrated in FIG. 32 (C) is formed to have a main body 31 which is formed nearly in a rectangular parallelepiped shape as a whole having a width dimension W4 in the predetermined width-direction, a length dimension L4 in the longitudinal direction, and a height dimension H4 in the height direction.

The respective dimensions W4, L4 and H4 of the core member 30 may be arbitrarily determined so that the inside of the antenna 20 may be filled by the core member 40. In general, when the dielectric constant (which can be abbreviated to "ε" or "epsilon") of the core member 30 is high, it becomes possible to attain miniaturization of the antenna 20 due to the wavelength shortening effect by shortening the dimensions of the antenna 20 (for example, W3, L3 and/or H3) comparing to the case where the core member 30 is not used in the antenna 20. The effect of this miniaturization is not limited to the dual-band antenna, but also is applicable to the antenna 20 which is configured as a single-band antenna.

The main body 31 of the core member 30 may not be provided over the entire area of the internal shape of the antenna 20. The core member 30 may be filled only in a part of the internal shape of the antenna 20, according to the need.

In addition, the main body 31 of the core member 30 may not be limited to a uniform shape. Instead of that, it is possible to pierce the body 31, according to the need. Also, it is possible to provide a hollow space in the main body 31, according to the need. When a hollow space is provided in the main body 31, it becomes possible to reduce the weight as a whole. Also, the power-receiving efficiency or the radiation efficiency of the antenna may be improved. Further, it may be possible to increase the efficiency by contriving the shape of the hollow space, for example, by increasing the space at the middle part and by narrowing the space at the tip portion of the antenna.

Further, the main body 31 of the core member 30 may not be limited to a single component. It is possible to constitute the main body 31 by using two or a plurality of components, according to the need.

Preferably, the core member 30 is dielectric.

For example, the core member 30 may be made of plastic. The plastic is a kind of dielectric material. The plastic is an organic polymer which has plasticity. The plastic may be referred to synthetic resin or the like. The plastic has the advantage of facilitating processing a complicated shape, and of reducing a cost. This material is advantageous in mass production.

More preferably, the core member 30 may be made of acrylic. The acrylic is a kind of plastic. The acrylic may be referred to acrylic resin, acrylic fiber, acrylic glass or the like. The acrylic is a transparent material having excellent appearance. The acrylic is a relatively rigid material, but it may not be strong against impact. However, when the acrylic is formed to have an enough thickness, it becomes possible to enhance the shock resistance of the material.

In addition, the core member 30 may be made of polycarbonate. The polycarbonate is a kind of plastic. Especially, the polycarbonate is a material using a polycarbonate resin as a raw material.

In addition, the core member 30 may be made of PTFE (which is an abbreviation of polytetrafluoroethylene). For example, the core member 30 may be made of Teflon (registered trademark).

The material of the core member 30 is not particularly limited to the above-mentioned materials such as the plastic, the acrylic, the polycarbonate, or the PTFE. It is possible to use another material having a relatively high dielectric constant.

When the core material is made of Teflon, it may be possible to increase the radiation efficiency as compared with other materials because the dielectric loss of Teflon is relatively small.

When the antenna 20 is structured to wrap each of the conductive plates 21, 22, and 23 around the core member 30, the intensity of the antenna 20 may be increased. For example, the antenna 20 may be structured to wrap the above-mentioned FPC around the core member 30. Because the FPC is flexible, it facilitates wrapping around the core member 30 which may be composed of not only a flat surface but also a curved surface.

When the antenna 20 is structured uniformly in the width direction as illustrated in FIG. 41, the production efficiency for manufacturing a plurality of the antennas 20 at the same time may be increased. For example, a plurality of sets of the antennas and the circuit boards may be formed on the FPC in parallel (c.f. for example, three reference numerals 20, 20 and 20 in solid and broken lines in FIG. 41). Then, the FPC on which the plurality of sets of the antennas and the circuit boards are mounted may be wrapped around the core member 30 as stated above. After that, the FPC and the core member may be cut by every set of the antenna and the circuit board (c.f. for example, the reference numeral 20 in solid line in FIG. 41). By doing so, a plurality of antennas 20 may be efficiently manufactured.

Alternatively, the core member 30 may be manufactured separately from the antenna 20 which has an approximately rectangular parallelepiped shape formed by the first conductive plate 21, the second conductive plate 22 and the third conductive plate 23. Subsequently, the core member 30 may be inserted into the antenna 20 and be bonded thereto. For example, it is possible to use an epoxy resin adhesive or the like as adhesive. Also, the core member 30 may be made by performing injection molding in an arbitrary mode.

As described above, the core member 30 may be filled in the space formed between the two conductive plates 21 and 22 which are separated from each other. Accordingly, it becomes possible to maintain the shape of the product and to increase the strength of the product.

Further, by inserting the core member 30 inside the antenna 20, it becomes possible to reduce the size of the loop antenna 50 due to the wavelength shortening effect based on the characteristics of the dielectric material of the core member 30. However, when the core member 30 is inserted into the antenna 20, there is a possibility that the power receiving efficiency of the loop antenna 50 may be lowered due to the dielectric loss caused by the material.

Therefore, when the core member 30 is used in the antenna 20, it is preferable to use a material having as little dielectric loss as possible in order to prevent the deterioration in the performance of the loop antenna 50 and that of the inverted-F antenna 60. For example, the core member 30 may be made of the above-mentioned material such as the plastic, the acryl, the polycarbonate, or the PTFE. However, it is possible to use another material for manufacturing the core member 30. In particular, it is desirable to use a material having a relatively high dielectric constant and a relatively low dielectric loss.

With referring to FIG. 33, a cross-sectional view of the side surface 26 of the first conductive plate 21 (c.f. FIG. 32B) is conceptually depicted.

As can be seen from FIG. 33, the first conductive plate 21 may be configured to have a multi-layer construction consisting of two or a plurality of layers (c.f. for example, reference numerals 41 to 45). For example, the first conductive plate 21 may be a two-layered FPC. In this case, the two-layer FPC may mean that a copper foil used in a circuitry has two layers.

The multi-layer construction of the first conductive plate 21 is illustrated as a five-layered structure in the figure. However, the number of layers to be used is not particularly limited to the illustrated five layers. It is possible to have fewer or more layers in the layered structure. In addition, the second conductive plate 22 and the third conductive plate 23 may be configured to have a multi-layer construction, and the configurations of the second conductive plate 22 and of the third conductive plate 23 may be different from the configuration of the first conductive plate 21.

For example, the lowermost layer 41 of the first conductive plate 21 may be a coverlay which corresponds to a protective layer. The coverlay may be made of any material capable of protecting electrically, mechanically, chemically and/or thermally the antenna from its surroundings.

Also. for example, the second layer 42 from the bottom of the first conductive plate 21 may be a conductive layer which is made of, for example, a copper foil. The copper foil is used to form the first conductive plate 21 so as to construct a loop antenna.

Also, for example, the third layer 43 from the bottom of the first conductive plate 21 may be an insulating layer which is made of a material having excellent electrical insulation properties. Preferably, the material is polyimide.

Also, for example, the fourth layer 44 from the bottom of the first conductive plate 21 may be a conductive layer which is made of, for example, a copper foil. An electronic circuit may be formed by the copper foil. Alternatively, an electronic circuit, a battery, a sensor, and the like may be separately formed and mounted on the copper foil to be electrically connected. In addition, it is possible to form the inverted-F antenna 60 by the copper foil of the layer 44, by being connected to the electronic circuit.

Also, for example, the fifth layer 45 from the bottom of the first conductive plate 21 may be a coverlay.

Besides, the material of the layers 42 and 44 may not be particularly limited to copper, and another conductive member may be used for them.

The flexible printed circuit (FPC) may not be particularly limited to the above-mentioned five-layered structured as illustrated in FIG. 33. The FPC may include more layers so as to form a more complicated electronic circuitry on the conductive plate 21. In addition, a ground layer may be provided, for example, by increasing the number of layers. In this case, it becomes possible to suppress interference by separating the ground of the antenna and the ground of the circuit side.

Accordingly, by using the FPC, the conductive plates 21, 23, 22, the inverted-F antenna 60 and the electronic circuit may be integrally formed so as to be wrapped around the core member 30. By doing so, the dual-band antenna having the loop antenna 50 and the inverted-F antenna 60 is formed so that the antenna 20 according to the present embodiment may be easily manufactured.

The electronic circuit layer 44 arranged on the first conductive plate 21, and the layer 42 of the loop antenna 50 arranged below the first conductive plate 21 are insulated from each other by the insulating layer 43 except for some contact points. Therefore, it is devised not to impair the function of the loop antenna 50 which is formed by the first conductive plate 21 even when the electronic circuit is layered on the same first conductive plate 21.

The loop antenna 50 may be formed by the copper foil of the layer 42 of the two-layered FPC, and the inverted-F antenna 60 may be formed by the copper foil of the layer 44. In this case, it is devised to maintain the performance of each antenna because both of the antennas 50, 60 are insulated by the polyimide layer 43 in order to secure that each antenna can be independently operated.

As described above, the layer 42 may be insulated from the layer 44 by the layer 43, but a high-frequency component may pass therethrough. With regard to this problem, the inverted-F antenna 60 may be constituted by the second conductive layer of the multi-layer configuration of the FPC, and the inverted-F antenna 60 may be disposed in the hollow-space 24 where a part of the layer 42 is cut out. As a result, the inverted-F antenna 60 is disposed at a position where the current density is low. Therefore, the occurrence of interference between the loop antenna 50 and the inverted-F antenna 60 may be suppressed.

In addition, the loop antenna 50 is provided inside the antenna 20 (c.f. reference numeral 50 in FIG. 32 (A)). In other words, the antenna 20 is configured to have a nearly U-shape in the cross-sectional view so that the loop antenna 50 generates an electric field inside the nearly U-shape.

In FIG. 43, the simulation result of the electric field of the antenna 20 is exemplified. As it can be seen from the figure, an electric field is generated in a vertical direction between the two conductive plates 21 and 22. Also, the loop antenna 50 may be protected from the external environment by the protective layer 45. Therefore, when the antenna illustrated in FIGS. 32 (A), (B) is attached on an installation surface by placing the first conductive plate 21 on the upper-side and the second conductive plate 22 on the downside, the performance of the loop antenna 50 may not be impaired regardless of the material of the installation surface to which the antenna 20 is attached. The same applies to the case where the upper side and lower sides are reversed.

When the sensor module is configured to be performed in a completely wireless mode, it is preferable that not only the charging part but also the data communication part for transmitting the data of the sensor are configured to be performed wirelessly. When the PCB is mounted on a surface of the antenna to operate the power supply, the sensor, and the data communication part wirelessly, there is a case that a patterned antenna is provided on the PCB as an antenna for performing wireless communication.

However, when a pattern antenna of electronic circuit is provided on the first conductive plate 21, a large are will be required in the two-dimensional direction because of its size.

With regard to this problem, in the antenna 20 according to the second embodiment, the loop antenna 50 is provided by the side surfaces of the conductive plate 21, 22 and 23 extending in a nearly U-shape in the cross-sectional view, and the antenna for data communication at a frequency of the data communication (for example, the inverted-F antenna 60) is provided by using a partial region of the conductive plates 21, 22 and 23, so that the miniaturization of the antenna 20 may be attained as a whole. In this case, it removes a need for a pattern antenna which may be provided on the same plane as the circuit board. As a result, according to the present embodiment, it becomes possible to utilize the area of the top surface of the first conductive plate 21 more widely.

As illustrated in the implementation example of the antenna in FIGS. 34 (A), (B), the antenna may be variously constituted to have the antenna 50 for receiving electric power wirelessly, for example, in a frequency band of 920 MHz, and the antenna 60 for performing data communication, for example, in a frequency band of 2.4 GHz band.

For example, according to the antenna 20 illustrated in FIG. 34 (B), a hollow space 24 is provided on a surface of the first conductive plate 21, and the inverted-F antenna 60 is disposed therein.

Also, for example, with referring to the implementation example of FIGS. 34 (A), (B) which are illustrated to correspond to the example of FIG. 32, a hollow space 24 is defined in the third conductive plate 23, and the inverted-F antenna 60 is disposed therein.

In both cases, the electronic circuitry (PCB or FPC) may be provided on the top surface of the first conductive plate 21 while maintaining the small size of the antennae 20. Especially, when the antenna is integrated into one FPC, it becomes possible to attain the miniaturization of the antenna 20 and the reduction of the number of assembling steps of the antenna.

Subsequently, modifications of the loop antenna 50 which is provided in the antenna 20 will be described.

In FIG. 35, a variation of the antenna 20 and that of the core member 30 applicable in the antenna 20 are exemplified.

The shape of the loop antenna 50 is determined according to the outer shape of the conductive plate(s) including the first conductive plate 21, the second conductive plate 22, and the third conductive plate 23. In the example illustrated in FIGS. 32 (A), (B), the first conductive plate 21 and the second conductive plate 22 extend substantially parallel to each other, and are connected at an angle of approximately 90 degrees by the third conductive plate 23 on one end side. The performance of the loop antenna may be influenced by this shape.

With regard to this, in the example illustrated in FIGS. 35 (A), (B), the first conductive plate 21 and the second conductive plate 22 are connected to each other at an angle larger than 90 degrees by the third conductive plate 23 having more corners.

Specifically, in the implementation example illustrated in FIGS. 35 (A), (B), the third conductive plate 23 is bent into a polygonal shape in a cross-sectional view as exemplified by reference numerals 26, 27. In like manner, the first conductive plate 21 and the second conductive plate 22 are bent into a polygonal shape at the opposite end as exemplified by reference numerals 28, 29. Accordingly, the antenna 20 has a substantially octagonal shape in a cross-sectional view, as a whole.

As a result, the shape of the loop antenna 50 in a cross-sectional view is changed from the substantially square shape illustrated in FIGS. 32 (A), (B) to the substantially octagonal shape (or a polygonal shape) illustrated in FIGS. 35 (A), (B). By bringing the shape of the loop antenna 50 closer to a circular shape (or to an elliptical shape), it becomes possible to variously change the design of the antenna and/or to increase the performance of the antenna.

Also, in FIGS. 34 (A) and (B), it is illustrated that the first conductive plate 21 and the second conductive plate 22 extend substantially parallel to each other, and are connected in a curved shape (or in a nearly arc shape) by the third conductive plate 23 on one end side. In this case, by bringing the outer shape of the loop antenna 50 closer to a circular shape (or to an elliptical shape), it becomes possible to variously change the design of the antenna and/or to increase the performance of the antenna.

The third conductive plate 23 may extend along a curved shape (or along a nearly arc shape) as a whole. As illustrated, in FIGS. 34 (A) and (B), the third conductive plate 23 may extend in a curved manner at the both ends and extend in a straight manner at the middle part.

It is preferable that the top surface of the antenna 20 is flattened in order to arrange an electronic circuit on the top surface of the first conductive plate 21. Also, it is preferable that the bottom surface (the second conductive plate 22) is flattened in order to be used as an installation plane of the antenna 20. On the other hand, in a case of the third conductive plate 23, the degree of freedom in shape is relatively high. Accordingly, the shape of the loop antenna 50 may be changed by modifying the shape of the third conductive plate 23.

In this way, the third conductive plate 23 may be suitably formed to have an arbitrary shape to ensure the performance of the loop antenna 50, depending on the embodiment to be used. For example, the third conductive plate 23 may extend generally straight as illustrated in FIGS. 32 (A), (B). Also, the third conductive plate 23 may extend in an entirely or partially curved shape as illustrated in FIGS. 34 (A), (B). Also, the third conductive plate 23 may extend generally in a polygonal shape as illustrated in FIGS. 35 (A), (B).

When the core member 30 is filled in the antenna 20, the shapes of the conductive plates 21, 22, and 23 may be modified so as to enhance the holding effect of the core member 30.

For example, in the case illustrated in FIGS. 35 (A), (B), the first conductive plate 21, the second conductive plate 22, and the third conductive plate 23 have a generally octagonal shape in a cross-sectional view, as a whole. In this case, the third conductive plate 23 is bent in multiple stages (c.f. numerals 26 and 27). Correspondingly, the first conductive plate 21 and the second conductive plate 22 are folded inward at their respective ends (c.f. numerals 28 and 29).

It is preferable that the outer shape of the main body 31 of the core member 30 which is intended to be accommodated in the antenna 20 is matched with the inner shape of the antenna 20. For example, in the case illustrated in FIGS. 35 (C), (D), the main body 31 of the core member 30 may be chamfered at each corner portion (c.f. numerals 36, 37, 38, 39). By forming the antenna 20 and the main body 31 of the core member 30 in a polygonal shape in the cross-sectional view, the holding force for holding the core member 30 in the antenna 20 may be increased.

Alternatively, the first conductive plate 21, the second conductive plate 22 and the third conductive plate 23 may be provided with a convex portion (or concave portion) at an arbitrary location. Correspondingly, the main body 31 of the core member 30 may be provided with a corresponding concave portion (or convex portion) at an arbitrary location. By locking the core member at the position of the pair of the convex portion and the concave portion, the holding force for holding the core member 30 in the antenna 20 may be increased.

Subsequently, modifications of the inverted-F antenna 60 will be described.

In FIGS. 36 (A) to (D), modifications of the inverted-F antenna 60 (c.f. FIG. 32 (A), (B)) are illustrated.

As depicted in FIG. 36 (A), the inverted-F antenna 60 is configured to mainly include a feed line (or feed point) 61, a shorting line (or shorting point) 62 and a body portion 63. The thickness, the length, the position, the shape, and the like of the feed line 61, the shorting line 62 and the body portion 63 may be adjusted in according to the embodiment.

For example, it is possible to adjust the thicknesses of the feed line 61, the shorting line 62 and the body portion 63.

Also, it is possible to adjust the length of the body portion 63.

Also, it is possible to adjust the height of the body portion 63.

Also, it is possible to adjust the relative position of the shorting line 62 with respect to the feed line 61.

Further, it is possible to adjust the shape of the body portion 63 of the inverted-F antenna 60 according to the embodiment to be used.

For example, as illustrated in FIG. 36 (A), the body portion 63 of the inverted-F antenna 60 may be formed in a simple line shape (or in a monopole antenna shape).

Also, as illustrated in FIG. 36 (B), the body portion 63 of the inverted-F antenna 60 may be bent inwards at approximately 90 degrees from the condition illustrated in FIG. 36 (A) (c.f. reference numeral 64) instead of being formed in a simple line shape.

Also, as illustrated in FIG. 36 (C), the body portion 63 of the inverted-F antenna 60 may be further bent inwards at approximately 90 degrees from the condition of FIG. 36 (B) (c.f. reference numeral 65).

Further, the body portion 63 of the inverted-F antenna 60 may be bent into a meander line shape (illustration abbreviated) instead of being formed in a simple line shape.

As described above, the body portion 63 of the inverted-F antenna 60 may be formed in various shapes. The shape of the body portion 63 may be straightened out. Alternatively, the shape of the body portion 63 may be bend once or a plurality of times, and the shape of the body portion 63 may be folded towards the inside and/or folded towards the outside. For example, the shape of the body portion 63 may be formed in a meandered manner. In addition, the angle at which the main body portion 63 is bent is not limited to 90 degrees.

Further, the inverted-F antenna 60 may be provided anywhere on the antenna 20.

For example, with referring to FIGS. 34 (A), (B) and FIGS. 36 (A) to (C), etc., it can be seen that the inverted-F antenna 60 is disposed in a hollow space 24 which is provided at the side surface (i.e. the third conductive plate 23) of the rectangular shape of the antenna 20.

Also, with referring to FIG. 36 (D), etc., it can be seen that the inverted-F antenna 60 is disposed in a hollow space 24 which is provided at the top surface (i.e. the first conductive plate 21) of the rectangular shape of the antenna 20.

Although it is not illustrated, it is also possible to dispose the inverted-F antenna 60 in a hollow space 24 which is provided at the bottom surface (i.e. the second conductive plate 22) of the rectangular shape of the antenna 20.

Also, when the antenna 20 is formed in a polyhedral shape having a larger number of side surfaces instead of being formed in a rectangular shape, it is also possible to locate the inverted-F antenna 60 in an arbitrary surface of the polyhedral shape.

Also, in the implementation examples, the hollow space 24 is illustrated to have a square shape of a rectangular frame. However, as long as the inverted-F antenna is able to be accommodated in the hollow space 24 and the characteristics of the loop antenna 50 are able to be maintained, the shape of the hollow space 24 is not limited to the illustrated square shape and may be formed in an arbitrary shape.

Although it is not illustrated, the antenna 20 may be provided with a chip antenna at an arbitrary place (illustration abbreviated) instead of the inverted-F antenna 60.

The chip antenna is a chip-type component which is capable of functioning of transmitting and/or receiving a necessary frequency signal. In particular, the chip antenna may be configured to be small and thin.

In this case, the antenna 20 according to the second embodiment may be configured as a dual-band antenna including the loop antenna 50 and the chip antenna (instead of the inverted-F antenna 60).

Further, the antenna 20 may be provided with any other kind of antenna of an arbitrary shape on an arbitrary place as long as it has similar characteristics of the inverted-F antenna 60 and/or the chip antenna.

In this way, either of the inverted-F antenna 60 and the chip antenna may be provided on an arbitrary place such as the side surface or the top surface of the antenna 20. However, as described above, the top surface of the antennae 20 is preferably reserved as an installation area for the electronic circuitry (such as PCB or FPC). For this reason, when the inverted-F antenna is provided on the top surface of the antenna 20, the size (or the area) of the top surface may be increased by that amount as compared with the case when the inverted-F antenna is provided on the side surface.

For example, with referring to FIG. 36 (C), it can be seen that an almost entire area (for example, area A3) of the top surface of the antenna 20 having a shape of almost rectangular parallelopiped (which has the length dimension L3, the width dimension W3, and the height dimension H3) is reserved as the installation area of the electronic circuitry. Here, the area of A3 can be approximated as L3×W3.

On the other hand, with referring to FIG. 36 (D), it can be seen that when either of the inverted-F antenna and the chip antenna is mounted on the top surface of the antenna 20 having a shape of almost rectangular parallelopiped, the shape of the antenna 20 is elongated in order to reserve the installation area (c.f. A5) of the electronic circuitry. Supposing that, for example, the rectangular shape of the antenna 20 has the length dimension L5, the width dimension W5, and the height dimension H5, then comparing to the above-mentioned case of having the length dimension L3, the width dimension W3, and the height dimension H3, the length dimension L5 is particularly increased from the length dimension L3. Alternatively, the width dimension W5 may be increased from the width dimension W3. Here, it is supposed that, preferably, the area A5 is substantially equal to the area A3.

As described above, the antenna 20 according to the second embodiment preferably has a main body having a substantially rectangular parallelepiped shape whose cross-sectional shape has a nearly U-shape. The nearly U-shape includes an arbitrary mode of connecting the first conductive plate 21 and the second conductive plate 22 with the third conductive plate 23. Preferably, the nearly U-shape include either one of the mode of connecting the first conductive plate 21 and the second conductive plate 22 with the substantially straight third conductive plate 23 (c.f. FIG. 32 (A)); the mode of connecting the first conductive plate 21 and the second conductive plate 22 with the substantially polygonal third conductive plate 23 (c.f. FIG. 35 (A)); and the mode of connecting the first conductive plate 21 and the second conductive plate 22 with the substantially curved third conductive plate 23 (c.f. FIG. 34 (A)).

However, the shape of the antenna 20 according to the second embodiment is not particularly limited to the substantially rectangular parallelepiped shape.

For example, the antenna 20 may be configured in a spherical shape, similar to the antenna if according to the first embodiment illustrated in FIG. 21.

Also, for example, the antenna 20 may be formed in a columnar shape similar to the antenna if according to the first embodiment illustrated in FIG. 24.

Further, the antenna 20 may have any other shape, such as a polyhedron shape, a triangular prism shape, a polygonal prism shape, a cylindrical shape, an elliptical columnar shape, or the like.

As described above, in the antenna 20 according to the second embodiment, the loop antenna 50 is formed by using the first conductive plate 21, the second conductive plate 22, and the third conductive plate 23. In this case, it is preferable that each one of the first conductive plate 21, the second conductive plate 22, and the third conductive plate 23 is formed to have a substantially plate-shaped top surface.

However, the shape of the antenna 20 according to the second embodiment is not particularly limited to this shape.

For example, the antenna 20 may be configured to have a slot which is provided in either one or both of the first conductive plate 10a and the second conductive plate 10b, similar to the antenna 1e according to the first embodiment illustrated in FIG. 14(e).

In this case, as illustrated in FIG. 18, it is possible to include either one or both of the slot antenna 18d which is formed by the slot provided in the first conductive plate 10a and the slot antenna 18e which is formed by the slot provided in the second conductive plate 10b.

The basic configuration of the antenna 20 according to the second embodiment has been described above with reference to FIGS. 32 to 36.

Preferably, the antenna 20 according to the second embodiment is configured as a dual-band antenna by including the loop antenna 50 and the inverted-F antenna 60. In this case, preferably, an antenna for receiving electric power at the first frequency (e.g., in 920 MHz) is configured by the loop antenna 50 and an antenna for performing data communication at the second frequency (e.g., 2.4 GHz) is configured by the inverted-F antenna 60.

Alternatively, the antenna 20 may be configured as a dual-band antenna by including the loop antenna 50 and the chip antenna, as stated above.

Also, the antenna 20 according to the second embodiment may be configured as a single-band antenna. In this case, the antenna 20 may be configured to include only the loop antenna 50.

Further, the antenna 20 according to the second embodiment may be configured as a multi-band antenna so as to simultaneously realize three or a plurality of bands.

For example, the slot antenna 18d and/or the slot antenna 18e etc., may be added to the combination of the loop antenna 50 and the inverted-F antenna 60.

Also, any other kind of antenna may be added to the combination of the loop antenna 50 and the inverted-F antenna 60.

For example, a linear antenna (for example, a monopole antenna or a dipole antenna) may be added to the combination of the loop antenna 50 and the inverted-F antenna 60.

As described above, the antenna 20 according to the second embodiment may be configured as an antenna, a rectenna, or a circuit module (for example, an antenna module, a sensor module, or the like) in order to receive one or a plurality of bands.

Next, with referring to FIGS. 37 and 38, an implementation example in which electric power is supplied to a sensor to operate it by using the antenna 20 according to the second embodiment will be described.

According to the implementation example illustrated in FIG. 37, electric power is supplied to a sensor by using the antenna 20 according to the second embodiment.

For example, a transmitter (or a power transmitting device) 70 which is capable of transmitting electric power without using wires is illustrated in the left (encircled by a broken line). A receiver (or a power receiving device) 80 which is capable of receiving electric power without using wires is illustrated in the right (encircled by a broken line). The transmitter 70 and the receiver 80 are spaced apart from each other by a predetermined distance. For example, the transmitter 70 and the receiver 80 are spaced apart from each other by approximately 1 m.

In this example, it is assumed that the magnitude of the charging falls in the range of approximately from 1 mW to 3 mW or approximately from 1 mW to 2 mW when the distance between the transmitter and the receiver is made to be 1 m. However, this numerical range is only exemplary.

The transmitter 70 is configured to function as an electric power transmitting device when electric power is fed wirelessly. An oscillator 71 may be included to oscillate signals at a predetermined frequency. The signals may be amplified to remove unwanted frequency components, if necessary. Then, radio waves are radiated to the outside by a transmitting antenna (or an antenna for transmitting electric power) 72. The transmitting antenna 72 is controlled by a microcomputer (i.e. controller) 73. The microcomputer 73 is configured to control the transmitting function of the transmitting antenna 72 based on feedback signals which are obtained from a data transceiver 74. The feedback signals are based on data which may be received by an antenna 75 for transmitting/receiving data (or an antenna for performing data communication, or data communication antenna).

The receiver 80 is configured to function as an electric power receiving device when electric power is fed wirelessly. The antenna 20 illustrated in FIGS. 32 to 36 may be used in the receiver 80.

A receiving antenna (or an antenna for receiving electric power) 81 (which is, for example, the loop antenna 50 of the antenna 20) is included to receive microwaves transmitted from the transmitting antenna 72 to the outside, for charging. For example, the loop antenna 50 may function as a charging power receiving antenna in a frequency band of 920 MHz. A rectifier 82 (which is, for example, a part of the PCB or FPC) may be included to rectify the received radio waves (or microwaves) to convert them to rectified voltages. The power managing unit 83 (which is, for example, a part of the PCB or FPC) may be included to control charging voltages based on the rectified voltages. The charging voltages may be used to charge a battery (which is, for example, a part of the PCB or FPC).

The electric power receiving function which is composed of the rectifier 82 and the power managing unit 83 is controlled by the microcomputer or controller 85 (which is, for example, a part of the PCB or FPC) in order to charge the battery 84 and/or to drive an arbitrary sensor 86 by the received electric power. It is also possible to drive the sensor 86 by the electric power in the battery 84.

The sensor 86 may be internally provided as a circuit which is a part of the PCB or FPC. Alternatively, the sensor 86 may be externally connected to the PCB or FPC. The type of the sensor 86 is arbitrary, but for example, a thermal sensor, a temperature sensor, an optical sensor, a humidity sensor, a vibration sensor, or the like may be used.

An operating condition of the power management unit 83 and that of the sensor 86 and also information (data) acquired by the sensor 86 or the like may be continuously or intermittently monitored by the microcomputer 85. The signals indicating the above-mentioned conditions and/or the information acquired by the sensor 86 may be transmitted from the data transmitter 87 to the external transmitter 70 via an antenna 88 for transmitting and/or receiving data (for example, the inverted-F antenna 60 of the antenna 20). For example, the inverted-F antenna 60 may function as an antenna for performing data communication in a frequency band of 2.4 GHz.

Electric power (for example, microwaves) to be used for charging wirelessly may be transmitted unilaterally (for example, at a frequency of 920 MHz). On the other hand, radio waves to be used for performing data communication (for example, at a frequency of 2.4 GHz) may be transmitted bidirectionally.

In this way, the antenna 20 may be modularized. Particularly, the antenna 20 is suitable for being configured as a sensor module.

The antenna 20 may cope with two frequency bands while taking advantage of being able to be mounted and used on a metal surface. The antenna 20 may be used without imposing almost any restriction on the material of the installation surface to which the antenna 20 is attached so that the antenna 20 is capable of being used without choosing a location. Accordingly, the miniaturization of the sensor module may be attained by the antenna 20.

With referring to FIG. 38, simulation results of radio wave efficiencies of two antennas are illustrated.

In FIG. 38, simulation results are depicted for radio wave efficiencies of the power receiving antenna 20 (which will be described later with referring to FIG. 39) having an antenna for performing data communication at a frequency of 2450

MHz (i.e. 2.45 GHz) and an antenna for receiving electric power at a frequency of 918 MHz, under the use condition illustrated in FIG. 37.

In FIG. 38, frequencies are depicted on the horizontal axis, and efficiencies are depicted on the vertical axis (supposing that "1" corresponds to "100 percent"). In an upper side of the FIG. 38, the simulation result of the loop antenna 50 is depicted, and in a lower side of the FIG. 38, the simulation result of the inverted-F antenna 60 is depicted. These simulation results correspond to the simulation results of electromagnetic-field when the distance between the source of the electric power and the antenna 20 is made to be 1 m, as stated above, under an ideal condition (for example, charging energy is not disturbed by obstacles).

With referring to FIG. 38, it can be seen that the loop antenna 50 is capable of achieving the efficiency of about 87% at a frequency of 918 MHz (i.e. 0.918 GHz). It can also be seen that the inverted-F-antenna 60 is capable of achieving the efficiency of about 83% at a frequency of 2.5 GHz.

Therefore, when the antenna 20 is configured as a dual-band antenna, interferences between the two antennas may be prevented so that deterioration of efficiencies of the antennas may be avoided. In particular, it is confirmed that the performance of the loop antenna 50 is not significantly deteriorated in a frequency band of 920 MHz. In addition, it is confirmed that the performance of the inverted-F antenna 60 is not significantly deteriorated in a frequency band of 2.4 GHz. Therefore, according to the antenna 20 of the second embodiment, an antenna for receiving electric power which can bear a practical use is realized by the loop antenna 50, and also an antenna for performing data communication which can bear a practical use is realized by the inverted-F antenna 60.

As described above, the antenna 20 is configured as a dual-band antenna in which two or a plurality of antennas are arranged three-dimensionally. It is confirmed that the antenna shape having little deterioration in performance may be obtained for both antennas even though it is changed from the single band mode to the dual band mode. Therefore, the antenna 20 which has a relatively small shape and is superior in antenna performance may be obtained.

The antenna 20 according to the second embodiment is capable of supplying the received electric power not only to the sensor 86, as described above, but also to an arbitrary target such as a robot, a device, a PC, or the like.

In particular, when the antenna 20 is used in a FA (which is an abbreviation of Factory Automation), the antennae 20 may be applied to an arbitrary device instead of the sensor 86. For example, the antenna 20 may be used in a building management, and it is possible to use the antenna 20 in a form of an arbitrary device such as an employee ID card or the like which is intended to be provided at a location closer to a human body.

Further, a target to which electric power is supplied may be a cellular phone, a PDA (which is an abbreviation of personal digital assistants), a wireless microphone, a wireless USB, a wireless theater, a wireless television, a wireless camera, a wireless headphone, a wireless mouse, a wireless keyboard, a wireless router, a wireless printer, or the like.

Next, with referring to FIGS. 39, 40, an implementation example in which electric power is supplied to a device including a sensor to operate it by using the above-mentioned antenna 20 will be described.

In the implementation example illustrated in FIG. 39, the antenna 20 is configured to be used for supplying electric power to a sensor which is included in a device.

For example, with referring to FIG. 39, it can be seen that the antenna 20 is attached on a surface of a device 90 of which outline is illustrated by dotted lines. It is conceptually illustrated that the antenna 20 is used for supplying electric power to a sensor (abbreviated in the figure) provided in the device 90. Here, the device 90 is used in place of the sensor 86 which is illustrated in FIG. 38.

As described above, the loop antenna 50 is provided inside the antenna 20 so that it is devised not to impair the performance of the loop antenna 50 with respect to the material of the installation surface to which the antenna 20 is attached. Accordingly, even when the antenna 20 is directly attached on a metal surface of the device 90, the loop antenna 50 is capable of functioning continuously.

As stated above, the antenna 20 is configured to include the loop antenna 50 which is formed by the first conductive plate 21, the second conductive plate 22 and the third conductive plate 23, and this antenna 50 may be used for charging electric power at the first frequency (e.g., 918 MHz) By having the loop antenna 50, for example, the device 90 is allowed to be charged with electric power.

In addition, the antenna 20 is configured to include the inverted-F antenna 60, and this antenna 60 may be used for performing data communication at the second frequency (e.g., 2.45G). By having the loop antenna 60, for example, information indicating conditions of the device 90 and/or information (data) detected by the sensor is allowed to be transmitted to the outside.

With referring to FIGS. 40, simulation results of receiving intensities of two antennas are illustrated.

In FIGS. 40 (A), (B), simulation results of receiving intensities of two antennas in a three-dimensional space are illustrated with the X-axis direction of the device 90 (c.f. FIG. 39) disposed upward and the Y-Z plane of the device (c.f. FIG. 39) disposed downward (in other words, the device 90 illustrated in FIG. 39 is rotated in a clockwise direction by 90 degrees about the Y-axis). The simulation results correspond to the simulation results of electromagnetic-field when the distance between the source of the electric power and the antenna 20 is made to be 1 m, under an ideal condition (for example, charging energy is not disturbed by obstacles).

In FIG. 40 (A), it can be seen that as the color becomes darker (as the color changes from gray color to black color), the power receiving condition becomes better. As the figure shows, it is confirmed that the loop antenna 50 is capable of relatively uniformly receiving energy along the entire length of the antenna 20 which is formed by the conductive plates 21, 22, and 23.

In FIG. 40 (B), the simulation result of power receiving condition of the inverted-F antenna 60 in a three-dimensional space is illustrated. The simulation result corresponds to the simulation results of electromagnetic-field when the distance between the source of the electric power and the antenna 20 is made to be 1 m, under an ideal condition (for example, charging energy is not disturbed by obstacles).

In FIG. 40 (B), likely, it can be seen that as the color becomes darker (as the color changes from gray color to black color), the power receiving condition becomes better. As the figure shows, the inverted-F antenna 60 is eccentrically arranged so as to be nearer to an end portion of the antenna 20 (or to an end portion of the entire length of the antenna 20). Even in this condition, it is confirmed that the inverted-F antenna 60 is capable of transmitting and/or receiving energy over the whole area of the device 90.

During the course of the simulation of the antenna for receiving electric power, the output of the transmission power is made to be 1 W and the transmission distance is made to be 1 m. Then, it is estimated that electric power of about 7.26 mW, −21.39 dB, may be supplied. It is also estimated that a battery may be charged with electric power of about 3.5 mW. However, these numerical values are illustrative only and are not particularly limited to these values Therefore, a dual band antenna consisting of the loop antenna 50 (for example, at a frequency of 918 MHz) and the inverted-F antenna 60 (for example, at a frequency of 2.45 GHz) are realized in the antenna 20 by combining these two antenna patterns in different frequency bands. Further, the antenna 20 may be configured not only as a dual band antenna but also as a multi-band antenna having three or a plurality of bands so as to transmit and receive radio waves at other frequencies.

As described above, in the antenna 20 according to the second embodiment, two antennas including the loop antenna 50 and the inverted-F antenna 60 are integrated so as to be operated at two frequencies. Even though these two antennas are integrated, each antenna is capable of functioning to prevent performances from being severely disturbed when in use.

Besides, according to the present embodiment in which the loop antenna 50 and the inverted-F antenna 60 are combined, there may be a case that the receiving efficiency of the dual-band antenna becomes higher than the receiving efficiency of the single loop antenna 50 and that of the single inverted-F antenna 60 for the following reasons.

According to the present embodiment, the loop antenna 50 is grounded commonly to the power receiving antenna itself. As a result, the size of the loop antenna 50 may become large and then the efficiency may be improved.

In addition, the hollow space 24 is provided for the inverted-F antenna 60 so that current can pass through both sides of the cut-out window of the hollow space 24, and it may contribute to an improvement in the radiation pattern and in the radiation efficiency, even if the value is small.

Furthermore, it is possible to devise the mounting positions of the loop antenna 50 and the inverted-F antenna 60 so as to suppress the influence of interference that can occur between the two antennas and to prevent efficiencies from being disturbed. In addition, it is possible to achieve an appropriate efficiency for each antenna, for example, by adjusting the impedance of each antenna or by performing a matching for each antenna to increase the efficiency. For example, it is possible to use an arbitrary matching circuit or an arbitrary connector (for example, U.FL connector) which is suitable to be used with a small device requiring a high frequency transmission.

Also, by installing the inverted-F antenna 60 at a position far from the feeder 25, the influence of interference may be reduced. Also, by installing it at a position where current of the power receiving antenna 50 decreases (which may correspond to the position of the node of the resonance at $\lambda/4$), the influence of interference may be reduced.

The antenna 20 according to the second embodiment has been described with reference to FIGS. 32 to 43.

The antenna 20 according to the second embodiment may be used in various forms, as stated below.

Form 1

As the simplest form of the antenna 20, it may be configured to have at least the loop antenna 50. In this case, the antenna may be configured as a single band antenna having the loop antenna 50. In some implementations, the loop antenna 50 may be further combined with a rectifier (or rectifier circuit 82, etc.).

Form 2

As an implementation of the antenna 20, it may be configured to have a combination of at least the loop antenna 50 and the rectifier (for example, the rectifier circuit 82). In addition, the impedance of the antenna may be adjusted to obtain high antenna efficiency. Also, the size or the shape of the antenna 20 may be adjusted to correspond to a matching, or to correspond to the frequency or the like.

Form 3

As an implementation of the antenna 20, it may be configured to have a combination of at least the loop antenna 50, the rectifier (for example, the rectifier circuit 82), a power supply circuit (for example, the power managing unit 83), and a data communication circuit board (for example, the microcomputer 85 or the like). In this case, it can be provided as an antenna module.

Form 4

As an implementation of the antenna 20, it is possible to add the inverted-F antenna 60 to the configuration of the form 3. In this case, the inverted-F antenna 60 may be configured to be applicable to a high frequency (for example, in a frequency band of 2.4 GHz). In this case, the antenna pattern of the inverted-F antenna 60 may be variously adjusted (c.f. FIGS. 36 (A) to (C)). Further, the mounting position of the inverted F antenna 60 may be variously adjusted (c.f. FIGS. 36 (B), (D)). It is possible to perform various adjustments in order to achieve an appropriate shape of the antenna pattern of the inverted-F antenna 60.

Form 5

As an implementation of the antenna 20, it may be configured to have a combination of at least the loop antenna 50, the rectifier (for example, the rectifier circuit 82), the power supply circuit (for example, the power management 83), the data communication circuit board (for example, the microcomputer 85 and the inverted-F antenna 60), and the sensor 86 (c.f. FIG. 37) so as to realize a sensor network system or a sensor module. Here, an arbitrary device (for example, the device 90) (c.f. FIG. 39) may be used instead of the sensor 86.

Form 6 Furthermore, it is possible to combine the core member 30 with any one of the above-mentioned forms 1 to 5. Here, the size, shape, and the characteristics of each antenna may be variously adjusted by performing various adjustments of the material, the size, the shape, and the like of the core member 30, In this case, the FPC may be used in the antennae 20.

As described above, according to the present invention, it is possible to provide an antenna, a rectenna, and a circuit module which are capable of receiving one or a plurality of bands, and are capable of being formed to have a small size and a low attitude, free from a constraint of its attaching position. Accordingly, it becomes possible to provide an antenna module, a sensor module and the like which are capable of coping with a wide range of small sensing applications.

As described above, according to the first embodiment, the power receiving antennas 1, 1A, and 1a to 1h which are capable of having various shapes have been described with referring to FIGS. 1 to 31 and 42.

In addition, according to the second embodiment, the power receiving antennas 20 which are capable of having various shapes have been described with referring to FIGS. 32 to 41 and 43.

The first embodiment and the second embodiment may be implemented independently of each other. Alternatively, the first embodiment and the second embodiment may be implemented in combination with each other. For example, the descriptions of the core member 30, the inverted-F antenna 60, and the like according to the second embodiment may be applicable to the power receiving antenna 1 and 1A, 1a~1h according to the first embodiment. Similarly, the descriptions of the first embodiment may be applicable to the second embodiment.

Please notice that the communication band for receiving electric power is not limited in a frequency band of 920 MHz. Preferably, the communication band is applicable to UHF band. For example, a frequency band of 868 MH may be used in Europe, and also a frequency band of 915 MHz may be used in the United States. Furthermore, other frequency bands may be applicable as long as these bands are belonging to UHF band.

In addition, the communication band for performing data communication is not limited in a frequency band of 2.4 GHz band. For example, other frequency bands in the vicinity of 2.4 GHz (±10%) may be applicable. For example, a frequency band of 2.45 GHz may be applicable. Further, a communication band in the vicinity of 5.7 GHz may be applicable. While a high frequency band may be required for high-speed data communication, a lower frequency band may be used for receiving electric power as compared with the case of the data communication.

The present invention is not limited to the above-described embodiments, and includes various modifications. For example, the above-mentioned embodiments have been described in detail for the purpose of illustrating the present invention in an easy-to-understand manner, and are not necessarily limited to those having all the described configurations. Also, it is possible to replace a part of the configuration of one embodiment with the configuration of another embodiment, and it is also possible to add the configuration of another embodiment to the configuration of one embodiment. Further, it is possible to add, delete, or replace a part of the configuration of each embodiment with other configuration.

It should be noted that the above-described embodiments disclose at least the configurations described in the claims.

EXPLANATION OF REFERENCE NUMERALS 1, 1A, 1a-1h . . . Antennae
10a: First conductive plate
10b: Second conductive plate
10c: Conductive member
10d: Protrusion
11 . . . Feeder
20 . . . Antenna
21 . . . First conductive plate
22 . . . Second conductive plate
23 . . . Third conductive plate
30 . . . Core member
50 . . . Loop antenna
60 . . . Inverted-F antenna

The invention claimed is:

1. A power receiving antenna used for wireless power feeding, comprising:
a first antenna including:
a first conductive plate,
a second conductive plate that faces the first conductive plate,
a feeder connecting a first end portion of the first conductive plate and a second end portion of the second conductive plate facing the first end portion, and
a conductive member connecting a first other end portion opposite to the first end portion of the first conductive plate and a second other end portion opposite to the second end portion of the second conductive plate,
wherein at least one of the first conductive plate, the conductive member, and the second conductive plate has a cutout to accommodate a second antenna.

2. The power receiving antenna according to claim 1, wherein the conductive member is a plate-shaped member connecting the first other end portion of the first conductive plate and the second other end portion of the second conductive plate.

3. The power receiving antenna according to claim 2, wherein the first conductive plate, the second conductive plate, and the plate-shaped conductive member are integrally formed.

4. The power receiving antenna according to claim 2, wherein the first conductive plate, the second conductive plate, and the plate-shaped conductive member are formed by bending a single conductive plate.

5. The power receiving antenna according to claim 4, wherein the single conductive plate has a cutout extending within a predetermined distance from an end portion of the single conductive plate.

6. The power receiving antenna according to claim 4, wherein the plate-shaped conductive member has a cutout extending within a predetermined distance from an end portion of the plate-shaped conductive member.

7. The power receiving antenna according to claim 6, wherein the first conductive plate and the second conductive plate have a slot.

8. The power receiving antenna according to claim 7, wherein a part of the first conductive plate is a protrusion that protrudes toward the second conductive plate from a substantially center of an end portion in a width direction of the first conductive plate.

9. The power receiving antenna according to claim 8, wherein a tip of the protrusion and the second conductive plate are separated by a gap.

10. The power receiving antenna according to claim 1, wherein a center portion in a longitudinal direction of the first conductive plate is formed in a step shape to project toward the second conductive plate, and
wherein a center portion in a longitudinal direction of the second conductive plate is formed in a step shape to project toward the first conductive plate.

11. The power receiving antenna according to claim 1, comprising a core member made of dielectric material, inserted between the first conductive plate and the second conductive plate.

12. The power receiving antenna according to claim 1, wherein the cutout is a hollow space made in at least one of the first conductive plate, the conductive member, and the second conductive plate.

13. The power receiving antenna according to claim 12, wherein:
the second antenna is one of an inverted-F antenna or a chip antenna; and
the second antenna is an antenna for transmitting and/or receiving data.

14. The power receiving antenna according to claim 12, comprising a core member made of dielectric material, inserted between the first conductive plate and the second conductive plate.

15. The power receiving antenna according to claim 12, wherein the first conductive plate, the conductive member, and the second conductive plate are constituted by a first conductive layer of a flexible printed circuit (FPC), and wherein the second antenna is an inverted-F antenna which is constituted by a second conductive layer of the FPC.

16. The power receiving antenna according to claim 1, wherein the first antenna is capable of functioning as a loop antenna or an inverted-F antenna.

17. The power receiving antenna according to claim 16, wherein the first conductive plate, the conductive member, and the second conductive plate form a nearly U-shape in a cross-sectional view so that the loop antenna generates an electric field inside the nearly U-shape.

18. The power receiving antenna according to claim 1, wherein the first antenna is an antenna for receiving charging power.

19. The power receiving antenna according to claim 1, wherein a width of the first conductive plate and a width of the second conductive plate are substantially the same, and
   wherein a length of the first conductive plate and a length of the second conductive plate are longer than a length in which a frequency band of radio waves assumed to be received is a resonance frequency, by from 10% to 30%, preferably by approximately 20%.

20. The power receiving antenna according to claim 1, wherein a width of the first conductive plate and a width of the second conductive plate are substantially the same, and
   wherein a length of the first conductive plate and a length of the second conductive plate are shorter than a length in which a frequency band of radio waves assumed to be received is a resonance frequency, by from 10% to 30%, preferably by approximately 20%.

* * * * *